US010009952B2

(12) United States Patent
Kim

(10) Patent No.: US 10,009,952 B2
(45) Date of Patent: Jun. 26, 2018

(54) CONTROL METHOD FOR SUPPORTING MULTIPLE CONNECTIONS IN MOBILE COMMUNICATION SYSTEM AND APPARATUS FOR SUPPORTING MULTIPLE CONNECTIONS

(71) Applicant: Electronics and Telecommunications Research Institute, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days. days.

(21) Appl. No.: 15/437,325

(22) Filed: Feb. 20, 2017

(65) Prior Publication Data

US 2017/0164419 A1 Jun. 8, 2017

Related U.S. Application Data

(63) Continuation of application No. 14/902,713, filed as application No. PCT/KR2014/005918 on Jul. 2, 2014, now Pat. No. 9,763,151.

(30) Foreign Application Priority Data

Jul. 4, 2013 (KR) .......................... 10 2013 0078605
Jul. 12, 2013 (KR) .......................... 10 2013 0082433

(Continued)

(51) Int. Cl.
*H04W 36/00* (2009.01)
*H04W 76/02* (2009.01)
*H04W 76/04* (2009.01)

(52) U.S. Cl.
CPC ......... *H04W 76/19* (2018.02); *H04W 76/025* (2013.01); *H04W 76/028* (2013.01);
(Continued)

(58) Field of Classification Search
CPC . H04W 24/02; H04W 24/04; H04W 36/0055; H04W 36/00; H04W 36/0083; H04W 88/08
(Continued)

(56) References Cited

U.S. PATENT DOCUMENTS

2006/0182018 A1 8/2006 Bahk et al.
2009/0257353 A1* 10/2009 Song ..................... H04W 24/02
370/241

(Continued)

FOREIGN PATENT DOCUMENTS

KR 1020020093322 A 12/2002
KR 1020060069688 A 6/2006
(Continued)

OTHER PUBLICATIONS

"RAN1 issues for support of dual connectivity with small cell," 3GPP TSG RAN WG1 #73, R1-132240, May 20-24, 2013.

Primary Examiner — Temica M Beamer
(74) Attorney, Agent, or Firm — William Park & Associates Ltd.

(57) ABSTRACT

Disclosed are a control method for supporting multiple connections in a mobile communication system and an apparatus for supporting multiple connections. In the method for supporting the multiple connections to be performed in first and second base stations, a first base station receives the measured results for multiple connections from a terminal, determines whether the plurality of connections are set on the basis of the measured results, transmits the information for setting the multiple connections to the second base station when setting the multiple results, and the second base station generates the control information for setting the multiple connections of the terminal on the basis of the information for setting the multiple connections received from the first base station. Thus, the multiple (Continued)

connections can be easily supported and the performance of the mobile communication system can be improved therethrough.

3 Claims, 25 Drawing Sheets

(30) Foreign Application Priority Data

| | | |
|---|---|---|
| Jul. 18, 2013 | (KR) | ........................ 10 2013 0085003 |
| Sep. 13, 2013 | (KR) | ........................ 10 2013 0110554 |
| Oct. 23, 2013 | (KR) | ........................ 10 2013 0126778 |
| Oct. 30, 2013 | (KR) | ........................ 10 2013 0130541 |
| Jan. 8, 2014 | (KR) | ........................ 10 2014 0002566 |
| Feb. 10, 2014 | (KR) | ........................ 10 2014 0015103 |
| Feb. 28, 2014 | (KR) | ........................ 10 2014 0024561 |
| Mar. 17, 2014 | (KR) | ........................ 10 2014 0031154 |

(52) U.S. Cl.
CPC ......... *H04W 76/046* (2013.01); *H04W 76/15* (2018.02); *H04W 76/27* (2018.02)

(58) Field of Classification Search
USPC ........... 455/423, 424, 67.11, 67.13, 436, 444
See application file for complete search history.

(56) References Cited

U.S. PATENT DOCUMENTS

| | | |
|---|---|---|
| 2010/0151920 A1 | 6/2010 | Song et al. |
| 2011/0007682 A1 | 1/2011 | Islam et al. |
| 2013/0072182 A1 | 3/2013 | Jung et al. |
| 2013/0100795 A1* | 4/2013 | Zhao ................. H04W 36/0016 370/216 |
| 2013/0229931 A1 | 9/2013 | Kim |
| 2014/0192686 A1 | 7/2014 | Hammarwall et al. |
| 2015/0092552 A1* | 4/2015 | Bajj ....................... H04W 28/08 370/235 |
| 2015/0223178 A1* | 8/2015 | Pietraski ................. H04L 5/001 370/252 |
| 2015/0271763 A1* | 9/2015 | Balachandran ..... H04W 52/245 370/338 |
| 2016/0029376 A1* | 1/2016 | Fukuta .............. H04W 72/0426 370/329 |
| 2017/0048736 A1* | 2/2017 | Marinier ................ H04W 72/02 |

FOREIGN PATENT DOCUMENTS

| | | |
|---|---|---|
| KR | 1020070063463 A | 6/2007 |
| KR | 1020090039968 A | 4/2009 |
| KR | 101218143 B1 | 12/2012 |
| KR | 1020130100716 A | 9/2013 |

* cited by examiner

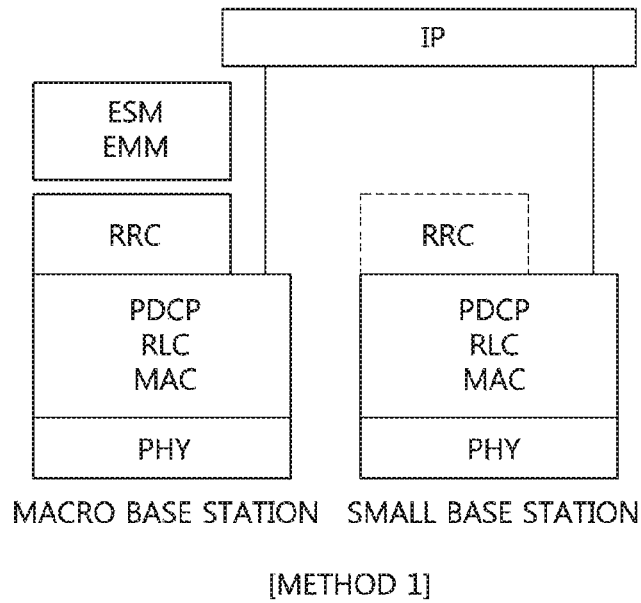
[METHOD 1]
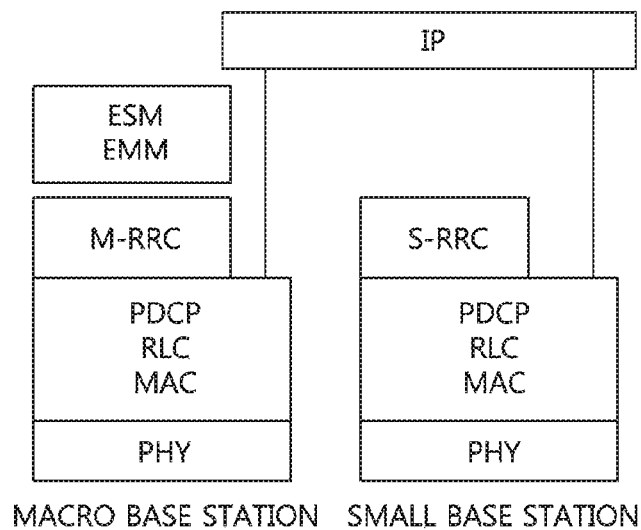
[METHOD 2]

[METHOD 3]

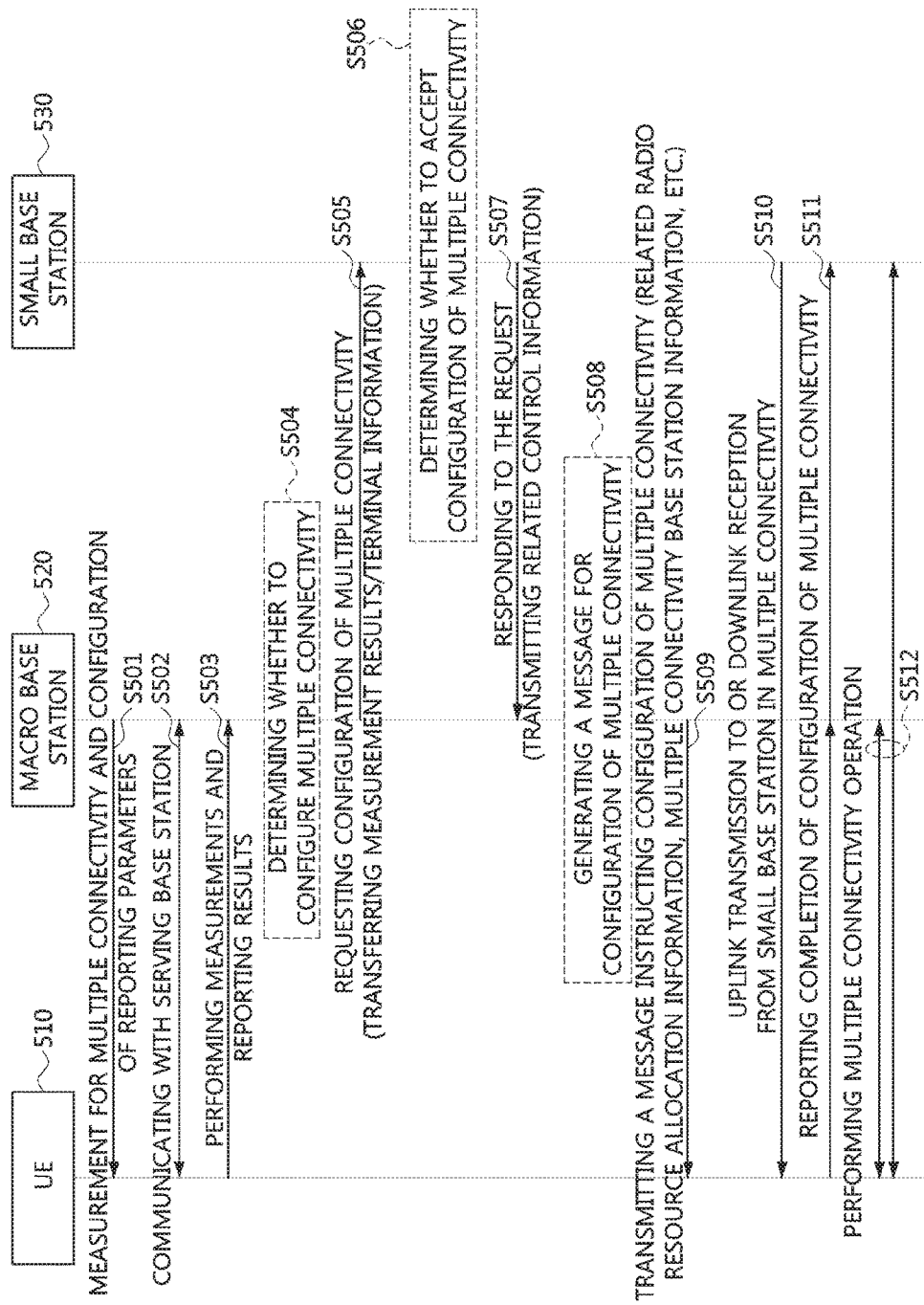

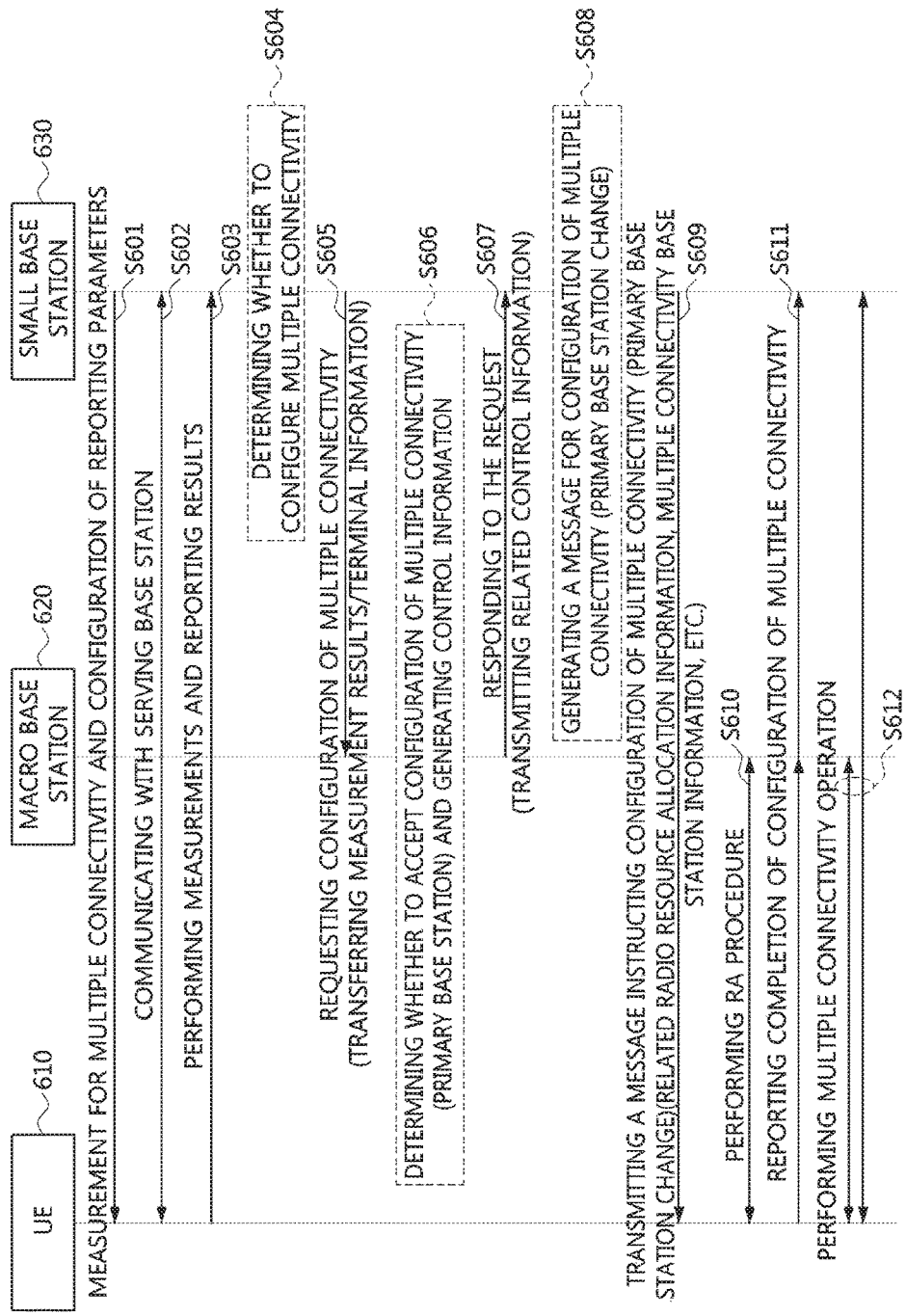

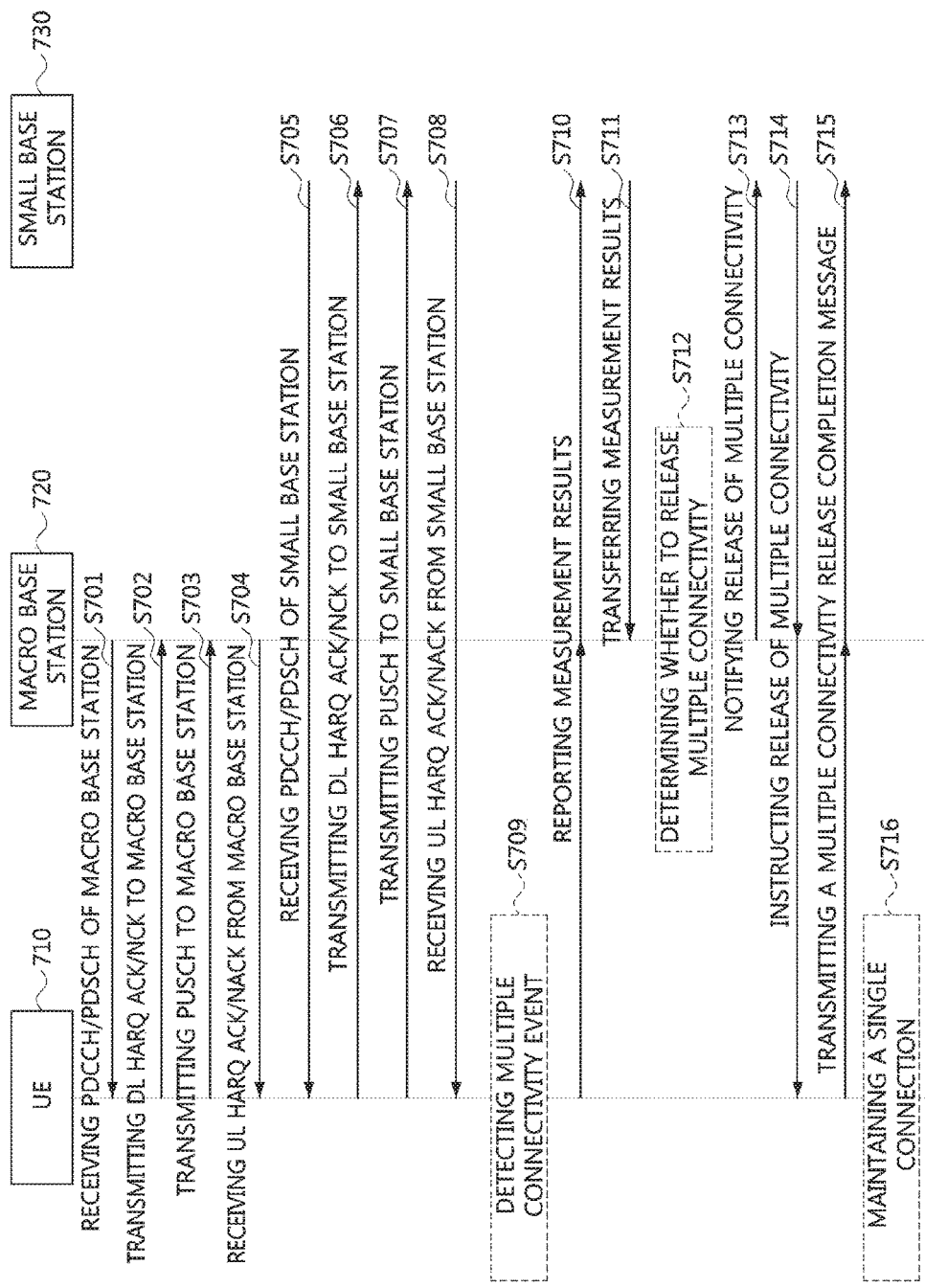

FIG. 8

```
-- ASN1START
RRCConnectionReconfiguration ::=   SEQUENCE {
    rrc-TransactionIdentifier       RRC-TransactionIdentifier,
    criticalExtensions              CHOICE {
        c1                              CHOICE{
            rrcConnectionReconfiguration-r8   RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}

RRCConnectionReconfiguration-r8-IEs ::= SEQUENCE {
    measConfig                      MeasConfig              OPTIONAL,   -- Need ON
    mobilityControlInfo             MobilityControlInfo     OPTIONAL,   -- Cond HO
    dedicatedInfoNASList            SEQUENCE (SIZE(1..maxDRB)) OF
                                    DedicatedInfoNAS        OPTIONAL,   -- Cond nonHO
    radioResourceConfigDedicated    RadioResourceConfigDedicated OPTIONAL, -- Cond HO-toEUTRA
    securityConfigHO                SecurityConfigHO        OPTIONAL,   -- Cond HO
    nonCriticalExtension            RRCConnectionReconfiguration-v890-IEs   OPTIONAL
}

RRCConnectionReconfiguration-v13xx-IEs ::= SEQUENCE {
    dualConnectionCellToReleaseList-r13 DualConnectionCellToReleaseList-r12 OPTIONAL -- Need ON
    dualConnectionCellToAddModList-r13  DualConnectionCellToToAddModList-r12 OPTIONAL -- Need ON
    nonCriticalExtension            SEQUENCE {}             OPTIONAL    -- Need OP
} dualConnectionCellToAddModList -r13 ::=    SEQUENCE (SIZE (1..maxDcCell-r13)) OF
DualConnectionCellToAddMod-r13

DualConnectionCellToAddMod-r13 ::=         SEQUENCE {
    DcCellIndex-r13                 DcCellIndex -r13,
    cellIdentification-r13          SEQUENCE {
        physCellId-r13                  PhysCellId,
        dl-CarrierFreq-r13              ARFCN-ValueEUTRA
    }                                                       OPTIONAL,   -- Cond DualConnectionCellAdd radioResourceConfigCommonDcCell-r13   RadioResourceConfigCommonDcCell -r13   OPTIONAL,
    -- Cond DualConnectionCellAdd
    radioResourceConfigDedicatedDcCell-r13 RadioResourceConfigDedicatedDcCell-r13   OPTIONAL,
    -- Cond DualConnectionCellAdd2
    ...
}

DualConnectionCellToReleaseList -r13 ::=   SEQUENCE (SIZE (1.. maxDcCell -r13)) OF DcCellIndex-r13

-- ASN1STOP
```

FIG. 9

```
-- ASN1START

MobilityControlInfo ::=     SEQUENCE {
    targetPhysCellId        PhysCellId,
    carrierFreq             CarrierFreqEUTRA              OPTIONAL, --
Cond HO-toEUTRA
    carrierBandwidth        CarrierBandwidthEUTRA         OPTIONAL, --
Cond HO-toEUTRA
    additionalSpectrumEmission    AdditionalSpectrumEmission   OPTIONAL, --
Cond HO-toEUTRA
    t304                    ENUMERATED {
                                ms50, ms100, ms150, ms200, ms500, ms1000,
                                ms2000, spare1},
    t333                    ENUMERATED {
                                ms150, ms200, ms500, ms1000, ms2000, ms3000,
                                ms2000, spare1},
    newUE-Identity          C-RNTI,
    radioResourceConfigCommon    RadioResourceConfigCommon,
    rach-ConfigDedicated    RACH-ConfigDedicated          OPTIONAL, --
Need OP
    ...,
    [[drb-ContinueROHC-r11  ENUMERATED {true}             OPTIONAL    --
Cond HO
    ]]
}

-- ASN1STOP
```

FIG. 10

```
-- ASN1START

RRCConnectionReconfigurationComplete ::= SEQUENCE {
    rrc-TransactionIdentifier      RRC-TransactionIdentifier,
    criticalExtensions             CHOICE {
        rrcConnectionReconfigurationComplete-r8
                                   RRCConnectionReconfigurationComplete-r8-IEs,
        criticalExtensionsFuture   SEQUENCE { }
    }
}

RRCConnectionReconfigurationComplete-v13x0-IEs ::= SEQUENCE {
    dualConnectionReconfig-r13     ENUMERATED {true}        OPTIONAL,
    nonCriticalExtension           SEQUENCE { }             OPTIONAL
}

-- ASN1STOP
```

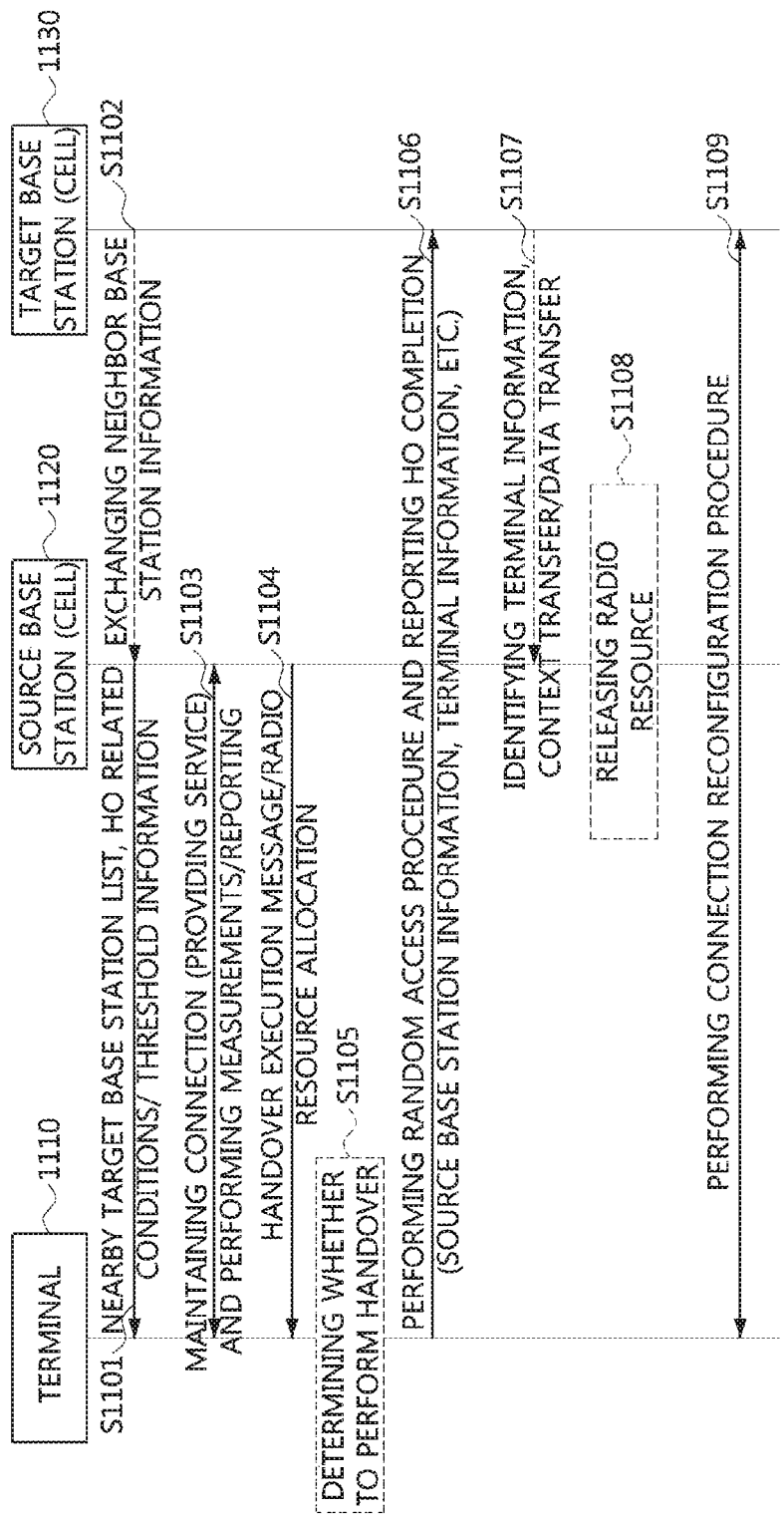

BEARER 1 : ——— BEARER 2 : — — —

BEARER 1 : ——— BEARER 2 : — — —

FIG. 21

```
SRB-ToAddMod ::=    SEQUENCE {
   srb-Identity           INTEGER (1..2),
   rlc-Config             CHOICE {
      explicitValue          RLC-Config,
      defaultValue           NULL
   }   OPTIONAL,                                       -- Cond Setup
   logicalChannelConfig_MeNB_DC    CHOICE {
      explicitValue          LogicalChannelConfig,
      defaultValue           NULL
   }   OPTIONAL,                                       -- Cond
   logicalChannelConfig_SeNB_DC    CHOICE {
      explicitValue          LogicalChannelConfig,
      defaultValue           NULL
   }   OPTIONAL,                                       -- Cond
Setup
   ...
}

DRB-ToAddModList ::=       SEQUENCE (SIZE (1..maxDRB)) OF DRB-ToAddMod

DRB-ToAddMod ::=    SEQUENCE {
   eps-BearerIdentity        INTEGER (0..15)    OPTIONAL,    -- Cond DRB-
Setup
   drb-Identity           DRB-Identity,
   pdcp-Config            PDCP-Config       OPTIONAL,    -- Cond PDCP
   rlc-Config             RLC-Config        OPTIONAL,    -- Cond Setup
   logicalChannelIdentity    INTEGER (3..10)   OPTIONAL,    -- Cond DRB-Setup
   logicalChannelConfig_MeNB_DC         LogicalChannelConfig    OPTIONAL,    --
Cond Setup
   logicalChannelConfig_SeNB_DC         LogicalChannelConfig    OPTIONAL,    --
Cond Setup
   ...
}
```

FIG. 22

```
-- ASN1START

LogicalChannelConfig ::=      SEQUENCE {
    ul-SpecificParameters     SEQUENCE {
        priority_MeNB_DC              INTEGER (1..16),
        priority_SeNB_DC              INTEGER (1..16),
        prioritisedBitRate_MeNB_DC    ENUMERATED {
                                      kBps0, kBps8, kBps16, kBps32, kBps64, kBps128,
                                      kBps256, infinity, kBps512-v1020, kBps1024-v1020,
                                      kBps2048-v1020, spare5, spare4, spare3, spare2,
                                      spare1},
        prioritisedBitRate_SeNB_DC    ENUMERATED {
                                      kBps0, kBps8, kBps16, kBps32, kBps64, kBps128,
                                      kBps256, infinity, kBps512-v1020, kBps1024-v1020,
                                      kBps2048-v1020, spare5, spare4, spare3, spare2,
                                      spare1}, bucketSizeDuration            ENUMERATED {
                                          ms50, ms100, ms150, ms300, ms500, ms1000, spare2,
                                          spare1},
        logicalChannelGroup_MeNB_DC   INTEGER (0..3)      OPTIONAL    -- Need OR
        logicalChannelGroup_SeNB_DC   INTEGER (0..3)      OPTIONAL    -- Need OR
    }   OPTIONAL,                                                     -- Cond UL
    ...,
    [[logicalChannelSR-Mask-r9       ENUMERATED {setup}  OPTIONAL    -- Cond SRmask
    ]]
}

-- ASN1STOP
```

CONTROL METHOD FOR SUPPORTING MULTIPLE CONNECTIONS IN MOBILE COMMUNICATION SYSTEM AND APPARATUS FOR SUPPORTING MULTIPLE CONNECTIONS

CROSS-REFERENCES TO RELATED APPLICATION

The present application is a continuation application of U.S. application Ser. No. 14/902,713, filed on Jan. 4, 2016, which is incorporated herein by reference in its entirety.

TECHNICAL FIELD

The present invention relates to a mobile communication technology, and more particularly to methods and apparatuses for supporting multiple connectivity in mobile communication systems.

BACKGROUND ART

Due to wide distribution of mobile terminals and tablet PCs and rapid advancement of mobile computing based on wireless internet technologies, innovative increase of wireless network capacity is being demanded.

Currently, although a $4^{th}$ generation mobile communication system, Long Term Evolution (LTE) system, has been world-widely commercialized and it can provide a higher throughput than the $3^{rd}$ generation mobile communication systems, it is still difficult to accommodate rapidly-increasing mobile data.

In many studies, it is predicted that traffic amount of mobile users will increase rapidly. An adoption of a new advanced physical layer technology or allocation of additional spectrums is being considered as the representative solutions to satisfy the above rapid explosive increase of traffic amount. However, the physical layer technologies are already approaching their theoretical limits, and allocation of additional frequency spectrum also cannot be a fundamental solution for capacity expansion of cellular networks.

Therefore, demands for technologies, which can increase capacity of a wireless network by hierarchically deploying small cells in sites having much traffic requirements and enabling close cooperation between macro base stations and small cell base stations, are increasing.

In a 3rd Generation Partnership Project (3GPP) standardization organization standardizing Long-Term Evolution (LTE), in order to efficiently accommodate rapidly-increasing data traffic requirements, the standardization on technologies for small cell enhancement (SCE) is going on.

However, only an initial discussion on the cell discovery has been made until now, and specified and efficient methods for the cell discovery have not been proposed yet.

DISCLOSURE

Technical Problem

Example embodiments of the present invention provide apparatuses for supporting multiple connectivity which can provide a terminal with multiple connections in a heterogeneous network environment where various types of base stations co-exist.

Example embodiments of the present invention also provide methods for supporting multiple connectivity in a mobile communication system.

Technical Solution

In order to achieve the purpose of the present invention, an apparatus supporting multiple connectivity according to an aspect of the present invention may comprise a first base station which includes a Radio Resource Control (RRC) layer, a Packet Data Convergence Protocol (PDCP) layer, a Radio Link Control (RLC) layer, and a Medium Access Control (MAC) layer; and a second base station which is connected with the first base station via a backhaul, supports multiple connectivity for a terminal, and includes a RRC layer, a PDCP layer, a RLC layer, and a MAC layer. Also, the RRC layer of the second base station is deactivated when supporting multiple connectivity for the terminal.

Here, the first base station may provide a signaling bearer and a data bearer, and the second base station may provide a data bearer.

Here, when the second base station configures radio resources for multiple connectivity, the second base station may transfer configuration information of radio resources allocated for the terminal to the first base station.

Here, the configuration information may include information on at least one of Channel-State information (CSI), Demodulation-Reference Signal (DM-RS), Sounding Reference Signal (SRS), Physical Uplink Control Channel (PUCCH), Discontinuous Reception (DRX), and Physical Resource Block (PRB) allocation information.

Also, in order to achieve another purpose of the present invention, a method supporting multiple connectivity, performed in a first base station and a second base station, according to an aspect of the present invention may comprise receiving, by the first base station, a measurement result for the multiple connectivity from a terminal; determining, by the first base station, whether to configure the multiple connectivity based on the measurement result; when the multiple connectivity is determined to be configured, transferring, by the first base station, information for configuration of the multiple connectivity to the second base station; and generating, by the second base station, control information for configuring the multiple connectivity for the terminal based on the transferred information for configuration of the multiple connectivity.

Here, in the transferring the information for configuration of the multiple connectivity, the first base station may transfer the measurement result and information on the terminal to the second base station, and the information on the terminal may include at least one of Semi-Persistence Scheduling (SPS) configuration information, Discontinuous Reception (DRX) configuration information, measurement report cycle information, measurement configuration parameter information, service information, and bearer property information.

Here, in the transferring the information for configuration of the multiple connectivity, the first base station may transfer at least one of information on capability of the terminal and information on a function which is desired to be supported by the second base station in consideration of the capability of the terminal during support of the multiple connectivity.

Here, wherein the control information may include at least one of information needed for the terminal to perform a non-contention based random access for the second base station, information on a Cell-Radio Network Temporary Identify (C-RNTI) that the second base station allocates to the terminal, information on a Semi-Persistent Scheduling RNTI (SPS-RNTI) that the second base station allocates to the terminal, power control information, information DRX operation configuration parameters of the second base station that the second base station allocates to the terminal, identification information of the second base station, Coordinated Scheduling/Coordinated Beamforming (CS/CB) resource allocation information for supporting the multiple connectivity, information on radio resource allocation for the second base station, Channel State information (CSI) of the second base station, information on Demodulation-Reference Signal (DM-RS) of the second base station, information on Sounding Reference Signal (SRS) of the second base station, and information on Physical Resource Block (PRB) resource allocation of the second base station.

Here, the method may further comprise transferring, by the second base station, the control information for configuring the multiple connectivity for the terminal to the first terminal; generating, by the first base station, a control message based on the control information for configuring the multiple connectivity for the terminal; and transmitting, by the first base station, the control message to the terminal.

Here, in the generating the control message, the control message may be generated as including at least one of information on a C-RNTI, information on a SPS-RNTI, information on frequency, information on a Carrier Aggregation, information on CS/CB, information on a timer for starting the multiple connectivity, and information on a timing offset for starting the multiple connectivity, or the control message may be generated as including the control information for configuring the multiple connectivity for the terminal which is transferred from the second base station.

Also, in order to achieve another purpose of the present invention, a method supporting multiple connectivity, performed in a terminal, according to another aspect of the present invention may comprise identifying, by the terminal, a Radio Link Failure (RLF) occurring in a radio channel with a second base station among a first base station and the second base station under supporting the multiple connectivity; and reporting, by the terminal, to the first terminal in which a RLF does not occur that the RLF occurs in the radio link with the second base station.

Here, the method may further comprise releasing, by the terminal, the multiple connectivity with the second base station.

Here, the method may further comprise receiving, by the terminal, a deactivation indication for multiple connectivity of the second base station from the first base station; and deactivating, by the terminal, the multiple connectivity with the second base station in response to the deactivation indication.

Here, the deactivating the multiple connectivity may include maintaining, by the terminal, radio resource configuration information for the multiple connectivity with the second base station; and after the RLF of the second base station is recovered, activating, by the terminal, the multiple connectivity with the second base station by using the radio resource configuration information.

Here, the deactivating the multiple connectivity may include receiving, by the terminal, a control message indicating activation of the multiple connectivity with the second base station from the first base station; and activating, by the terminal, the multiple connectivity with the second base station, wherein the control message includes identification information of the second base station.

Here, the method may further comprise stopping, by the terminal, transmission over an uplink data channel and a uplink control channel to the second base station.

Also, in order to achieve another purpose of the present invention, a method supporting multiple connectivity, performed in a base station, according to still another aspect of the present invention may comprise transmitting information on a wireless local area network access point (WLAN AP) to a terminal; receiving measurement result information on the WLAN AP from the terminal; determining whether to perform an offloading using the WLAN AP based on the measurement result information on the WLAN AP; and when the offloading is determined to be performed, transmitting a control message indicating the offloading using the WLAN AP to the terminal.

Here, the method may further comprise transmitting, by the terminal, at least one of information on whether the terminal supports a WLAN function, information on whether the WLAN function is activated, and information instructing to try to scan a WLAN AP, to the base station.

Here, the method may further comprise obtaining, by the base station, information on the offloading and information for scanning a WLAN AP and measuring a WLAN AP through communications with at least one WALN AP located within a service area of the base station.

Here, in the transmitting the information on the WLAN AP, the base station may transmit to the terminal at least one of Service Set Identifier (SSID) information, WLAN frequency band information, and position information of at least one WLAN AP which the base station can control or connect.

Here, in the transmitting the information on the WLAN AP, information of measurements on at least one WLAN AP is transmitted, and the information of measurements may include at least one of a measurement threshold value of a WLAN AP and measurement cycle information.

Here, the transmitting the information on the WLAN AP may include configuring a WLAN system information block (WLAN SIB) including information on a WLAN AP and information on measurements of a WLAN AP; and broadcasting the WLAN SIB.

Here, the transmitting the information on the WLAN AP may further include, when the WLAN SIB changes, notifying a change of the WLAN SIB to the terminal by using a specific scheduling identifier indicating the change of the WLAN SIB.

Here, the method may further comprise receiving a control message instructing to try to scan a WLAN AP from the terminal; and activating at least one WLAN AP which the terminal can connect in response to the control message instructing to try to scan a WLAN AP.

Here, the measurement result information may include at least one of a Received Signal Strength Indicator (RSSI), a Signal-to-Interference Ratio (SIR), a bit energy/noise power (EbNo), a Receive Channel Power Indicator (RCPI), and a Receive Signal to Noise Indicator (RSNI).

Here, the control message indicating the offloading may include at least one of identification information of a specific WLAN AP, identifier information of an offloading target service, and timing information on a start of an offloading.

Here, the method may further comprise requesting a report on whether to support an offloading function using a WLAN AP to the terminal; and receiving information on whether to support the offloading function from the terminal.

Also, in order to achieve another purpose of the present invention, a method supporting multiple connectivity, performed in a terminal, according to still another aspect of the present invention may comprise measuring, by the terminal, signals transmitted from at least one cell based on a preconfigured measurement condition; and trying to camp on a specific cell based on a result of the measurement, wherein the terminal does not try to camp on a cell which does not transmit a synchronization signal or transmits only a signal for detection of the cell intermittently.

Here, in the measuring the signals transmitted from at least one cell, the terminal may perform measurements according to cell priority information received from a base station connection of which is released at a time of the release of the connection.

Here, the method may further comprise configuring a measurement report message by sorting results of measurements performed based on the cell priority information; and transmitting the measurement report message.

Also, in order to achieve another purpose of the present invention, a method supporting multiple connectivity, performed in a first base station providing multiple connectivity to a terminal with a second base station, according to still another aspect of the present invention may comprise configuring information for aligning downlink synchronizations of the first base station and the second base station; and transmitting Discontinuous Reception (DRX) operation configuration information including the information for aligning downlink synchronizations to the terminal.

Here, the information for aligning downlink synchronizations may include at least one of information on a difference between a System Frame Number (SFN) of the first base station and a SFN of the second base station and information on a difference between a downlink synchronization of the first base station and a downlink synchronization of the second base station.

Here, the information for aligning downlink synchronizations may be information configured for the terminal to operate according to DRX parameters of the first base station.

Here, the information for aligning downlink synchronizations may include information on at least one of long DRX cycle parameters and short DRX cycle parameters.

Here, the information for aligning downlink synchronizations may include DRX parameters configured by the first base station and DRX parameters configured by the second base station, and all or part of the DRX parameters configured by the first base station and the second base station are different.

Here, one of a DRX cycle configured by the first base station and a DRX cycle configured by the second base station may be configured to be a multiple of the other.

Here, the DRX parameters configured by the first base station and the DRX parameters configured by the second base station may respectively include information on a start point of an on-duration.

Here, the DRX parameters configured by the first base station may be configured so that a start point and an end point of an on-duration of the second base station are included within an on-duration of the first base station, so that only the start point of the on-duration of the second base station is included within the on-duration of the first base station, or so that only the end point of the on-duration of the second base station is included within the on-duration of the first base station.

Here, a timer value for determining whether an uplink synchronization is maintained or not, among the DRX parameters configured by the first base station and the DRX parameters configured by the second base station, may be configured so that the terminal operates according to a timer value configured by the first base station.

Here, when the multiple connectivity is configured for the terminal, the first base station may provide the second base station with at least one of reference information corresponding to capability of the terminal for configuration of DRX parameters, guide line information, information on maximum values of DRX parameters, and information on minimum values of DRX parameters.

Advantageous Effects

According to the control methods for supporting multiple connectivity in a mobile communication system, a terminal can configure multiple connections with multiple base stations, or perform and maintain, with different base stations, connection configuration of a control plane through which control signals are exchanged and that of a data plane through which data is exchanged, whereby inefficient resource allocation, connection management, and mobility management, which can occur when the terminal is serviced by a single base station or the terminal maintains connection configuration for exchange of control signal and data with the single base station, can be enhanced.

Therefore, performance of the mobile communication system can be enhanced, and resource allocation and power consumption of the terminal can be reduced.

DESCRIPTION OF DRAWINGS

FIGS. 3A to 3C illustrate examples of radio protocol structures for configuring a local access mobile network using small base stations.

FIG. 5 is a message sequence chart illustrating an example of procedures of message transmission and reception among a terminal, a macro base station, and a small base station for multiple connectivity configuration.

FIG. 6 is a message sequence chart illustrating an example of message exchange procedure among a terminal, a macro base station, and a small base station.

FIG. 7 is a message sequence chart illustrating an example of a message exchange procedure and a multiple connectivity release procedure between a terminal and base stations which maintain multiple connectivity.

FIG. 8 illustrates an example of a RRCConnectionReconfiguration message for configuration or release of multiple connectivity.

FIG. 9 illustrates an example of 'mobilityControlInfo' information element representing change of a primary base station in multiple connectivity configuration.

FIG. 10 illustrates an example of 'RRCConnectionReconfigurationComplete' message for reporting completion of multiple connectivity configuration or release procedure of a terminal.

FIG. 11 is a message sequence chart illustrating an example of a procedure for performing handover.

FIG. 21 illustrates an example of a control message 'RadioResourceConfigDedicated' for configuring dedicated radio resources.

FIG. 22 illustrates an example of logicalChannelConfig IE' in a control message for configuring dedicated radio resources.

BEST MODE

Figure 1:
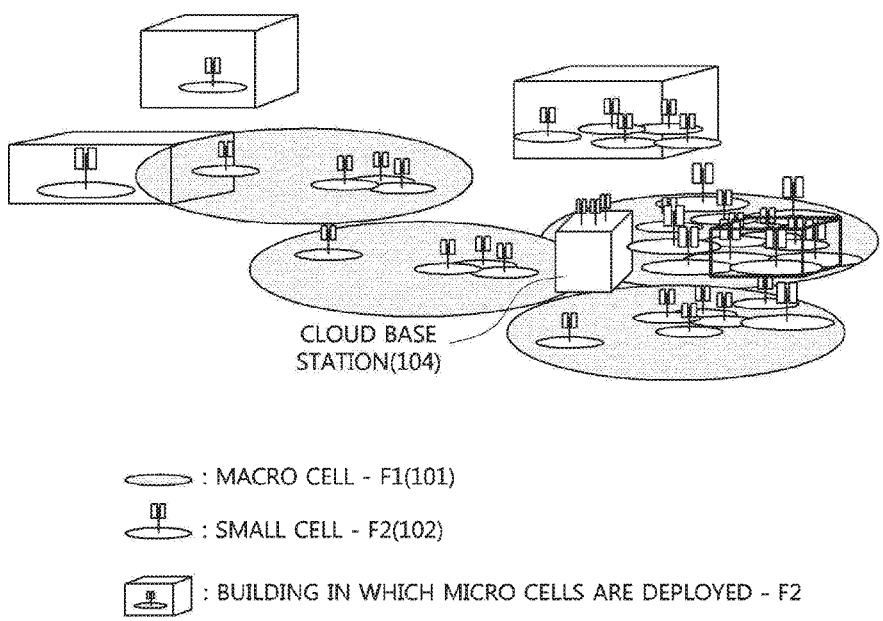
FIG. 1 illustrates a configuration example of a local access mobile network which can be configured by using a small cell base station.

While the present invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the related art and will not be interpreted in an idealized or overly formal sense unless expressly so defined herein.

The term "terminal" used herein may be referred to as a mobile station (MS), UE, user terminal (UT), wireless terminal, access terminal (AT), subscriber unit, subscriber station (SS), wireless device, wireless communication device, wireless transmit/receive unit (WTRU), mobile node, mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited thereto.

The term "base station" used herein generally denotes a fixed or mobile point that communicates with a terminal, and may be referred to as a Node-B, evolved Node-B (eNB), base transceiver system (BTS), access point, relay, femto-cell, and other terms.

Hereinafter, preferred embodiments of the present invention will be described in more detail with reference to the accompanying drawings. To facilitate the entire understanding of the invention, the same reference numerals in the drawings denote the same elements, and repetitive description of the same elements is omitted.

<A Protocol Structure for a Network Environment Having a Non-Ideal Backhaul and a Method for Improving Protocol Procedures>

FIG. 1 illustrates a configuration example of a local access mobile network which can be configured by using a small cell base station.

As shown in FIG. 1, the local access mobile network which can be configured by using a small cell base station may be configured as a hierarchical cell network in which various types of cells exist.

That is, the local access mobile network may be configured by using at least one macro base station (or, a macro cell) 101 having a large service area and at least one small base station (or, a small cell) 102 in a micro layer having a relatively smaller service area. In FIG. 1, the macro cells may be managed by a cloud base station 104.

A frequency band (F1) used by the at least one macro base station 101 and a frequency band (F2) used by the at least one small base station 102 may be identical or different. The small base station 102 in the micro layer may be deployed in an environment where the macro base station exists, or may be independently deployed in an environment where the macro base station does not exist.

Both an ideal backhaul and a non-ideal backhaul may be considered for connections between a network, the macro base station (or, the macro cell), and the small base station (or, the small cell). The ideal backhaul may provide point-to-point connections having a high throughput and a low latency property via a dedicated line such as an optical fiber or a Line-of-Sight (LoS) ultra-high frequency wave. However, the non-ideal backhaul means a conventional backhaul configured as a wired or wireless network having a limited throughput and a high latency property, such as a x-Digital Subscriber Line (x-DSL), a Non Line-of-Sight (NLoS) ultra-high frequency wave, a relay, etc. Thus, the non-ideal backhaul has properties of a high latency and a limited transmission speed.

In a case that the local access network is configured using small base stations (or, small cells), there may be advantages that services can be efficiently provided by using low power nodes such as small base stations in an indoor or outdoor hotspot area. Here, the low power node means a node having a lower transmission power as compared to a macro node and a base station (BS) class. For example, the low power node may include a pico base station, a femto base station, etc.

A base station or an enhance Node B (eNB) means a node having a Radio Resource Control (RRC) function in the mobile communication network. Each base station or each eNB may construct one or more cells (or, sectors). For example, when a base station or an eNB supports a Carrier Aggregation (CA) function using two or more component carriers (CC), each of the component carriers may operate as a cell. In the following descriptions, a term 'base station' may be used for both an eNB and a cell in the LTE system, and the eNB and the cell are discriminated only when necessary. That is, in case that they are not described as specially discriminated, a base station means an eNB constituting one or more cells. In this case, the eNB may mean a node which has a RRC function and interfaces with a gateway (GW) or a Mobile Management Entity (MME).

In the present invention, additional functions and technical issues of a Long Term Evolution (LTE) system and/or a LTE-Advanced (LTE-A) system, for enhancing performances in indoor and/or outdoor hot spot areas by using low power nodes, are explained.

Deployments scenarios for a local access mobile network may be configured according to a frequency band (F1) of a macro base station and a frequency band (F2) of a small base station as shown in the following table 1. Also, a duplexing manner (FDD or TDD) may be additionally considered. The table 1 represents deployment scenario examples of a local access mobile network according to frequency management.

Each layer of the local access mobile network may support an independent CA function by using a plurality of component carriers (CC).

TABLE 1

| | Frequency | | |
|---|---|---|---|
| | F1 | F2 | Notes |
| Different frequency bands | Frequency Band1 (CC1, CC2, CC3) | Frequency Band2 (CC4, CC5, CC6) | Using different legacy frequency bands |
| Introducing a new frequency band | Frequency Band1 (CC1, CC2, CC3) | New Frequency band (CC10, CC11, CC12) | New frequency band is applied to a small cell base station |
| Same frequency bands | Frequency Band1 (CC1, CC2, CC3) | Frequency Band1 (CC1, CC2, CC3) | Using the same legacy frequency band |

As a technique for providing services by using a plurality of cells or frequencies in the 3GPP LTE and/or LTE-A system, a CA or a Coordinated Multi-point transmission and reception (CoMP) is available. Such the technique enhances transmission throughput and user performance at cell edge. In the conventional LTE and/or LTE-A system, the CA or CoMP technique was applied to only intra-eNB cell case or transmission points having very small transmission latency in a backhaul.

In order to enhance a transmission speed of a system, a mobility performance, and a low power consumption operation, a method of using an inter-eNB or inter-site CA or CoMP technique in the hierarchical cell environment comprising macro station and small base station and a method of introducing the inter-eNB or inter-site CA/CoMP technique in consideration of non-ideal backhaul networks as well as ideal backhauls are demanded.

An example of management on a macro layer frequency (F1) and a local node layer frequency (F2) in a local access mobile network configured using small base stations is shown in the table 1.

Figure 2:
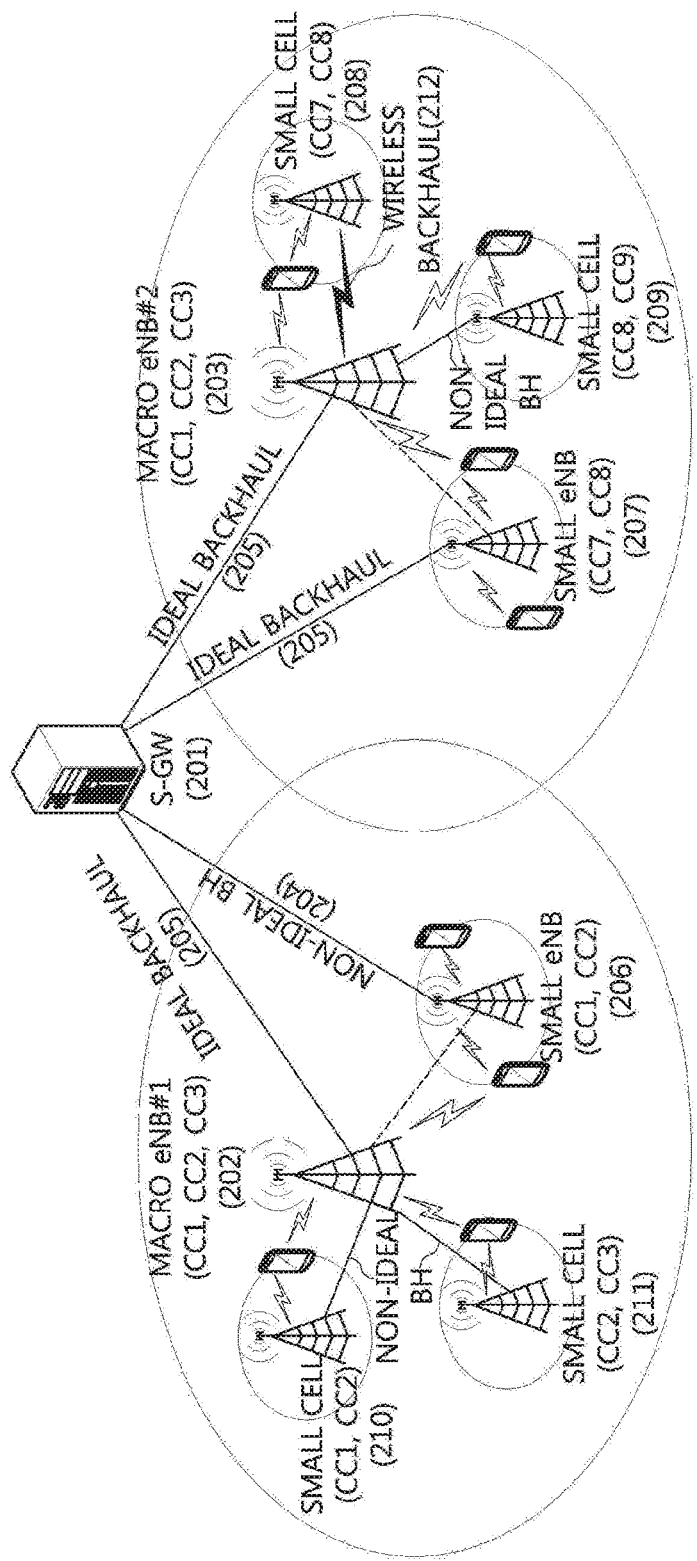
FIG. 2 illustrates a configuration example of a local access mobile network in a non-ideal backhaul environment.

FIG. 2 illustrates a configuration example of a local access mobile network in a non-ideal backhaul environment.

The local access mobile network in the non-ideal backhaul environment may be configured by using a conventional frequency band as shown in FIG. 2.

Referring to FIG. 2, a macro eNB#1 202 may configure small cells 210 and 211 and a small eNB 206 in a macro layer and a local node layer to use the same frequency bands (CC1, CC2, CC3). A macro eNB#2 203 may configure frequencies (CC1, CC2, CC3) in a macro layer differently from frequencies of small cells 208 and 209 and a small eNB 207 in a local node layer (CC7, CC8, CC9).

In the non-ideal backhaul environment, the non-ideal backhaul based inter-site CA considering small cells and small eNBs within a service area of the macro base station may be taken into account. Here, the small eNB should be able to provide independent services for terminals maintaining a single connection with the small base station as well as dual-connectivity terminals. Thus, the small base station is configured to have independent layer-2/layer-3 radio protocols and to maintain a S1 interface with a serving gateway (S-GW). The small base station for supporting multiple connectivity means a base station supporting a separate RRC function or a partial RRC function.

The small base station may have a direct interface to a S-GW 201 through a non-ideal backhaul 204 as the S1 interface to the S-GW 201 (i.e. a case of a small eNB 206). Also, the small base station may have a direct interface to the S-GW 201 through an ideal backhaul 205 (i.e. a case of a small eNB 207). Also, the small base station may have an indirect interface to the S-GW 201 via a macro base station 202 or 203 (i.e. cases of small cells 210, 211, and 209). Also, the small base station may maintain an interface to the S-GW 201 by using a wireless backhaul 212 via a macro base station 203 (i.e. a case of a small eNB 208).

<Multiple Connectivity Function Support Based on Small Base Station>

Background and Objective of Small Base Station Based Multiple Connectivity Function As shown in FIG. 1 and FIG. 2, a small base station based technology enhances mobility functions of terminals and transmission throughput per unit area of a system or a user by deploying small base stations (or, small area base stations) having relatively smaller service areas within a large service area of a macro base station (or, a large area base station).

The frequency band (F1) of a macro base station and the frequency band (F2) of a small base station in a local layer may be the same frequency band or different frequency bands. A small base station in a micro layer may be deployed in an environment where a macro base station exists, or may be deployed independently in an environment where a service area of a macro base station does not exist and only small base stations are deployed.

A dual connectivity technique in which a terminal simultaneously maintains connections with a macro base station and a small base station based on a small base station technology may achieve increase of transmission throughput and enhancement of terminal power consumption. Also, the dual connectivity makes it possible to prevent frequent handovers occurring when only a single connection with a small base station is used by maintaining a connection with a macro base station, and to reduce failures of in-bound handover or out-bound handover between a macro base station and a small base station.

In order to support a dual connectivity function based on a small base station technology, an environment in which a macro base station and a small base station use the same frequency band (a co-channel environment) (F1=F2) and an environment in which a macro base station and a small cell base station use different frequency bands (F1≠F2) may be taken into account.

Also, in the discussions on the small base station technology, the non-ideal backhaul means cases except a case in which Remote Radio Heads (RRH) or Radio and analog processing Units (RU) are connected through optical fibers to which Common Public Radio Interface (CPRI) is applied, and the dual connectivity should consider both an intra-eNB case and an inter-eNB case. Also, the following parameters should be considered in the dual connectivity.

System throughput (capacity)
Per-user throughput
Packet delay spikes (e.g. delay due to mobility)
mobility performance metrics (Handover Failure (HOF)/ Radio Link Failure (RLF), Time of Stay (ToS))
UE power consumption
Network signaling overhead, load
Function Division Between a Macro Cell and a Small Base Station A local access mobile network may make more efficient traffic offloading and mobility control by enhancing signaling procedures between a macro base station and a small base station. For efficient traffic offloading, a protocol structure enhancement in a control-plane aspect and a user-plane aspect (or, a traffic data-plane) may be taken into account.

A below table 2 represents an example of radio protocol configurations of a local access mobile network. Also, FIGS. 3A to 3C illustrate examples of radio protocol structures for configuring a local access mobile network using small base stations.

Methods for configuring a radio protocol between a macro node and a local node may be considered as shown in the table 2. The radio protocol configuration according to each method shown in the table 2 may be shown in FIGS. 3A to 3C.

Figure 3C:
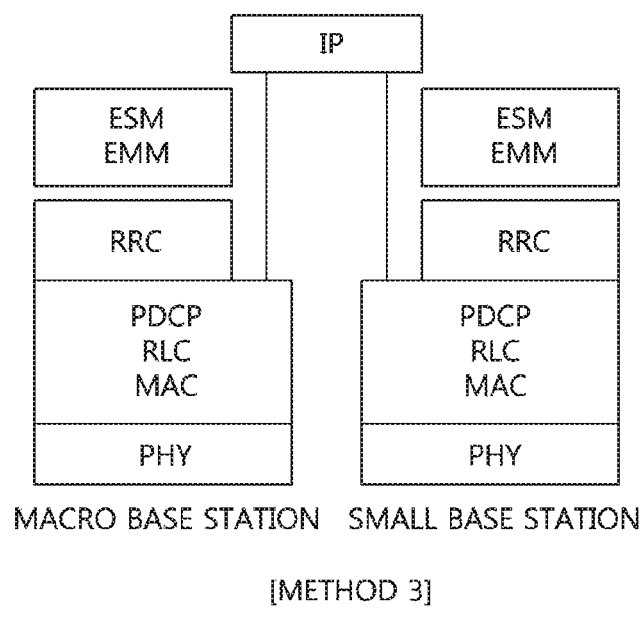

The radio protocol structures illustrated in FIGS. 3A to 3C focus upon RRC functions in the control plane, and functions of a RLC layer and a MAC layer including a PDCP may be configured differently from cases illustrated in FIGS. 3A to 3C. For example, PDCP functions according to the methods 1 and 2 of FIGS. 3A and 3B may operate as located only at the macro base station. Alternatively, each of the macro base station and the small base station may be configured to perform an independent PDCP function.

TABLE 2

| | Radio protocol configuration |
|---|---|
| Method 1 | Both control plane and user plane are configured in a macro base station, and only user plane is configured in a small eNB/cell. |
| Method 2 | Both control plane and user plane are configured in a macro base station, and only user plane and a part of control plane are configured in a small base station. |
| Method 3 | Both control plane and user plane are configured in a macro base station and a small base station. |

In a case that a macro base station takes full charge of configuration of a control plane as shown in the method 1, the macro base station may be fully responsible for connection establishment/modification/release of a radio bearer, measurement/report, mobility control, etc. for UE. Also, a small base station may concentrate on user traffic transmission. For example, in the method 1 of configuring a protocol structure illustrated in FIG. 3A, a signaling radio bearer (SRB) may be configured to correspond to only the macro base station, and a data radio bearer (DRB) may be configured to correspond to both the macro base station and the small base station.

In order for a cell of a small base station to support a multi-connectivity (or, inter-site CA) UE (terminal), all information on RRC connection configuration of the small base station (eNB) to which the cell belongs, for example, CSI/Physical Resource Block (PRB)/SRS allocation information and Physical Uplink Control Channel (PUCCH) allocation information, should be transferred to a RRC of the macro base station. The reason is that PUCCH resources of the macro base station and small base station should be respectively allocated to the multiple connectivity terminal, and the multiple connectivity terminal should transmit PUCCH respectively to the macro base station and small base station.

Also, as described above, when a base station (or, eNB) supports a CA by using two or more component carriers, each of the component carriers may operate as a cell. Like this, when a small base station supports an intra-eNB CA, only a representative cell among cells of the small base station may be allocated a PUCCH resource. That is, a specific cell among the cells of the small base station supporting the intra-eNB CA may be designated, and the designated cell may be controlled to be allocated a PUCCH resource and to transmit uplink physical layer control information through the PUCCH resource.

In case that user traffic is transferred through the data bearer of the small base station, layer-2 functions (PDCP, RLC, and MAC) of the small base station may be used. Primitives may be transferred between a RRC of the macro base station and a PHY layer and L2 sub-layers of the small base station through a non-ideal backhaul by defining a new interface between the macro base station and the small base station. Also, related parameters may be transferred during configuration of multiple connectivity. For example, the new interface (hereinafter, referred to as 'Xs interface') may be defined based on X2 interface which is a conventional inter-eNB interface.

The Xs interface is an interface between the macro base station and the small base station for control message forwarding or data forwarding. The Xs interface may be configured by using ideal or non-ideal backhaul link, as described above. Also, a wired or wireless backhaul (refer to 212 of FIG. 2) may be used.

When the method 1 is applied, in a control plane aspect of the macro base station and the small base station, in order to transfer resource allocation information, all of the allocation information should be transferred to a counterpart base station every time when multiple connectivity (or, inter-site CA) between the base stations is configured. That is, resource allocation information for terminals receiving services only from the small base station should also be known to the RRC of the macro base station. A small base station can provide services to a terminal ('single connectivity terminal') which is serviced by only the small base station and a terminal ('multiple connectivity terminal') which is serviced by both the macro and small base station. Thus, in case of the method 1, when radio resources for multiple connectivity are configured, the small base station may transfer information on radio resources allocated or configured for the single connectivity terminals connected with the small base station, and accordingly the macro base station can efficiently configure radio resources of the small base station for the multiple connectivity terminals without collision or redundancy with already-allocated radio resources. For this, every time when multiple connectivity is configured, CSI/DM-RS/SRS/PUCCH resource allocation information and PRB information of the small base station should be transferred to the RRC of the macro base station.

A table 3 describes RRC function division for the macro base station and the small base station when the method 1 is applied. In the table 3, 'O' indicates that the corresponding function is available.

TABLE 3

|  | Macro eNB | Small eNB | Note |
|---|---|---|---|
| System Information Block (SIB) related to Non-Access Stratum (NAS) | O | | |
| SIB related to Access Stratum (AS) Common channel configuration information Including Earthquake and Tsunami Warning (ETWS) notification, Commercial Mobile Alert Service (CMAS) notification | O | | |
| Paging | O | | |
| RRC configuration/maintaining/release | O | | |
| Cell-Radio Network Temporary Identity (C-RNTI) allocation SRB1/2 Access class barring | | | |
| Security AS integrity protection (SRBs) AS ciphering (SRBs, DRBs) | O | | |
| P-to-P RB(DRB) configuration/maintaining/release | O | | |
| RRC connection mobility Handover (security handling) RRC context transfer at Handover | O | | |
| Radio configuration control Assignment/modification of Automatic Repeat request (ARQ) configuration Hybrid ARQ (HARQ) configuration Discontinuous Reception (DRX) configuration | O | | |
| For CA cell management PCell (primary cell) change Addition/Change/Release of SCell (secondary cell) Addition/Change/Release of secondary Timing Advance Group (TAG) | O | | |
| QoS management function DL/UL Semi-Persistent-Scheduling (SPS) configuration information allocation/change UL assignment/modification of parameters for UL rate control in the UE (PBR: Prioritized bit rate) | O | | |
| Recovery from radio link failure | O | | |
| UE measurement configuration and reporting Measurement configuration/change/release Measurement gap setup/release Measurement report | O | | |
| Support of measurement logging and reporting for network performance optimization | O | | |
| Multimedia Broadcast and Multicast Service (MBMS) notification | O | | |
| MBMS Radio Bearer (RB) configuration/maintaining/release | O | | |
| NAS direct message transfer | O | | |

The following two solutions may be considered as the method for transferring CSI/DM-RS/SRS/PUCCH resource allocation information and PRB information of the small base station to the RRC of the macro base station every time when multiple connectivity is configured. Here, a DM-RS may mean a UE-specific reference signal which can be utilized for coherent demodulation of data.

Using X2 interface between eNBs: defining a new message or defining a new field in the existing message Introducing a new Xs interface for delivery of primitives and messages between RRC of a macro base station and PHY layer and L2 sub-layers of a small base station.

The following issues should be considered for a method for transferring primitives between RRC of a macro base station and PHY layer and L2 sub-layers of a small base station.

transmission delay of CSI measurement report, etc.

Also, in a user plane aspect, the following solutions may be considered as a method for transferring user traffic.

A method of connecting a data bearer

It is possible to transfer user traffic to a small base station via a macro base station by using the Xs interface, or to transfer user traffic directly to a small base station.

Mapping a data radio bearer (DRB) to a site (a macro base station or a small base station) according to a connection service A mapping method may be determined according to data size or service property.

For example, a real time service such as a voice service, etc. or small data transmission may be served through a connection with a macro base station.

For example, a non-real time service or large data transmission may be served through a connection with a small base station.

According to the method 1, even when RRC of a macro base station configures radio resources for a small base station by using a RRC reconfiguration control message instead of RRC of the small base station, a dynamic scheduling which uses a scheduling identifier (e.g. Semi Persistent Scheduling (SPS)-RNTI, C-RNTI, etc.) in a MAC layer may be respectively by the macro base station and the small base station. In this case, since a terminal measures CSI or CQI for each base station and reports it to each base station, a problem of a report delay, that the small base station should transfer a measurement report received from the terminal to the macro base station for dynamic scheduling, may not occur. Also, for static or semi-static management and control of multiple connectivity according to radio channel status, load status, etc. of the small base station, the measurement result of the small base station may be transferred to the macro base station. Also, when necessary, a multiple connectivity terminal may directly report a measurement result such as CQI, CSI, etc. on the small base station to the macro base station by using uplink radio resources of the macro base station according to multiple connectivity configuration or indication of a base station.

In the method 1, a method in which a RRC message generated by the macro base station is transferred to the small base station and the small base station transfers it to a multiple connectivity terminal, and a method in which the RRC message is directly transmitted from the macro base station to the multiple connectivity terminal are possible. However, when the RRC message is transferred from the small base station, since the small base station did not generate a RRC function for the multiple connectivity terminal, a SRB may not be configured in the small base station. Thus, in order to support multiple connectivity function, a dedicated bearer for transferring a RRC message or other signaling messages between the small base station and the terminal may be configured so that control messages can be transferred or exchanges between the small base station and the multiple connectivity terminal through the dedicated bearer. Especially, a dedicated signaling bearer or a dedicated logical channel, for transferring control messages for supporting uplink or downlink RLC functions or MAC functions between the small base station which does not perform RRC functions for a multiple connectivity terminal and the multiple connectivity terminal, may be configured and managed. In this case, the multiple connectivity terminal may transmit a RRC control message to the macro base station through a conventional signaling radio bearer (SRB), and may transmit a RRC control message and a control message for supporting RLC functions or MAC functions by using a dedicated bearer for multiple connectivity function support or a dedicated logical channel to which a logic channel identifier is assigned. Especially, in order for the small base station to transfer system information of the small base station to the multiple connectivity terminal, the above-described dedicated bearer or dedicated logical channel may be used. That is, even when system information of the small base station supporting multiple connectivity function changes, the multiple connectivity terminal may receive the changed system information from the macro base station or the small base station through the dedicated signaling channel.

In the method 1, even when a RRC entity for the multiple connectivity terminal does not exist in the small base station, it can be assumed that a RRC connection is configured, and so a RRC control message for generating a conventional signaling radio bearer (SRB) and a control message for controlling RLC functions and MAC functions may be transferred to the multiple connectivity terminal. In this case, a conventional signaling radio bearer may be selectively generated and managed among SRB0, SRB1, and SRB2. For example, in order to support multiple connectivity function, the small base station and the multiple connectivity terminal may configure only a SRB2 to which ciphering and integrity protection are applied for the RRC message. Here, a security key or an integrity key for the ciphering and integrity protection may be generated from a security key of the macro base station or a security key of the small base station. However, it is a more efficient way that the security key of the macro base station is used for decreasing complexity of a terminal.

In a case that both a macro base station and a small base station have RRC functions and RRC functions are divided for the macro and small base stations according to the method 2, a case, in which a master-RRC (or, a 'M-RRC') of the macro base station is configured to take charge of Radio Resource Measurement (RRM) and measurement reporting, mobility control, etc., and a slave-RRC (or, a secondary RRC or a 'S-RRC') of the small base station is configured to take charge of configuration/change/release of radio bearers, may be considered. In this case, in the protocol structure illustrated in FIG. 3B, a SRB and a DRB may be configured to correspond to both the macro base station and the small base station.

Thus, although RRC functions are divided for the M-RRC and s-RRC, it is more efficient that RRC context information is stored and managed by only the M-RRC.

In order for a cell in the small base station to support an inter-site CA UE, some information for configuration of s-RRC connection may be transferred to the M-RRC of the macro base station. When user traffic is transferred to a data bearer of the local layer node, layer-2 functions (PDCP, RLC, and MAC) in the small base station may be used.

In the method 2, function division for the M-RRC and the S-RRC may be shown in a table 4. In the table 4, 'O' indicates that a corresponding function is available, and 'Δ' indicates that a corresponding function is selectively available, and 'X' indicates that a corresponding function is not available. As shown in the table 4, for s-RRC functions under management of the M-RRC, their parameter may be selectively configured, or some of the functions may be restricted to be used.

TABLE 4

| | M-RRC | S-RRC | Note |
|---|---|---|---|
| SIB related to NAS | O | | |
| SIB related to AS Common channel configuration information Including ETWS notification and CMAS notification | O | Δ | All or part of s-RRC SIB may be transmitted to the corresponding UE through a dedicated control message |
| Paging | O | | |
| RRC configuration/maintaining/release | O | | Separate C-RNTI may be allocated for each base station, or the same C-RNTI may be used for base stations |
| C-RNTI allocation | | Δ | |
| SRB1/2 | | Δ | |
| Access class barring | | O | |
| Security AS integrity protection (SRBs) AS ciphering (SRBs, DRBs) | O | | |

TABLE 4-continued

| | M-RRC | S-RRC | Note |
|---|---|---|---|
| DRB configuration/maintaining/release | ○ | Δ | DRB configuration/mainlining/release may be selectively performed under management of M-RRC |
| RRC connection mobility | ○ | | |
| Handover (security handling) | | | |
| RRC context transfer at Handover | | | |
| Radio configuration control | ○ | | A single parameter set is managed by UE for DRX configuration |
| Assignment/modification of ARQ configuration | | ○ | |
| HARQ configuration | | ○ | |
| DRX configuration | | X | |
| For CA cell management | ○ | | CA parameters may be selectively configured under management of M-RRC |
| PCell change | | X | |
| Addition/Change/Release of SCell(s) | | Δ | |
| Addition/Change/Release of secondary TAG(s) | | Δ | |
| QoS management function | ○ | Δ | QoS parameters may be selectively configured under management of M-RRC |
| DL/UL SPS configuration information allocation/change | | | |
| UL assignment/modification of parameters for UL rate control in the UE (PBR) | | | |
| Recovery from radio link failure | ○ | ○ | |
| UE measurement configuration and reporting | | ○ | A case that F1 ≠ F2 |
| Measurement configuration/change/release | | Δ | |
| Measurement gap setup/release | | X | |
| Measurement report | | Δ | |
| Support of measurement logging and reporting for network performance optimization | ○ | ○ | |
| MBMS service notification | ○ | ○ | |
| MBMS RB configuration/maintaining/release | ○ | ○ | |
| NAS direct message transfer | ○ | ○ | |

When the method 2 is applied, as a method for transferring a signaling message between the RRCs, a new message using the X2 interface between eNBs may be defined or a new field may be defined in the existing message. Also, a new Xs interface for transferring messages between the M-RRC of the macro base station and the S-RRC of the small base station may be defined for transfer of the related control messages.

A method for transferring traffic in the user plane may be configured identically to the method 1.

The method 3 is a method in which RRC functions exist for each of the macro base station and the small base station and each of the base stations perform RRC functions. That is, a RRC of each node may respectively perform configuration/change/release of a radio bearer, measurement/report, mobility control, etc. for UE.

Thus, each node may control allocation of radio resources for it. Also, in the case of the method 3, data traffic switching may be performed in a S-GW, or each node may determine and transfer the data traffic.

Also, for the method 3, the macro base station and the small base station may share a single C-RNTI, or each of the base stations may have its C-RNTI separately. Here, the C-RNTI may mean a scheduling identifier or a terminal identifier which is used for discriminating a specific UE or a plurality of UEs in order to perform resource allocation. SPS-RNTI is a scheduling identifier uniquely assigned to a UE in a cell for Semi-Persistence Scheduling (SPS).

When multiple a connection function is supported according to the method 3, two S1 interfaces should be maintained between the base stations and a gateway. Also, although each base station can manage its RRC context for a multiple connectivity UE, it is more efficient that RRC contexts are managed by a single base station as integrated. For example, the conventional method, in which only a PCell manages RRC contexts when a CA function is applied, may be applied. Thus, even when the method 3 is applied, the macro base station may perform mobility management and determination, and accordingly control messages or signaling messages for mobility management between base stations may be introduced. However, even for the method 3, a C-RNTI or configuration of DRX-parameters for the multiple connectivity UE may be determined through negotiation based on control messages exchanged between the base stations at the time of configuration of the multiple connectivity.

Also, even when the method 3 is applied, it is possible that only the following essential information is shared by the base stations for the multiple connectivity UE (or, inter-site CA UE).

Identifier of the multiple connectivity UE (or, inter-site CA UE) (C-RNTI or Temporary Mobile Subscriber Identity (TMSI))

Information on configured SRB/DRB of the multiple connectivity UE

DRX parameters of the multiple connectivity UE

When the method 3 is applied, a RRC function division for the macro base station and the small base station may be configured as shown in a table 5. In the table 5, 'O' indicates that a corresponding function is available, and 'Δ' indicates that a corresponding function is selectively available, and 'X' indicates that a corresponding function is not available.

TABLE 5

| | Macro base station | Small base station | Note |
|---|---|---|---|
| SIB related to NAS | ○ | ○ | |
| SIB related to AS | ○ | ○ | |
| Common channel configuration information Including ETWS notification and CMAS notification | | | |
| Paging | ○ | ○ | |
| RRC configuration/maintaining/release | ○ | ○ | |
| C-RNTI allocation | | | |
| SRB1/2 | | | |
| Access class barring | | | |
| Security | ○ | ○ | |
| AS integrity protection (SRBs) | | | |
| AS ciphering (SRBs, DRBs) | | | |
| P-to-P RB (DRB) configuration/maintaining/release | ○ | ○ | |
| RRC connection mobility | ○ | | |
| Handover (security handling) | | | |
| RRC context transfer at Handover | | | |
| Radio configuration control | ○ | ○ | |
| Assignment/modification of ARQ configuration | | | |
| HARQ configuration | | | |
| DRX configuration | | | |
| For CA cell management | ○ | | |
| PCell change | | X | |
| Addition/Change/Release of SCell(s) | | ○ | |
| Addition/Change/Release of secondary TAG(s) | | Δ | |
| QoS management function | ○ | ○ | |
| DL/UL SPS configuration information allocation/change | | | |
| UL assignment/modification of parameters for UL rate control in the UE (PBR) | | | |
| Recovery from radio link failure | ○ | ○ | |
| UE measurement configuration and reporting | ○ | ○ | MeasConfig (MeasId, measObject) management |
| Measurement configuration/change/release | | | |
| Measurement gap setup/release | | | |
| Measurement report | | | |
| Support of measurement logging and reporting for network performance optimization | ○ | ○ | |
| MBMS service notification | ○ | ○ | |
| MBMS RB configuration/maintaining/release | ○ | ○ | |
| NAS direct message transfer | ○ | ○ | |

When the method 3 is applied, in order to transfer traffic in the user plane, a method in which a function such as a traffic data switching is introduced and a path switching is performed by using the function in a S-GW according to a DRB connected to each node and a method in which the traffic is transferred to other node or directly transferred to the UE according to a DRB connected to each node may be used.

The followings should be considered in methods and procedures of configuring RRC functions and transferring user data according to the above-described methods 1 to 3 for supporting multiple connectivity function.
    Criteria and Method for Determining a Main Node
    Terminal Capability
    Terminal moving speed
    Connection service property of terminal
    Latency, jitter variance, packet size, etc.
    load status of each node
    HARQ of Downlink Transmission Data
    Method 1: Allocating PUCCH resources for each node (macro, small) and each node performing HARQ
        In case of Method 1 (or, Method 2), PUCCH resources for all nodes are allocated to one node (e.g. the macro base station).
    Method 3: Performing independent HAQR operation
    HARQ of Uplink Transmission Data
    Method 1, Method 2: Transmitting Physical hybrid-ARQ indicator channel (PHICH) in a single node (macro or small), and only the single node performing HARQ operation
    Method 3: Performing independent HAQR operation
    It is preferred that a cross-layer scheduling in which the macro base station (or, the small base station) allocates resources for the small base station (or, the macro base station) is not allowed. That is, the cross-layer scheduling may be considered only in case of ideal backhaul. Here, the resource allocation may be dynamic resource allocation using Physical Downlink Control Channel (PDCCH) or enhanced Physical Downlink Control Channel (ePDCCH).
    Considerations in Downlink Scheduling
        when a cross-layer scheduling is performed, a problem of CSI report reliability degradation due to CSI report latency should be overcome.
    Uplink Scheduling
        when a cross-layer scheduling is performed, a problem of SRS measurement report reliability degradation due to delay in SRS measurement report delivery between nodes should be overcome.
    Relation and priority between PCells in a CA environment comprising a macro base station and a small base station Allowing a Cross-Layer Scheduling Between UP Nodes Configuration procedures for multiple connectivity may be different according to the above-described radio protocol structures for multiple connectivity.

First, multiple connectivity configuration procedures for the method 1 (a case that a macro base station configures control plane and user plane and a small base station configures only user plane) and the method 2 (a case that a macro base station configures control plane and user plane and a small base station configures user plane and some of control plane functions) will be explained.

The above-described RRC function divisions considering the methods 1 to 3 are only examples for a case that current RRC functions are used without modification.

In order to support the multiple connectivity function, respective functions and operation procedures in the methods 1 to 3 may be used as combined selectively, through the role division of the macro base station and the small base station, introduction of new functions or new control messages between base stations, and signaling with a terminal. For example, when a structure of control plane for multiple connectivity is configured based on the method 1 or the method 2, in connection with 'RRC configuration/maintain/release' among the above-described RRC functions, a macro base station takes charge of a SRB management, and each of the macro base station and the small base station respectively allocates a scheduling identifier (e.g. C-RNTI) to a multiple connectivity terminal, whereby each base station can transmit scheduling information discriminatively. Also, in connection with 'CA cell management', although cell configuration for supporting CA function is managed respectively by the macro base station and the small base station, PCell change in the base station supporting CA function can be controlled by only the macro base station in aspect of multiple connectivity function support. Like this, in the support of multiple connectivity function, a macro base station having a relatively larger service area may be configured to act as a master base station which is responsible for a control plane including mobility management and transfers user data by using a user plane. Also, a small base station having a relatively smaller service area may be configured to act as a secondary base station which is responsible for the user plane and provides radio resources for transferring the user data.

First, if a terminal maintaining a connection with either a macro base station or a small base station determines that configuration of multiple connectivity is necessary with no regard to a radio protocol structure, it may transmit a control message requesting configuration of multiple connectivity to a base station. Also, separately from the request of the terminal, if a base station determines that configuration of multiple connectivity is necessary for the terminal to which services are provided, the base station may transmit a control message for configuring multiple connectivity to the corresponding terminal. In the case, the base station may determine whether to configure multiple connectivity based on measurement results of adjacent cells measured and reported by the terminal, information monitored, gathered, estimated, or measured by the base station, capability of the terminal, mobility state of the terminal, property of the service being provided (e.g. latency, jitter variance, packet size, etc.), load states of the adjacent cells (or, nodes), etc.

A final determination on whether to configure multiple connectivity may be made in a network. Thus, even if the terminal requests configuration of multiple connectivity, the terminal can be configured to maintain only a single connection with either the macro base station or the small base station based on the above-described information.

A RLF between a base station (cell) and a terminal may occur according to the following cases. For example, a RLF may occur according to several cases such as a case in which the terminal finds a physical layer error during a radio link monitoring (RLM) procedure, a case in which the terminal determines 'out of synch' since it cannot maintain physical layer synchronization, a case in which the terminal finally fails a random access procedure after as many tries as possible, a case in which data recovery on data transmission between the terminal and the base station (or, cell) is finally failed in spite of automatic repeat request (ARQ) procedures performed in a Radio Link Control (RLC) layer, etc. The above described RLF may be determined by the base station itself, or it can be reported by the terminal through a separate procedure.

In connection with the above-described RLF occurrence, if a multiple connectivity terminal identifies a RLF on a radio channel of a base station, it may report the RLF by using another base station whose radio channel is maintained without RLF. For example, when the multiple connectivity terminal recognizes a RLF of the small base station, it may report the RLF to the macro base station. Also, when the multiple connectivity terminal recognizes a RLF of the macro base station, it may report the RLF to the small base station.

When a RLF of a base station among base stations supporting multiple connectivity occurs, the multiple connectivity terminal may release a connection with the corresponding base station, and the base stations may recognize the connection release of the corresponding base station based on the RLF report of the terminal or expiration of a separate RLF timer.

However, when the multiple connectivity terminal recognizes a RLF of the small base station and reports the RLF to the macro base station, the macro base station may control the terminal not to release the connection with the small base station and to deactivate the connection with the small base station.

Like this, if the small base station is deactivated due to the RLF, the macro base station may control the terminal to stop transmission to the small base station. That is, the terminal may stop uplink transmission using data channel or control channel to the small base station. If the small base station is deactivated due to the RLF, configuration information of radio resources on the corresponding connection may be maintained. After measurement result of the terminal is received or the RLF of the small base station is recovered, the recovery and connection reestablishment are checked through transmission using the configured uplink resource or a RA procedure, and an activation procedure of the small base station may be performed. Also, the activation of the deactivated connection may be performed based on a MAC control message transmitted from a base station to the multiple connectivity terminal.

When a base station transmits the MAC control message indicating activation or deactivation of another base station to the terminal, the MAC control message may be transmitted as including identification information of the base station to be activated or deactivated. In this case, the identification information may be a unique cell identifier of the base station, cell index information used for configuration of multiple connectivity, frequency identification information of the corresponding cell, or physical layer identification information of the corresponding cell, etc.

Also, the macro base station and the small base station may use the same parameters for DRX or DTX operations. However, partially different parameters may be used restrictively. The above-described parameters (e.g. C-RNTI and DRX parameters) may be configured based on negotiations between base stations using control messages when multiple connectivity is configured.

In a method for providing a service by using multiple connectivity, although the multiple connectivity with the macro base station and the small base station are configured, services demanding low latency and high service quality (or, high reliability) such as a Voice over Internet Protocol (VoIP) may be provided by the macro base station, and other services (e.g. best effort (BE) services) may be provided by the macro base station or the small base station.

First, when the method 1 is applied, although configuration of multiple connectivity is completed, a RRC exists only in the macro base station as shown in FIG. 3A, and a RRC of the small base station performs RRC functions for terminals in single connectivity to the small base station. Thus, a multiple connectivity terminal may operate by receiving a RRC message transferred from the macro base station RRC to the small base station via Xs interface or a RRC message transmitted from the macro base station through resources of the macro base station. In addition, the terminal may transmit a RRC message to the base station through available resources among uplink resources of the macro base station or the small base station. Even in this case, RRC messages which should be urgently processed or require high reliability (e.g. measurement report messages triggering handover, small base station RLF messages, etc.) may be transmitted only through resources of the macro base station.

As described above, a RLF between a base station (or, cell) and a terminal may be determined when one of several cases such as a case in which the terminal finds a physical layer error during a radio link monitoring (RLM) procedure, a case in which the terminal determines 'out of synch' since it cannot maintain physical layer synchronization, a case in which the terminal finally fails a random access procedure after as many tries as possible, a case in which data recovery on data transmission between the terminal and the base station (or, cell) is finally failed, etc., occurs.

If a RLF of the macro base station occurs, a multiple connectivity terminal may transmit a RRC message reporting the RLF status of the macro base station, RLF-related control messages for the macro base station, a connection reconfiguration request RRC message for the macro base station, or a measurement report RRC message for the macro base station, etc. to the small base station. The small base station may transfer the RRC message received from the terminal to the macro base station through Xs interface. In this case, in response to the RRC control message transferred from the multiple connectivity terminal via the small base station, the macro base station may transmit a response RRC message to the corresponding terminal by using a scheduling identifier allocated for the terminal through downlink resources of the macro base station. However, if the RLF status of the macro base station is not recovered, a procedure for releasing a connection with the macro base station may be performed. That is, the terminal may release the connection with the macro base station in the RLF status, and maintain only the connection with the small base station.

In this instance, a RRC of the small base station may notify the terminal that a multiple connectivity function of the terminal is released by generating a control message corresponding to a RLF report received from the terminal and transmitting the control message to the terminal or by transmitting a RRC reconfiguration control message notifying the release of multiple connectivity to the terminal.

As described above, in case that the connection to the macro base station while performing multiple connectivity is released due to the RLF, the connection to the small base station may be maintained and service continuity may be maintained by RRC control of the small base station.

Figure 4:
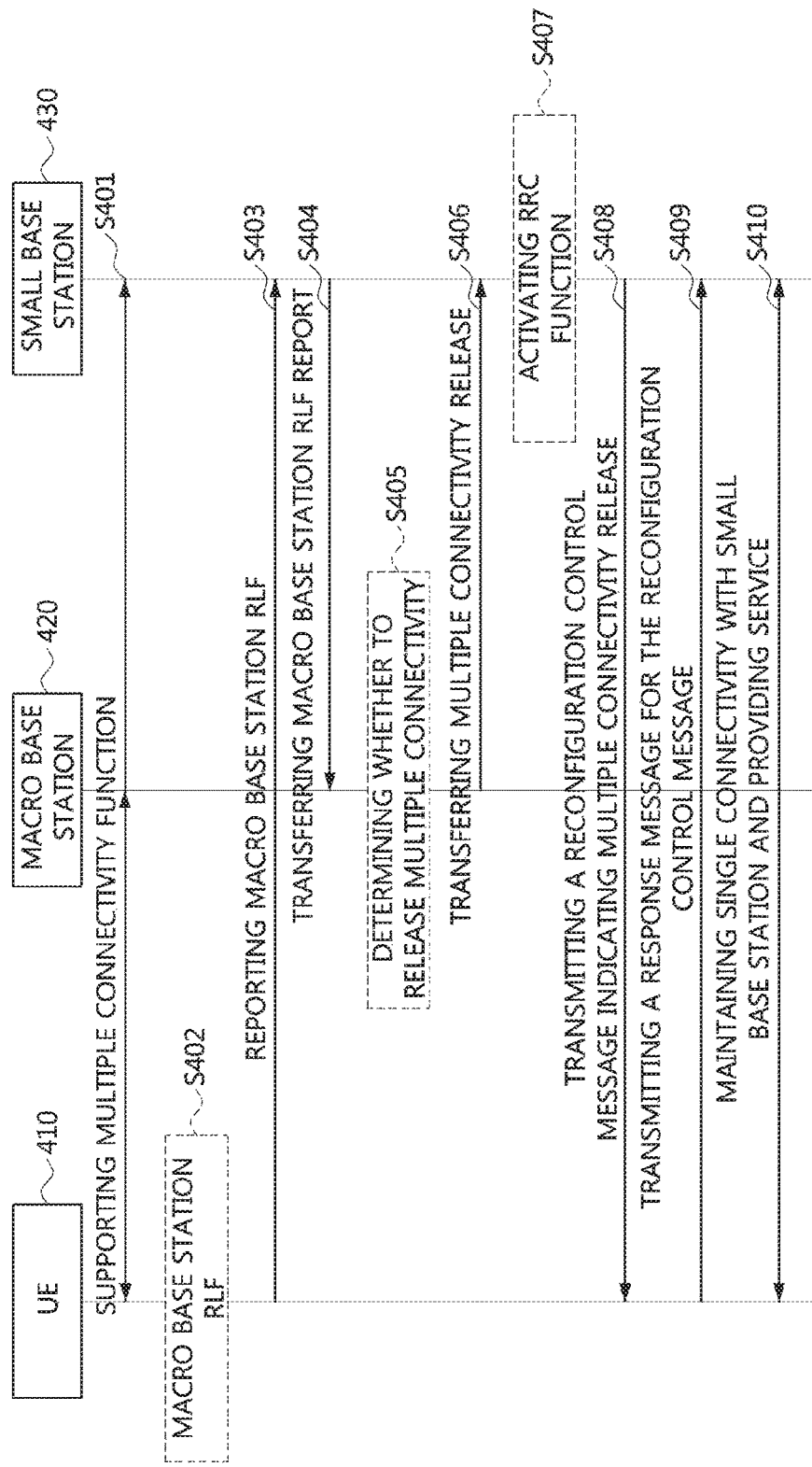
FIG. 4 is a message sequence chart illustrating an example for releasing multiple connectivity and switching to a single connectivity due to RLF of a macro base station.

FIG. 4 is a message sequence chart illustrating an example for releasing multiple connectivity and switching to a single connectivity due to RLF of a macro base station.

Referring to FIG. 4, a terminal 410 receives services from a macro base station 420 and a small base station 430 by using a multiple connectivity function (S401).

When a RLF occurs in the macro base station 420 (S402), the terminal 410 may recognize the RLF of the macro base station 420 at an arbitrary time, generate a control message, and report the RLF to the small base station 430 (S403).

The small base station 430 may transfer the report message reported from the terminal 410 to the macro base station 420 through the Xs interface between the base stations (S404).

The macro base station 420 which has identified the RLF between the multiple connectivity terminal 410 and the macro base station 420 determines whether to release the multiple connectivity (S405).

Also, when the macro base station 420 determines to release the multiple connectivity according to a recovery failure of the RLF or other reasons, it transmits a control message notifying the release of the multiple connectivity with the terminal 410 to the small base station 430 (S406). In this instance, the macro base station 420 transfers terminal context information (UE context information) including configuration information on connections with the multiple connectivity terminal 410 to the small base station 430.

In the step S406, the small base station 430 which is reported the release of the multiple connectivity and the release of connection with the macro base station 420 activates a RRC function for the terminal 420, and generates a control message for the release of the multiple connectivity and connection reconfiguration (S407).

Also, the small base station 430 may transmit a connection reconfiguration control message indicating the release of the multiple connectivity to the terminal 410 (S408).

The terminal which receives the connection reconfiguration message for a single connectivity with the small base station 430 transmits a response message indicating reception of the connection reconfiguration message to the small base station 430 (S409), and performs a procedure of reconfiguring related parameters, etc.

Then, the terminal 410 maintains the single connectivity with the small base station 430, and is provided with related services by the small base station 430 (S410).

In the procedures illustrated in FIG. 4, the step S403 in which the terminal 410 reports the RLF of the macro base station 420 to the small base station 430 and the step S404 in which the small base station 430 transfers the RLF through the Xs interface may be omitted. In other words, the macro base station 420 may directly determine whether to release the multiple connectivity after recognizing the RLF between the terminal and the macro base station based on a timer (S405), and control to perform a service provisioning procedure using the single connectivity with the small base station by selectively applying the steps subsequent to the S406 of FIG. 4.

Also, after the terminal recognizes the RLF of the small base station, it cannot transmit a RRC control message reporting the RLF to the small base station due to the RLF. Like this, when the RLF of the small base station occurs, the terminal may be controlled to stop transmission to the small base station. That is, the terminal may be controlled to stop uplink transmission using data channels or control channels to the small base station. In this instance, the terminal may transmit a report message on the RLF of the small base station to the macro base station, and the macro base station may notify the RLF to the small base station through the Xs interface. However, in this case, there may be a problem that a delay occurs due to a backhaul delay between the base stations until the RLF is recognized by the small base station. Since the RLF may be restricted only to downlink between the small base station and the terminal at some situation, the terminal may report the RLF to the small base station by using a MAC layer control message or a uplink physical layer channel instead of a RRC message. Alternatively, the terminal may report the RLF to the macro base station, and the macro base station may report the RLF to the small base station so that the processing delay can be reduced relatively.

Also, when the small base station configures a plurality of cells and the multiple connectivity terminal is provided with services based on intra-eNB CA function by being connected with the plurality of cells, a RLF may occur only in a cell whose PUCCH resources are configured among the plurality of cells of the small base station supporting the intra-eNB CA. That is, if the multiple connectivity terminal is being provided with services from the plurality of cells by using the intra-eNB CA function of the small base station, PUCCH resources are configured for a single cell among the plurality of cells participating in the intra-eNB CA function in a stage of configuration of multiple connectivity. The cell whose PUCCH resources are configured may be responsible for a main control function for the multiple connectivity terminal among the plurality of cells of the small base station. However, the macro base station is responsible for a main control function for the multiple connectivity terminal (when the macro base station is supporting intra-eNB CA function, a primary cell of cells of the macro base station is responsible for the main control function). Also, if a RLF occurs in the cell whose PUCCH resources are configured, the multiple connectivity terminal may determine that the small base station is in a RLF status, and report the RLF to other cells which are supporting the CA function of the macro base station (or, a PCell of the macro base station) or the small base station.

As described above, when the terminal being provided with service by using multiple connectivity function recognizes the RLF of the small base station and reports the RLF to the macro base station, the macro base station may control the small base station to deactivate the multiple connectivity function without releasing the multiple connectivity of the small base station (or, the cell) in which the RLF occurred. If necessary, the macro base station may deactivate the small base station (or, the cell) in which the RLF occurred for a predefined time period (or, by using a timer) after receiving the report indicating the RLF of the small base station, determine whether to release the multiple connectivity based on a timer while trying to recover the RLF, and transmit a related control message to the terminal. When the small base station is deactivated due to the RLF like this, the terminal may be controlled to stop transmission to the small base station. That is, the macro base station may control the terminal to stop uplink transmission through data channel or control channel to the small base station. For example, the following procedure may be applied to the above-described operation.

1) Terminal recognizes the RLF of the small base station.
2) Terminal reports the RLF of the small base station to the macro base station.
   ① The macro base station transmits a control message instructing deactivation of multiple connectivity support of the small base station (or, the cell) in which the RLF occurred.
3) The small base station (or, the cell) supporting the multiple connectivity function is deactivated during the predefined time period (or, by using the timer (e.g. a multiple connectivity RLF recovery timer), and the multiple connectivity function is maintained.
   ① Terminal stops transmission to or reception from the small base station (or, the cell).
   ② Terminal tries to recover the RLF.
4) If the RLF of the small base station is recovered before expiration of the multiple connectivity RLF recovery timer, the small base station (or, the cell) RLF of which is recovered is activated for multiple connectivity support.
   ① Terminal reports the macro base station that the RLF of the small base station (or, the cell) is recovered.
   ② Terminal transmits a control message instructing activation of the small base station.
   ③ Services are provided by using multiple connectivity function.
5) If the RLF of the small base station is not recovered until expiration of the multiple connectivity RLF recovery timer, it is determined to release the multiple connectivity function.
   ① Macro base station transmits a reconfiguration message instructing the release of multiple connectivity function.

In the steps 2) and 3) among the steps 1) to 5), if necessary, the macro base station may determine to release multiple connectivity, and transmit a control message instructing to release of multiple connectivity without performing the timer-based deactivation operation of the small base station (or, the cell) in which the RLF occurred.

Also, in the step ① of 4), the terminal may connect to the small base station by using a RA procedure and report to the small base station that the RLF of the small base station (or, the cell) is recovered. In this case, the small base station may transfer it to the macro base station that the RLF is recovered through the inter-base station interface (e.g. Xs interface), or the terminal may report it to the macro base station. Also, the small base station may be activated for supporting multiple connectivity function so that data can be exchanged with the terminal.

Further, if a new small base station (or, a cell), which can support multiple connectivity function, is detected when the steps 4) and 5) are being performed and before multiple connectivity function is released, the terminal may report information on the new secondary small base station (or, the new cell) to the macro base station. The macro base station which receives the report on the new small base station may transmit a connection reconfiguration control message for providing multiple connectivity service by using the new small base station instead of the small base station in which the RLF occurred after negotiation with the corresponding small base station, and provide services by using multiple connectivity function.

On the other hand, the small base station may be controlled to transfer information on resource allocation information for CSI/DM-RS/SRS/PUCCH of the small base station, PRB information, etc. to the macro base station every time when multiple connectivity is configured, or to transfer the resource allocation information for CSI/DM-RS/SRS/PUCCH of the small base station, PRB information, or part of the above information (e.g. only changed or updated information) to the macro base station periodically according to separately-configured conditions.

When multiple connectivity is configured, resource allocation information of CSI/DM-RS/SRS/PUCCH and PRB information only for a multiple connectivity terminal may be transferred from the small base station to the macro base station so that a control message for configuring multiple connectivity may be generated by the macro base station. In this instance, the small base station may transfer a scheduling identifier for the multiple connectivity terminal to the macro base station. The scheduling identifier may include TPC-RNTI for transmit power control, SPS-RNTI, C-RNTI, etc. Also, the PUCCH resource allocation information may include information on resources for transmitting H-ARQ Acknowledgement (ACK), H-ARQ Negative Acknowledgement (NACK), Scheduling Request (SR), PMI, CQI, CSI, etc.

The macro base station may generate a RRC message for configuring multiple connectivity. Then, it may transmit the generated RRC message to the multiple connectivity terminal and the small base station or transfer a separate control message including only resource allocation information for the small base station in the RRC message. Also, the macro base station may configure a control message including configuration information on measurement, report, and DRX operations of the multiple connectivity terminal, and transfer the control message to the small base station.

The macro base station may transfer preferred DRX operation parameters (e.g. whether to apply short DRX cycle, timer information, information on on-duration, information on a start point for aligning the on-duration, etc.), measurement report cycle, measurement configuration parameters (e.g. measurement target frequency, etc.), service and bearer property information to the small base station. The small base station which receives the preferred DRX operation parameters may configure relater parameters by referring to the received preferred DRX operation parameters. In this instance, the small base station may determine multiple connectivity parameters by changing the parameters transferred from the macro base station, and transfer the determined parameters to the macro base station.

When the radio structure configuration method 2 illustrated in FIG. 3B, after completion of configuring multiple connectivity function, a RRC of the macro base station may act as a M-RRC, and a RRC of the small base station may act as a S-RRC, as shown in FIG. 3B. Even in this case, the small base station may be controlled to transfer information on resource allocation information for CSI/DM-RS/SRS/PUCCH of the small base station, PRB information, etc. to the macro base station every time when multiple connectivity is configured, or to transfer the resource allocation information for CSI/DM-RS/SRS/PUCCH of the small base station, PRB information, or part of the above information (e.g. only changed or updated information) to the macro base station periodically according to separately-configured conditions.

In the method 2, the macro base station may be responsible for part of RRC connection configurations. Thus, as described above, the macro base station may be configured and managed not to need identify the resource allocation information for CSI/DM-RS/SRS/PUCCH and PRB information of the small base station. In this case, when multiple connectivity is configured, connection configuration parameters which are commonly applied to both the macro base station and the small base station (e.g. DRX configuration parameters, parameters related to measurement and report, etc.) may be notified to the terminal by using multiple connectivity configuration message. Also, the rest parameters such as information on reference signals and PRB may be configured and allocated respectively by the M-RRC of the macro base station and the S-RRC of the small base station.

However, even for the method 2, when multiple connectivity is configured, the resource allocation information for CSI/DM-RS/SRS/PUCCH and PRB information of the small base station for only the corresponding terminal may be transferred to the macro base station, and a control message for configuring multiple connectivity may be generated by the macro base station. Alternatively, the macro base station may transfer the resource allocation information for CSI/DM-RS/SRS/PUCCH and PRB information of the macro base station for the terminal to the small base station, and a control message for configuring multiple connectivity may be generated by the small base station.

When the M-RRC and the S-RRC generate RRC messages and transmit to the terminal independently, the terminal should transfer a response message corresponding to the RRC message to each RRC (i.e. M-RRC or S-RRC).

In order for the terminal to accurately transfer the response message to the corresponding RRC, the following methods may be considered.

For example, the RRC message which the terminal transmits to the M-RRC may be transmitted through uplink resources of the macro base station, and the RRC message which the terminal transmits to the S-RRC may be transmitted through uplink resources of the small base station, whereby each base station can identify that the received RRC message is the message transmitted to it.

Alternatively, the terminal may transmit the response message including an identifier or separate identification information which can be used for identifying which base station the received message is transmitted to. In this case, the terminal may transmit the response message by using available resources without regard to whether the available resources are for the macro base station or the small base station, and the base station (or, the cell) which receives the message may identify whether the received message designates it. If the received message designates the other base station, the base station may transfer the received message to the RRC of the other base station through Xs interface.

FIG. 5 is a message sequence chart illustrating an example of procedures of message transmission and reception among a terminal, a macro base station, and a small base station for multiple connectivity configuration.

Referring to FIG. 5, measurement and report parameters of a terminal 510 for multiple connectivity may be configured in a connection setup procedure with a macro base station (S501).

If the measurement and report parameters of the terminal 510 are not configured in the connection setup procedure, the terminal 510 may receive, from the macro base station 520, the measurement and report parameters for multiple connectivity through a separate control message while communicating with the macro base station which is a serving base station (S502).

While the terminal 510 maintains a connection with the macro base station 520 (e.g. the terminal is in RRC_CONNECTED state), if an event for multiple connectivity occurs after the terminal 50 performs related measurements, the terminal 510 may report the measurement result to the macro base station 520 (S503). Here, the event may mean a case in which configured threshold values are satisfied by reception signal power of the macro base station 520, reception signal power of the small base station 530, comparison between the above two reception signal powers, an arbitrary offset value, etc. The reception power value may be configured with parameters defining reception signal quality such as Received Signal Strength Indicator (RSSI), Reference Signal Received Power (RSRP), Reference Signal Received Quality (RSRQ), Eb/No, SIR, etc. Also, in the step S503, the terminal 510 may report the measurement result by using a control message for reporting measurement result, or by using a separate request message for configuring multiple connectivity. The separate request message may be configured with an RRC control message, a MAC control Protocol Data Unit (PDU), or separate indication bit information. For example, when the separate indication bit information is used, the terminal may transmit a multiple connectivity indication bit to the base station according to the event or user's request, and the base station may configure parameters for measurement or report of the multiple connectivity, and the terminal may be configured to transmit a request of multiple connectivity or the measurement result to the base station by using a control message reporting the measurement result. The terminal may transmit the multiple connectivity indication bit or the multiple connectivity request message to the base station through a RRC control message, a MAC control PDU, or a separate physical-layer control information.

Upon the receipt of the measurement result or the multiple connectivity request, the macro base station 520 may determine whether to configure multiple connectivity for the corresponding terminal 510 (S504). If the multiple connectivity is determined to be configured, the macro base station 520 may transmit a multiple connectivity configuration request message to the small base station 530 (S505). Here, the macro base station 520 may transfer the measurement result reported from the terminal 510 and information on the corresponding terminal 50 to the small base station 530.

In the step S505, the macro base station 520 may transfer radio resource allocation information for the terminal 510 (e.g. SPS configuration information, DRX configuration information, etc.) to the small base station 530. For example, the DRX configuration information may include indication whether to apply short DRX cycle or not, timer information, information on on-duration, information on a start point for aligning the on-duration, etc. Also, the macro base station 520 may transfer measurement report periodicity, measurement configuration parameters (e.g. measurement target frequency, etc.), and information on properties of services and bearers to the small base station 530.

If the macro base station 520 is configured not to transfer the above information to the small base station 530 in the step S505, the macro base station may transfer the above information to the small base station by using a separate control message.

The small base station 530 may allocate radio resources by using the information transferred from the macro base station 520 in consideration of whether DRX is applied to the terminal 510 or not, etc. after completion of the multiple connectivity configuration.

Also, in the step S505, for configuration of control parameters between base stations supporting multiple connectivity function, in consideration of capabilities of the terminal, the macro base station 520 may provide the small base station 530 with reference information, guideline information, or maximum/minimum values for each parameter which should be configured for each function supported while performing multiple connectivity. Here, the function which is supported while performing multiple connectivity may include configuration information of downlink or uplink channels which can be simultaneously transmitted or received by the terminal, CA support function information, transmission power of the terminal, frequency bands which are supported by the terminal, the number of RF chains supported by the terminal, the number of ranks supported by the terminal, size of transmission block (TrBK), information on MIMO and CoMP function support, information on uplink spatial multiplexing support, supported transmission modes (e.g. TM1, TM2, . . . , TM10) of physical shared channel, or uplink control information report configuration information (e.g. capability of the terminal related to periodic or aperiodic CQI/PMI/RI report configuration). The functions supported by each terminal may be indicated by using Feature Group Indication (FGI) information.

In case that the macro base station transmits information on capabilities of the terminal to the small base station or that the macro base station provides, in consideration of the capability of the terminal, the small cell base station with guideline information on each of functions between the macro base station and the small base station among multiple connectivity supporting functions or information on maximum/minimum values on each parameter, multiple connectivity configuration information for separating a range of radio resources managed by the macro base station and a range of radio resources allocated by the small base station may be transferred to the terminal. For example, a value of maximum transmit power or a margin value of the maximum transmit power may be configured for each of the macro base station and the small base station as discriminated, in consideration of a maximum transmit power of the multiple connectivity terminal. Also, a maximum (or, minimum) size of data transmitted from each of the macro base station and the small base station (e.g. transport block (TrBK) size) or a range of physical layer transmission modes (TM) may be configured as separated.

Re-referring to FIG. 5, when the small base station 530 receives a multiple connectivity configuration request message from the macro base station 520, it may determine whether to accept the multiple connectivity configuration request and then generates related control information (S506). If the multiple connectivity configuration request message is a message reporting or indicating a decision of the multiple connectivity of the macro base station in the step S505, the step S506 may be omitted. Instead of the step S506, control information needed for responding to the multiple connectivity configuration request may be generated. Here, the control information for the multiple connectivity configuration generated in the small base station 530 may include at least one of the following information.

- Information on allocation of non-contention random access (RA) preamble for the terminal to perform a random access to the small base station (e.g. available RA resources, preamble index information, etc.)
- C-RNTI allocated by the small base station for the terminal
- Information on DRX operation configuration parameters allocated or to be allocated by the small base station for the terminal
- Information on whether to apply short DRX period, timer information, on-duration information, information on a start point for aligning the on-duration, etc.

SPS-RNTI allocated by the small base station for the terminal, a parameter for controlling power such as a maximum transmit power of the small base station RNTI for power control
    TPC-PUCCH-RNTI (Transmit Power Control-Physical Uplink Control Channel-RNTI)
    TPC-PUSCH-RNTI (Transmit Power Control-Physical Uplink Shared Channel-RNTI)

An offset value between a transmit power and a receive power of the macro base station and the small base station
    Identifier information of the small base station (e.g. SPS-RNTI/C-RNTI)
    Coordinated Scheduling/Coordinated Beamforming (CS/CB) resource allocation information for supporting multiple connectivity
    Radio resource allocation information of the small base station Physical Uplink Control Channel (PUCCH) resource allocation information of the small base station CSI/DM-RS/SRS resource allocation information and Physical Resource Block (PRB) information of the small base station Re-referring to FIG. 5, the small base station 530 may transmit a response message for the multiple connectivity configuration request to the macro base station 520 with the generated control information for the multiple connectivity (S507).

When the macro base station 520 receives the multiple connectivity configuration response message from the small base station 530, it generates a message for the multiple connectivity configuration (S508). Here, the message generated in the macro base station 520 may include C-RNTI to be used for the multiple connectivity configuration, SPS-RNTI, frequency (carrier) information, CA information, CS/CB information, related timer information for starting the multiple connectivity, or timing offset information for starting the multiple connectivity. However, the macro base station 520 may not generate additional parameters for the multiple connectivity configuration in the step S508. That is, the macro base station 520 may simply transmit the following information generated and transferred from the small base station 530 to the terminal 510.

Information on allocation of non-contention random access (RA) preamble for the terminal to perform a random access to the small base station (e.g. available RA resources, preamble index information, etc.)

C-RNTI allocated by the small base station for the terminal

SPS-RNTI allocated by the small base station for the terminal

Information on DRX operation configuration parameters allocated or to be allocated by the small base station for the terminal Information on whether to apply short DRX period, timer information, on-duration information, information on a start point for aligning the on-duration, etc.

A parameter for controlling power such as a maximum transmit power of the small base station RNTI for power control
    TPC-PUCCH-RNTI
    TPC-PUSCH-RNTI An offset value between a transmit power and a receive power of the macro base station and the small base station
    Identifier information of the small base station (e.g. SPS-RNTI/C-RNTI)
    Coordinated Scheduling/Coordinated Beamforming (CS/CB) resource allocation information for supporting multiple connectivity
    Radio resource allocation information of the small base station
    PUCCH resource allocation information of the small base station
    CSI/DM-RS/SRS resource allocation information and PRB information of the small base station The macro base station 520 may transmit a multiple connectivity configuration command message (a message instructing configuration of multiple connectivity) to the terminal 510 (S509). Here, the macro base station 520 may transmit radio resource allocation information for the multiple connectivity, information on multiple connectivity target base stations of the terminal 510, etc. with the multiple connectivity configuration command message or as a separate message.

As the multiple connectivity configuration command message, the control message for multiple connectivity configuration generated by the small base station 530 in the step 506 may be transmitted to the terminal 510 without adding/deleting/modifying parameters. Alternatively, the multiple connectivity configuration command message may further comprise the control information generated by the macro base station 520 in the step S508 in addition to the information transmitted from the small base station 530. Alternatively, after the terminal 510 receives the control message including only the multiple connectivity configuration information in the step S509, the macro base station 520 may instruct a start of multiple connectivity by transmitting an additional control message for instructing multiple connectivity (e.g. an RRC control message, a MAC control PDU, a physical layer indication, PDCCH (or, ePDCCH), etc.).

In the step S510, additional timer or timing offset information for downlink reception from or uplink transmission to the small base station 530 which is a target of the multiple connectivity may be transmitted to the terminal 510 via the multiple connectivity configuration command message transmitted from the macro base station 520 in the step S509.

The terminal 510 may receive the control message from the macro base station 520 in the step S509, and perform the step S510 after expiration of a related timer. Such the timer or timing offset information may be determined according to characteristics of a backhaul between the macro base station 520 and the small base station 530, and transmitted to the terminals using separate dedicated control message or system information.

In the step S510, a procedure that the multiple connectivity terminal 510 performs uplink transmission to the small base station 530 and a procedure that the terminal 510 performs downlink reception from the small base station 530 may be configured as different procedures. In this case, a sequence of the uplink transmission procedure and the downlink reception procedure may be determined according to whether physical layer uplink synchronization between the multiple connectivity terminal 510 and the small base station 530 is maintained or not.

For example, if the physical layer uplink synchronization between the small base station and the terminal is established in advance or not necessary, the terminal may first receive a downlink message from the small base station and then perform uplink transmission to the small base station. However, if the physical layer uplink synchronization between the small base station and the terminal is needed to be established, the terminal may first perform uplink transmission procedure by using a random access procedure, etc. for obtaining the physical layer uplink synchronization, and the perform downlink data channel reception from the small base station.

The terminal 510 which received the multiple connectivity command message from the macro base station 520 may perform a multiple connectivity configuration completion report procedure (S511). In the step S511, the terminal 510 may perform the multiple connectivity configuration completion report procedure by transmitting a separate control message notifying the completion of multiple connectivity configuration to one or both of the macro base station 520 and the small base station 530. Also, the multiple connectivity configuration completion report may be completed by transmitting H-ARQ ACK/NACK for data received using downlink radio resources of a newly-added base station through the multiple connectivity configuration (e.g. the small base station 530 in FIG. 5) or transmitting data through an uplink resource based on uplink resource allocation information.

Especially, when an additional connection procedure is performed with the small base station 530 during the multiple connectivity configuration, if a coverage of the small base station 530 is small, or if the macro base station 520 and the small base station 530 exist at the same frequency or in the same frequency band, the random access procedure of the terminal 510 may be omitted. However, a random access procedure may be used when uplink synchronization with the small base station 530 is necessary or due to additional purposes for multiple connectivity (e.g. uplink or downlink power control, etc.). In this case, the small base station 530 may generate RA preamble allocation information (e.g. available RA resources, preamble index information, etc.) for the terminal 510 to perform non-contention based random access and transfer the information to the macro base station 510 (S507), and then the macro base station 520 may transmit the information to the terminal 510 in the step S509. The terminal 510 which received the RA preamble information may perform a random access procedure by using the RA preamble allocated by the small base station 530 between the step S509 and the step S510. In case that the terminal 510 performs the random access procedure as described above, the multiple connectivity configuration completion report procedure of the step S511 may be omitted.

Then, the multiple connectivity terminal 510 may perform multiple connectivity operations with the macro base station 520 and the small base station 530 (S512).

On the other hand, although it is described that the multiple connectivity configuration procedure is started while the terminal 510 maintains a connection with the macro base station 520 in the procedure depicted in FIG. 5, the multiple connectivity configuration procedure may be started while the terminal 510 maintains a connection with the small base station 530. Such the case may be explained by referring to FIG. 6.

FIG. 6 is a message sequence chart illustrating an example of message exchange procedure among a terminal, a macro base station, and a small base station.

In the procedure illustrated in FIG. 6, descriptions on the steps S501 through S509 illustrated in FIG. 5 may also be applied to steps S601 through S609. However, differently from the step S505 of FIG. 5, a multiple connectivity configuration request performed in the step S605 of FIG. 6 is a request to change a primary base station from a small base station 630 to a macro base station 620 as well as a request of an additional connection configuration for multiple connectivity function.

Also, in the step S605 in FIG. 6, the small base station 630 may transmit the following control information for multiple connectivity configuration to the macro base station 620, differently from the step S505 in FIG. 5.

Parameters for power control of the small base station (e.g. maximum transmit power control)
Identifier information of the small base station
CS/CB resource allocation information for supporting multiple connectivity
Radio resource allocation information of the small base station
PUCCH resource allocation information of the small base station
CSI/DM-RS/SRS resource allocation information and PRB information of the small base station
Configuration parameter information of a multiple connectivity terminal
DRX operation parameters
SPS configuration parameters
configuration parameters for measurement and report operation The DRX operation parameters for multiple connectivity configuration procedure may include information on whether to apply short DRX period, timer information, on-duration information, information on a start point for aligning the on-duration, etc. Also, the SPS configuration parameters may mean radio resource allocation information for multiple connectivity of the macro base station and the small base station, and include semi-persistent resource allocation such as Semi-Persistent Scheduling (SPS) or persistent resource allocation for an arbitrary resource region (frequency or time region) during a predetermined time period. The configuration parameters for measurement and report operation may include measurement report cycle and measurement configuration parameters (frequency to be measured, etc.). In the step S605, the small base station 630 may transfer information on services and bearers being served to the corresponding terminal 610 in addition to the above described information.

Therefore, the macro base station 620, which received the multiple connectivity configuration request from the small base station 630 in the step S605, may determine whether to change a primary base station together with the multiple connectivity configuration, and generate related control information (S606). Here, the primary base station may mean a base station which is fully or mainly responsible for RRC functions.

In the step S606, the control information generated in the macro base station 620 may include the following information.

Information on allocation of non-contention random access (RA) preamble for the terminal to perform a random access to the macro base station (e.g. available RA resources, preamble index information, etc.)
C-RNTI, SPS-RNTI allocated by the macro base station for the terminal As described above, the macro base station 620 may generate the control information, and then transmit a multiple connectivity configuration request response message including the generated control information to the small base station 630 (S607).

When the small base station 630 receives the multiple connectivity configuration request response message including the generated control information from the macro base station 620, it may transmit the received control information to the terminal 610. Alternatively, it may generate control information for multiple connectivity configuration (e.g. changing a primary base station) and transmit the generated control information to the terminal 610 as included in a multiple connectivity configuration command message (S609).

In the step S607, the macro base station 620 may transfer radio resource allocation information of the terminal 610 (e.g. SPS configuration information, DRX configuration information, etc.) to the small base station 630. After completion of the multiple connectivity configuration, the small base station 630 may allocate radio resources for the terminal 610 by using the transferred information in consideration of DRX operations of the terminal 610.

In the step S609, the multiple connectivity configuration command message including instruction on the primary base station change may be configured by adding control parameters for multiple connectivity to an existing handover command message (e.g. connection reconfiguration control message including mobility information).

Meanwhile, the macro base station 620 may modify all or some of the parameters transferred from the small base station 630 in the step S605, and transfer the modified parameters to the small base station 630. For example, the macro base station 620 may modify some of DRX operation parameters, resource allocation parameters, and parameters of measurement and report operation configuration information, configure the multiple connectivity configuration command message using the modified parameters, and transmit the message to the small base station 630.

Also, if the terminal 610 receives the RA preamble allocation information for random access to the macro base station 620 through the multiple connectivity configuration command message including the instruction to change primary base station in the step S609, it may perform a random access procedure to the macro base station 620 in non-contention based manner by using the information (S610).

Then, the multiple connectivity terminal 610 may transmit a multiple connectivity configuration completion report message to the macro base station 620 and the small base station 630. If the completion of the multiple connectivity configuration procedure can be determined based on execution of the step S913, the step S611 may be omitted.

Then, the multiple connectivity terminal 610 may perform multiple connectivity operations with the macro base station 620 and the small base station 630 (S612).

In the procedures illustrated in FIG. 5 and FIG. 6, control messages between the macro base station 520 or 620 and the small base station 530 or 630 may be exchanged via newly-defined Xs interfaces. Also, the control messages for multiple connectivity configuration which are transmitted to the terminal 510 or 610 may include identifiers of the macro base station 520 or 620 and the small base station 530 or 630.

FIG. 7 is a message sequence chart illustrating an example of a message exchange procedure and a multiple connectivity release procedure between a terminal and base stations which maintain multiple connectivity.

Referring to FIG. 7, when a terminal 710 maintains multiple connectivity with a macro base station 720 and a small base station 730, it may receive a Physical Downlink Control Channel (PDCCH) or a Physical Downlink Shared Channel (PDSCH) from the macro base station 720, and receive scheduling information or downlink data via the received PDCCH or PDSCH (S701).

When the terminal 710 receives downlink data via PDSCH, it may transmit feedback information (ACK or NACK) for downlink HARQ operation to the macro base station 720 (S702).

Also, when the terminal 710 receives the scheduling information for uplink data transmission via PDCCH or PDSCH in the step S701, it may identify a Physical Uplink Shared Channel (PUSCH) of the macro base station 720 by using the scheduling information and transmit uplink data using the identified PUSCH (S703).

The macro base station 720 which receives the uplink data from the terminal 710 may transmit feedback information (ACK or NACK) for uplink HARQ operation to the terminal 710 (S704).

Also, the terminal 710 may receive scheduling information or downlink data via PDCCH or PDSCH transmitted from the small base station 730 (S705).

When the terminal 710 receives downlink data via PDSCH, it may transmit feedback information (ACK or NACK) for downlink HARQ operation to the small base station 730 (S706).

Then, when the terminal 710 receives the scheduling information for uplink data transmission via PDCCH or PDSCH in the step S705, it may identify a PUSCH of the small base station 730 by using the scheduling information and transmit uplink data using the identified PUSCH (S707).

The small base station 730 which receives the uplink data from the terminal 710 may transmit feedback information (ACK or NACK) for uplink HARQ operation to the terminal 710 (S708).

In the above-described steps S702 and S706, the terminal 710 may additionally transmit a PUCCH to the macro base station 720 and the small base station 730, for feedback information (ACK/NACK) transmission in the downlink HARQ operation for downlink data reception from the macro base station 720 or the small base station 730. Also, if necessary, the terminal 710 may transmit the feedback information (ACK/NACK) for HARQ operation via PUSCH not PUCCH.

Especially, the small base station 730 may transmit downlink or uplink scheduling information and physical layer control information to the terminal 710 by using only PDSCH not PDCCH explained in the step S705.

Also, when it is difficult that the terminal 710 configures a Physical Hybrid-ARQ indication channel (PHICH) for HARQ operation of uplink data transmitted to the macro base station 720 or the small base station 730, the macro base station 720 or the small base station 730 may transmit ACK/NACK or uplink physical layer control information (e.g. uplink scheduling information, power control information, etc.) by using PDSCH.

If the terminal 710 detects a multiple connectivity event according to preconfigured criteria (S709), it may transmit a measurement report message to the macro base station 720 and/or the small base station 730 (S710). The small base station 730 may transfer the measurement report received from the terminal 710 to the macro base station 720 (S711).

The macro base station 720 may determine whether to release multiple connectivity based on the measurement report received from the terminal 710 and/or the small base station 730 (S712).

In this instance, if the macro base station 720 determines to release multiple connectivity, it may transmit a message instructing to report a release of multiple connectivity to the small base station 730 (S713).

The macro base station 720 or the small base station 730 may transmit a message instructing to release multiple connectivity to the terminal 710 (S714).

In response to the message instructing to release multiple connectivity, the terminal 710 releases multiple connectivity, and transmit a multiple connectivity release completion message to the macro base station 720 and/or the small base station 730 (S715).

Then, the terminal 710 maintains a single connection with the macro base station 720 (S716).

As explained above, HARQ operations for data transmissions of downlink and uplink among the macro base station, the small base station, and the terminal using multiple connectivity are required to be performed separately in the macro base station and the small base station. Also, the HARQ feedback-related information of the terminal may be transmitted using physical layer control channels or physical layer shared channels. Also, if necessary, a method of periodically scheduling (or, allocating) some resources of the downlink and uplink shared channel to the terminal in continuous manner or in distributed manner for a predetermined time duration may be applied to physical layer control channel transmission or data packet transmission while the terminal is maintaining multiple connectivity. In this case, related allocation information (e.g. modulation and coding information, subcarrier allocation information, subcarrier hopping information, allocation cycle, continuous allocation duration, distributed allocation duration, allocation interval for the distributed allocation, etc.) may be included in an RRC message of connection configuration procedure for multiple connectivity.

On the other hand, when the control message for multiple connectivity configuration transmitted from the macro base station 520 to the terminal 510 in the step S509 of FIG. 5, the control message for multiple connectivity configuration transmitted from the small base station 630 to the terminal 610 in the step S609 of FIG. 6, or the control message for multiple connectivity release transmitted from the macro base station 720 or the small base station 730 to the terminal 710 in the step S714 of FIG. 7 is configured as an RRC message of 3GPP LTE/LTE-Advanced system, the messages may be configured as follows by adding parameters for multiple connectivity configuration or release to a conventional connection reconfiguration message.

The RRC message for connection reconfiguration of 3GPP LTE/LTE-Advanced system may be configured as an 'RRCConnectionReconfiguration' message transmitted from a base station to a terminal using a Signaling Radio Bearer (SRB). Also, it may include measurement configuration information, mobility control information, radio resource configuration information for radio bearer (RB), MAC main configuration, and physical channel configuration, etc.

FIG. 8 illustrates an example of a RRCConnectionReconfiguration message for configuration or release of multiple connectivity.

Parameters for configuration or release of multiple connectivity as shown in FIG. 8 may be added in the 'RRCConnectionReconfiguration' message.

A field 'dualConnectionCellToReleaseList' of the RRC message illustrated in FIG. 8 is a field representing corresponding cell information for release of multiple connectivity. Also, parameters 'dualConnectionCellToAddModList', 'dualConnectionCellToAddMod', and 'dualConnectionCellAdd' are fields representing information on a cell to be added or changed for multiple connectivity in configuration of the multiple connectivity.

The 'dualConnectionCellToAddMod' information element (IE) in the RRC reconfiguration control message for multiple connectivity configuration or release may include index information of a multiple connectivity configuration target cell (DcCellIndex), a physical layer identifier (phyCellId) as cell identification information, downlink carrier frequency parameter (dl-CarrierFreq), etc.

Also, a message 'radioResourceConfigCommonDcCell' representing common radio resource configuration information for a cell or a base station to be added for multiple connectivity and a message 'radioResourceConfigDedicatedDcCell' representing dedicated radio resource configuration information may be included in the 'dualConnectionCellToAdd' IE. The common radio resource configuration information is information applied to one or more nodes supporting multiple connectivity, and may include physical layer control channel configuration information for PDCCH, PUCCH, Physical Control Format Indicator Channel (PCFICH), PHICH, etc., reference symbol (RS) resource allocation or configuration information, subframe configuration information (e.g. MBSFN subframe or TDD DL-UL subframe configuration information), measurement related information for mobility management, common information related to DRX operations (e.g. information for aligning DRX operations), etc. Also, the dedicated radio resource configuration information is information respectively applied to each of nodes supporting multiple connectivity, and may include physical layer control channel configuration information for PDCCH, PUCCH, PCFICH, PHICH, etc., RS resource allocation or configuration information, subframe configuration information (e.g. MBSFN subframe or TDD DL-UL subframe configuration information), measurement related information for mobility management, common information related to DRX operations (e.g. information for aligning DRX operations), etc.

As shown in the example of FIG. 8, the 'dualConnectionCellToReleaseList' information may be configured with index information (DcCellIndex) or an identifier (e.g. physical layer identifier) of a multiple connectivity release target cell, and may be used to transfer information on the release target cell whose connection is to be released.

On the other hand, when the primary base station is changed from the small base station 630 to the macro base station 620 as shown in FIG. 6, the 'mobilityControlInfo' field in the 'RRCConnectionReconfiguration' message may be used to represent such the primary base station change.

FIG. 9 illustrates an example of 'mobilityControlInfo' information element representing change of a primary base station in multiple connectivity configuration.

As shown in FIG. 9, an existing 'targetPhysCellId' field may be used to represent the identifier of the macro base station 620, and a C-RNTI to be used by the macro base station 620 may be allocated by using an existing 'newUE-Identity' field. Also, RA preamble allocation information for the terminal 610 to perform a non-contention based random access to the macro base station 620 in the step S610 of FIG. 6 may be represented using an existing 'rach-ConfigDedicated' field.

Also, a timer 't304' used for determining success of handover may be used, as a timer value from a time point of receiving a connection reconfiguration message for multiple connectivity to a time point of receiving a reconfiguration completion message, to determine success of reconfiguration of multiple connectivity. Alternatively, a new timer (e.g. 't333') may be introduced in consideration of a non-ideal backhaul environment between the macro base station and the small base station supporting the multiple connectivity function. In this case, messages may be transmitted as including the corresponding parameter information.

Also, as shown in FIG. 6, when the primary base station is changed and SPS resource and SPS-RNTI allocation is needed for providing real-time services, a conventional SPS configuration message (e.g. sps-config) may be transmitted together or using separate radio resources.

FIG. 10 illustrates an example of 'RRCConnectionReconfigurationComplete' message for reporting completion of multiple connectivity configuration or release procedure of a terminal.

As described above, a base station transmits a control message for multiple connectivity configuration or a control message for multiple connectivity release to a terminal by using an RRC message 'RRCConnectionReconfiguration'. When the terminal receives the message, it may configure an 'RRCConnectionReconfigurationComplete' control message by adding multiple connectivity related information (e.g. 'dualConnectionReconfig' field) and transmit the message to the base station so as to report to the base station that the control message for multiple connectivity reconfiguration is successfully received and the corresponding procedure is competed. For example, the terminal may transmit the control message to the base station in the step S511 of FIG. 5, in the step S611 of FIG. 6, or in the step S714 of FIG. 7.

In a situation that the terminal is being served by the macro base station and the small base station using multiple connectivity function, a result of mobile status estimation of the terminal may be reported to the base station as a stationary state, or the base station may estimate uplink so as to identify that the terminal is in a stationary state. For example, when the terminal is moving at a very low speed (e.g. a pedestrian speed) or nearly in a stationary state, the base station may determine mobility state of the terminal based on or by using related information (e.g. bits representing moving speed of the terminal, speed level, or speed information) reported from the terminal. In such the case, in multiple connectivity function using the macro base station and the small base station, the small base station may be configured as a primary base station, and the macro base station may be configured as a secondary base station. The primary (or, mater) base station for multiple connectivity may mean a base station managing a control plane responsible for mobility management and RRC functions, and the secondary base station may mean a base station whose control plane is controlled and managed by the primary base station and which is response for a user plane for the multiple connectivity terminal and additionally performs data forwarding function.

That is, in a case that the terminal is moving at a very low speed or in a nearly stationary state, the small base station may be responsible for the control plane, and the macro base station may additionally be responsible for the user plane in order to support the multiple connectivity function. In this case, the multiple connectivity function may be released so that services may be provided by using a single connection of the small base station. Alternatively, the multiple connectivity function may be supported based on only small base stations by using one or more small base station within the corresponding small base station cluster. Even when the multiple connectivity function is supported by using only small base stations, the small base stations may be configured respectively as a primary base station or a secondary base station so that each of them performs the role of primary base station or the role of secondary base station in order to support the multiple connectivity function.

Technical Issues of Multiple Connectivity Based on Small Cell Enhancement (SCE)

In the small cell environment, introduction of separation (split or decoupling) of the control plane and the data plane (hereinafter, referred to as 'C/U-plane separation'), mobility status estimation (MSE) performance enhancement, RRC signaling diversity, forward handover (HO) function, etc. may be considered for enhancement of mobility management function.

The C/U-plane separation function is a method of operating a user plane and a data plane by separating serving cells responsible for the control plane and the user plane, in which a macro base station is responsible for the control plane and a small base station of a local layer is responsible for the user plane. The macro base station manages transmission of system information and signaling radio bearer (SRB) and RRC functions for radio resources and mobility control, and user data traffic is delivered mainly through the small base station. Such the C/U-plane separation technique may be applied to both of a co-channel environment in which frequency of the macro base station is identical to frequency of the small base station (that is, F1=F2) and an inter-frequency environment in which frequency of the macro base station is different from frequency of the small base station (that is, F1≠F2). Especially, the technique is more efficient for the inter-frequency environment.

The RRC signaling diversity method is a method for enhancing reception efficiency of handover commands of a terminal, in which both of a macro base station and a small base station transmit handover commands to the terminal in order to prevent handover failure between the macro base station and the small base station. However, a problem that it is difficult for the terminal to identify a handover decision time of the base station before reception of handover command, a scheduling problem for a procedure in which both the macro base station and the small base station transmit handover commands and the terminal receives the handover commands, and a problem of C-RNTI management should be resolved.

In the conventional handover procedure, a source base station transmits a handover command instructing to perform handover, which includes radio resource allocation information of a target base station (e.g. a scheduling identifier (C-RNTI) of the target base station, RA parameters including an RA preamble index, etc.), to a terminal. Then, the terminal performs RA to the target base station by using the information included in the received HO command, and receives a physical layer control channel of the target base station by using the C-RNTI included in the HO command. However, a handover failure occurs usually when the terminal does not receive the HO command. Thus, in order to use the RRC signaling diversity method in which both the macro base station and the small base station transmit the HO command respectively to the terminal, a method for the target base station to receive the HO command should be prepared. For this, the following methods may be considered.

1) A method in which the source base station transmits C-RNTI allocation information of the target base station for the corresponding terminal to the target base station before transmission of the HO command, in order to make the target base station be able to receive the HO command 2) A method in which a dedicated C-RNTI is used for the terminal to receive a HO command from the target base station. Information on the dedicated C-RNTI can be included in SIB information, or managed as fixed values in system level. Alternatively, the information on the dedicated C-RNTI used for receiving HO commands of adjacent base stations can be transmitted when RRC connection is configured.

3) A method in which the target base station transmits a HO command by using a C-RNTI which is identical to the C-RNTI used in the source base station Even when the terminal receives scheduling information for receiving a HO command from both the source base station and the target base station by using the RRC signaling diversity method, in order to apply HARQ to PDSCH resources through which the HO command is transmitted, synchronization for uplink physical channel between the target base station and the terminal should be established. If the terminal receives the HO command from the target base station by using the RRC signaling diversity method before the uplink physical channel synchronization between the target base station and the terminal is established, a method in which only the HO command is received without applying HARQ can be used.

Also, when the terminal receives a HO command from the target base station by using the RRC signaling diversity method, a timer (e.g. a target base station HO command reception timer) representing a time duration that the terminal can validly receive the HO command from the target base station can be used. In this case, if the terminal cannot receive the HO command from the target base station until expiration of the timer, it can be identified that a HO failure occurs.

Also, the corresponding timer can be started when the terminal transmits a measurement report message triggering HO to the source base station, when a handover execution timer (e.g. a T304 timer of the 3GPP LTE system; this timer is started when the source base station receives a connection reconfiguration control message instructing to perform HO, and ended when the HO is completed; if the HO is not completed until this timer is expired, a connection re-establishment procedure is started) is expired, or when RLF or HOF is recognized during handover procedure. Alternatively, a source base station HO command reception timer may be used. For example, the source base station HO command reception time can be started when the terminal transmits a measurement report message triggering HO. The terminal can receive a HO command from the source base station until the source base station HO command reception timer is expired. Also, the expiration of the source base station HO command reception timer may be configured to trigger a start of the target base station HO command reception timer. Thus, if the terminal cannot receive the HO command from the source base station until the source base station HO command reception timer is expired, the terminal can perform reception operation for receiving the HO command from the target base station until the target base station HO command reception timer is expired.

Therefore, if the terminal fails to receive the HO command from the source base station until the expiration of the HO command reception timer while performing the handover, the terminal may try to receive the HO command from the target base station until the expiration of the timer indicating an effective duration of receiving the HO command. Also, while the terminal tries to receive the HO command from the target base station until the expiration of the timer indicating an effective duration of receiving the HO command, it may simultaneously try to receive the HO command from the source base station.

The timer information about the timers such as the source base station HO command reception timer or the target base station HO command reception timer may be notified to the terminals as included in the SIB information of the base station or by using a separate control message.

The forward handover technique may conflict with the conventional 3GPP handover mechanism. Also, although it is a multiple connectivity technique which is introduced to improve the ping-pong problem, it is difficult for it to prevent the ping-pong problem completely.

In the forward handover technique, after the terminal selects the target base station and accesses it, the target base station obtains information on a connection for a service being provided to the terminal and information on the terminal from the source base station by using information received from the terminal (e.g. a handover UE identifier, a source base station identifier, and so on).

As a usual forward handover technique, a method, in which the terminal releases a connection with the source base station before the terminal accesses the target base station and configures a connection with the target base station, is used.

However, in the conventional 3GPP handover mechanism (referred to as 'backward handover'), the source base station determines the target base station and instructs the terminal to perform a handover to the target base station. Then, the terminal accesses the target base station so as to report completion of the handover. That is, the connection with the target base station is established before releasing the connection with the source base station. That is, after the terminal reports completion of the handover to the target base station, the target base station reports the completion of the handover to the source base station, and the source base station releases resources and information for the terminal.

In order to improve handover performance by reducing frequency of ping-pong problems and handover failures, the above-described forward handover technique may be used as combined with the conventional 3GPP handover methods.

For example, when the terminal finds a base station meeting handover conditions (or, handover events), the terminal accesses the corresponding base station and configures a connection with the corresponding base station (target base station). During the procedure of configuring the connection with the target base station, the terminal reports, to the target terminal, information on the source base station (or, cell) such as a physical layer identifier of the cell (PCI), a cell global identifier (CGI), cell type information, or connection configuration information of a service being provided. Then, the target base station may request configuration information on a connection with the terminal to the source base station through a control signaling between the source base station and the target base station based on the source base station information obtained from the terminal, obtain the information, and receive data for maintaining continuity of the service being provided. Also, the source base station having received the request of the information on the handover terminal from the target base station, the source base station may transmit the connection configuration information for the terminal or data and related information for maintaining continuity of the service being provided to the target base station, and release radio resources for the terminal.

In order to perform the above-described handover mechanism, the source base station may broadcast information on one or more base stations which can be selected by terminals during handover procedure as SIB, or transmit the information to the terminals by using a control message. The information broadcasted or transmitted may include physical layer identifiers, CGIs, capability information, version information, information indicating handover conditions (e.g. radio channel quality threshold values such as RSRP, RSRQ, etc., event condition information, timer information for handover, etc.) about one or more base stations.

FIG. 11 is a message sequence chart illustrating an example of a procedure for performing handover.

A terminal 1110 maintaining a connection with a source base station 1120 and receiving services from the source base station 1120 performs procedures for measurements and reporting according to connection configuration information (S1103).

Meanwhile, the source base station 1120 exchanges information (e.g. load status information of base stations, control information for supporting mobility, control information for controlling interferences between base stations, control information for configuring multiple connectivity, etc.) with neighbor base stations 1130 (S1102).

In the step S1103, if the terminal 1110 reports a measurement result triggering a handover to the source base station, the source base station 1120 transmits a handover execution message to the terminal 1110 (S1104).

The source base station 1120 may broadcast information on one or more base stations which can be selected as a target base station by the terminal to all the base stations through one or more system information blocks (SIB) (S1101). Alternatively, during the step S1103 or S1104, the source base station 1120 may transmit identifiers of one or more base stations which can be selected as a target base station, together with system information, to the terminals by using a separate control message. Especially, in the step S1104, after receiving the measurement result from the terminal 1110, the source base station 1120 may exchange information with the target base station 1130 by using a signaling interface similar to that of the step S1102, and transmit radio resource allocation information of the target base station 1130 (e.g. random access parameters including random access preamble index, scheduling identifier such as C-RNTI, etc.) to the terminal 1110 based on the information exchange.

The information transmitted from the source base station 1120 via the step S1101 or the separate control message may be constituted with a base station list of one or more handover target base stations which can be configured as a target base station during handover. The base station list may include physical layer identifiers of respective base stations, unique identifiers of respective base stations, capability information of respective base stations, version information of respective base stations, and information representing handover conditions (e.g. radio channel quality threshold values such as RSRP, RSRQ, etc., information on event conditions, and information on timers for performing handover). Also, the base station list may be structured in ascending order or descending order according to priorities of respective base stations (or, cells), preference of the terminal, or radio channel qualities.

When the terminal 1110 may receive the handover execution message in the step S1104 or find a base station meeting the handover condition (or, event) in the base station list received from the source base station 1120, the terminal 1110 may determine whether to perform handover (S1105).

The terminal 1110 having received the instruction to perform handover based on the steps S1104 or S1105, or having determined to perform handover performs a random access procedure to the target base station 1130 and reports completion of the handover to the target base station 1130 (S1106).

In the step S1106, the terminal 1110 may report information on the source base station 1120 (e.g. source base station identifier, scheduling identifier in the source base station, connection configuration information, etc.) and unique terminal identifier (e.g. Temporary Mobile Station Identifier (TMSI), International Mobile Subscriber Identity (IMSI), a MAC address, an IP address, etc.) to the target base station 1130.

The target base station receives information on the handover terminal 1110 (e.g. connection configuration information, RRC context information, etc.) and data of services being provided by using information of the source base station 1120 reported from the terminal 1110 or information of the terminal 1110 (S1107).

Then, the source base station 1120 may release the radio resource for the handover terminal 1110 (S1108).

The target base station 1130 may perform a session reconfiguration procedure with the terminal 1110, and provide the service to the terminal 1110 by maintaining service continuity (S1109).

In the procedure illustrated in FIG. 11, each step of the procedure may be performed with at least one control message. Thus, each step may be performed through at least one message transmission or reception between respective nodes such as the terminal 1110, the source base station 1120, and the target base station 1130.

Alternatively, the terminal 1110 which configures a connection with the source base station 1120 and receives a service from the source base station 1120 may report a measurement result in the step S1103. The source base station 1120 may determine a handover based on the measurement report received from the terminal 1110, exchange control messages with at least one adjacent base station via inter-base station interface of the step S1102, and configure at least one target base station. Also, in the step of S1104, the source base station 1120 may configure at least one target base station information in the handover message, and transmit the handover message to the terminal 1110. In this case, in the step S1105, the terminal 1110 may determine an optimal target base station in the target base station list received in the step S1104. Then, operation steps among the target base station 1130, the terminal 1110, and the source base station 1120 may be performed according to the steps S1106 to S1109 illustrated in FIG. 11.

The above-described handover procedure may be applied independently of multiple connectivity configuration. Also, the steps illustrated in FIG. 11 may be selectively applied to a multiple connectivity terminal, in the above-described macro base station change procedure or small base station addition/release procedure by configuring the above-explained target base station list comprising at least one base station as candidate base stations for configuration of multiple connectivity. In order to support the multiple connectivity, a part of steps illustrated in FIG. 11 may be selectively used for addition or release of small base station, differently from the small base station addition procedure illustrated in FIG. 5 and the small base station release procedure illustrated in FIG. 7.

For example, in the step S1101 of FIG. 11, the macro base station (e.g. the base station 1120) may provide the terminal 1110 with information on a list of small base stations which can support multiple connectivity with the macro base station via system information. Here, the list may comprise information on at least one small base station. For example, the information may include a physical layer identity of the small base station, a unique identity of the small base station, capability information of the small base station, version information of the small base station, conditions for supporting multiple connectivity functions (e.g. radio channel quality thresholds such as RSRP, RSRQ, etc., event condition information, or information on timer for performing the multiple connectivity function), etc.

In this case, the terminal 1110 may be a terminal having a single connection with only the macro base station 1120 or a multiple connectivity terminal having multiple connectivity with the macro base station 1120 and a small base station. In the step S1103, the terminal 1110 may perform measurement and report operations while being provided with services from the macro base station through the single connection or the multiple connectivity.

Also, in the step S1103, the terminal 1110 may transmit a small base station addition request message for supporting multiple connectivity function, or report only a measurement result triggering addition of small base station when the measurement result meets a pre-configured event condition. Here, the addition of small base station may be addition of a small base station for triggering multiple connectivity function from a single connection, or addition of small base station (e.g. change of small base station or addition of a new small base station) for a terminal maintaining multiple connectivity.

In the step S1104, the macro base station 1120 may determine addition or change of a small base station according to the report of the terminal 1110 in the step S1103, and transmit a control message instructing the addition or change of the small base station to the terminal 1110. Here, the control message may comprise information on at least one small base station. For example, the information may include a physical layer identity of the small base station, a unique identity of the small base station, capability information of the small base station, version information of the small base station, conditions for supporting multiple connectivity functions (e.g. radio channel quality thresholds such as RSRP, RSRQ, etc., event condition information, or information on timer for performing the multiple connectivity function), etc. In the step S1104, the macro base station 1120 may transmit the control message to the terminal 1110 as including radio resource allocation information for the terminal 1110. For example, the radio resource allocation information may include random access parameters including a random access preamble index, a scheduling identifier (C-RNTI), or PUCCH allocation information).

The terminal 1110 which received the list of small base stations for supporting multiple connectivity function in the step S1104 may determine a small base station (e.g. 1130) for addition (or, change) of small base station for multiple connectivity function (S1105). Then, the terminal may perform a random access procedure to the corresponding small base station 1130, receive downlink data from the corresponding small base station 1130 by using radio resource allocation information of the small base station 1130 received in the step S1104, or transmit a control message or data by using uplink radio resources of the corresponding small base station 1130 (S1106).

In the step S1106, the terminal 1110 may transmit a control message representing completion of multiple connectivity configuration (or, change of small base station) to the macro base station 1120 or the added (or, changed) small base station 1130.

If the macro base station 1120 receives the control message representing completion of change of the small base station for multiple connectivity function from the terminal 1110 or the small base station 1130, the macro base station 1120 may trigger a release of radio resources for the terminal in a previous small base station.

In another way, in the step S1104, the terminal 1110 may determine addition or change of a small base station for configuration of multiple connectivity by using small base station list information obtained in advance through system information or through an additional control message transmitted from the macro base station 1120, without receiving the control message instructing addition or change of a small base station from the macro base station 1120 (S1105).

The terminal which determines addition or change of a small base station for multiple connectivity in the step S1105 may perform a random access procedure to the small base station 1130 which is determined as a target of the addition so as to perform addition of the small base station for configuration of multiple connectivity function, or a connection reconfiguration procedure for change of the small base station (S1106).

In the step S1106, the terminal 1110 may transmit a control message representing completion of multiple connectivity configuration (or, change of small base station) to the macro base station 1120 or the added (or, changed) small base station 1130.

The macro base station 1120 which received the control message representing completion of the small base station change for multiple connectivity from the terminal 1110 or the small base station 1130 may trigger a release of radio resources for the terminal in a previous small base station.

In the above explanation on FIG. 11, in the case that the base station list information provided for performing handover or configuring multiple connectivity include at least one base station (or, small base station), the sequence of base stations in the list may be configured in ascending order or descending order according to priorities of the base stations. If the order of base stations in the control message does not imply priorities implicitly, additional parameter information representing priorities of the base stations (or, small base stations) may be included in the control message. Like this, when the priorities of base stations (or, small base stations) are represented explicitly or implicitly in the control message, the terminal may determine a target base station for handover or determine addition (or, change) of a small base station for multiple connectivity according to the priorities.

Although the separation technology of C/U planes has advantages of avoiding HOF when a terminal moves between small base stations, these advantages degrade in an environment where small base stations are not densely deployed within a macro base station. Also, in a case that a radio link failure (RLF) of a macro base station occurs, even though a radio environment of a small base station is good, there is a possibility of connection failure.

In order to resolve the above problem, a method of maintaining a control plane (C-Plane) temporarily through a small base station when a RLF of a macro cell occurs or a method of permitting data transceiving through a small base station even when a RLF of a macro cell occurs may be considered.

For this, as described above, when a multiple connectivity terminal identifies a RLF in a radio channel of a base station among base stations to which the terminal is connected, the terminal reports the RLF of the base station to another base station in which a RLF does not occur and a radio channel is maintained. For example, the terminal may report a RLF of a small base station to a macro base station when the RLF of the small base station is recognized, and the terminal may report a RLF of a macro base station to a small base station when the RLF of the macro base station is recognized. Especially, when the multiple connectivity terminal recognizes the RLF of the small base station and reports the RLF to the macro base station, the macro base station may control the small base station to deactivate the connection of the small base station without releasing the connection of the small base station. In such the case that the macro base station manages the connection configuration of the small base station whose RLF occurred as deactivated state, the radio resource configuration information for the multiple connectivity can be maintained. Also, when the RLF of the small base station managed as deactivated state is recovered and the radio channel quality of the small base station becomes good and meets additional conditions, the small base station can be activated through a procedure and can transmit data by using multiple connectivity function. However, if the small base station managed as deactivated state does not recover a radio link during a predetermined time or a separately-configured multiple connectivity release condition is met, the small base station can be excluded from the multiple connectivity.

Also, as described above, when a MAC control message notifying activation or deactivation of a base station which is a target of multiple connectivity configuration is transmitted from a base station to a terminal, identification information of the base station to be activated or deactivated can be transmitted as included in the MAC control message. A unique cell identifier of the base station, cell index information applied to configure multiple connectivity, frequency identification information of the cell, or physical layer identifier information may be used for the identification information of the base station.

Also, in case that the C/U-plane separation technology is introduced, a range of control plane functions for which a macro base station is responsible should be considered. For example, the C/U-plane separation technology in Radio Resource Management (RRM) level responsible for only mobility management in the macro base station may be restricted to transmission of a RRC reconfiguration message having Mobility Control Information (MCI) to the macro base station.

Although it can be considered that the macro base station is responsible for the RRC function including radio resource allocation and connection control, in this case, there may exist a disadvantage in signaling for transferring allocation information on dedicated radio resources between the macro base station and the small base station via a network.

Although it can be considered that the macro base station is responsible for PDCCH in the C/U-plane separation technology, it may be difficult that such the C/U-plane separation technology is applied to a restricted backhaul environment due to problems in Channel Quality Indication (CQI) reports, scheduling restriction, HARQ operations, etc.

After the terminal transmits the connection reconfiguration completion report message reporting completion of multiple connectivity configuration in the steps S511 of FIG. 5 and S611 of FIG. 6, it may transmit a multiple connectivity activation message for actual data transmission and reception through the multiple connectivity as a MAC control message. In this case, the MAC control message may be configured to comprise at least one MAC control PDU (or, element), and be configured to be identifiable as an activation message or a deactivation message by using a logical channel identifier. That is, for configured multiple connectivity, a deactivation control message for stopping data transceiving in a connection among the multiple connectivity can be configured with MAC control PDU. In a case that such the deactivation control message is transmitted from a terminal to a base station, it may also be used as a message requesting configuration of multiple connectivity.

For supporting multiple connectivity function, the MAC control message instructing activation or deactivation may individually instruct activation or deactivation of a base station (cell) configured for support of multiple connectivity function among cells which a base station comprises. Also, during support of multiple connectivity function, among a primary base station (cell) and secondary base stations (cells), a base station (or, cell) in which a Physical Uplink Control Channel (PUCCH) resource is configured may be controlled to maintain its state as activated state without being deactivated. Therefore, the MAC control message instructing activation (or, deactivation) for a base station (cell) or a secondary base station (cell) may be transmitted to cells of a primary base station or a secondary base station in which PUCCH resource is not configured.

(Small Base Station Discovery in Multi-Layer Cell Environment)

Additional discovery signal for small base stations may be configured and used. The following signals may be considered as candidates of the additional discovery signal.

Candidates of Additional Discovery Signal
Cell specific Reference Signal (CRS) or Reduced CRS
Existing UE specific Signals (e.g., DM-RS, or SRS)
Newly-introduced common signals (e.g., Discovery Reference Signal (DRS))
Primary Synchronization Signal (PSS)/Secondary Synchronization Signal (SSS) and subframe offset
Channel State Information-Reference Signal (CSI-RS)
Positioning Reference Signal (PRS)

The discovery signals of small base stations may mean physical layer signals used for a terminal to detect a small base station (cell) in order to camp on or configure connection with the small base station (cell) or a group of small base stations.

Figure 12:
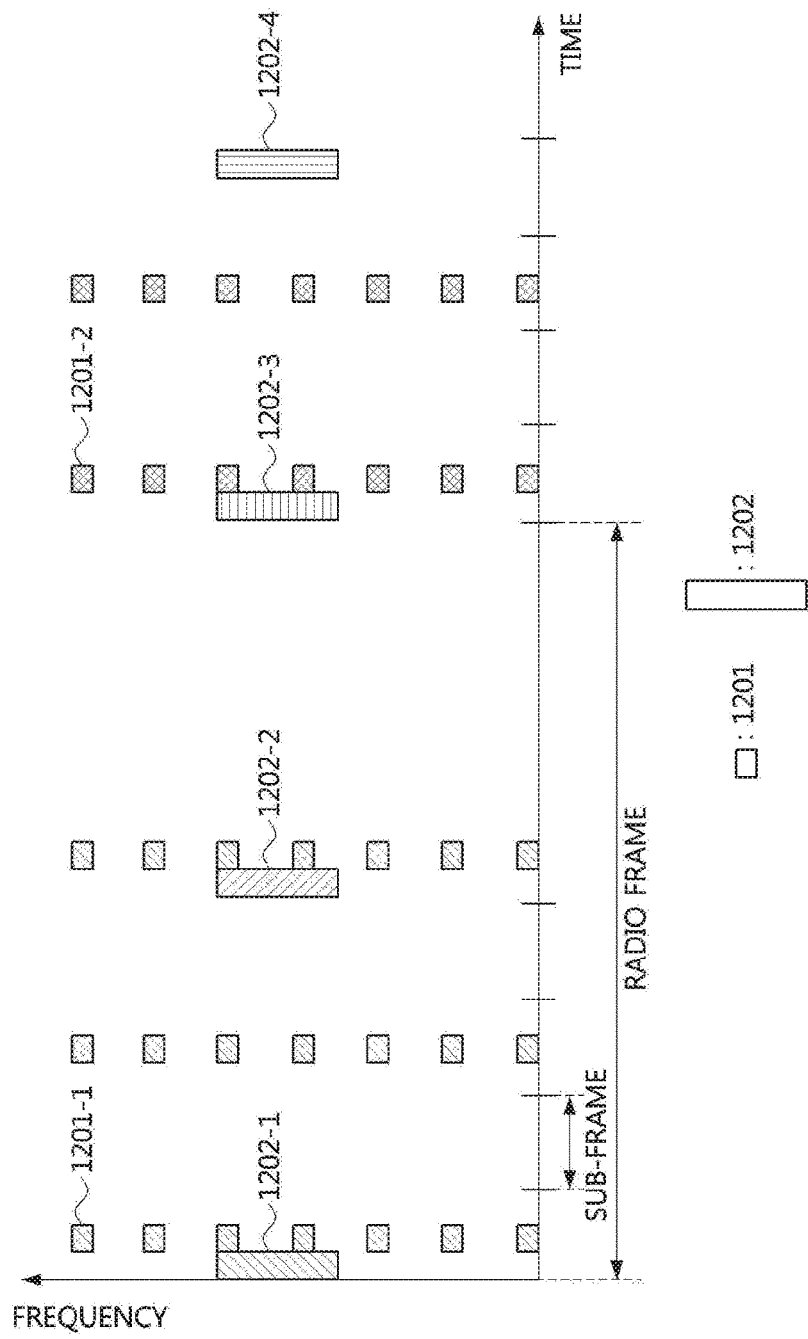
FIG. 12 represents an example of discovery signal transmission in a base station.

FIG. 12 represents an example of discovery signal transmission in a base station.

As illustrated in FIG. 12, in case that a new common signal (e.g. DRS) is introduced for discovery, the discovery signal may be controlled to be transmitted non-continuously according to a preconfigured transmission cycle. For example, the discovery signal may be configured to be transmitted only in a specific radio frame or subframe according to a time interval (e.g. 2 ms, 5 ms, 10 ms, 50 ms, . . . , 0.1 second, 0.2 second, 03 second, etc.). Also, the discovery signal 1201 or 1202 transmitted non-continuously in temporal axis may be configured to be transmitted in frequency resources, with a constant spacing, only in a radio resource region of a specific subcarrier (in the case of 1201) or in a specific contiguous frequency band (in the case of 1202). For example, in case that a system bandwidth is 20 MHz, the discovery signal may be transmitted only through a specific frequency region (e.g. 5 MHz). Such the discovery signal 1201 or 1202 may be transmitted as occupying a part of symbol region in a subframe. Also, the discovery signal may be transmitted as occupying at least one symbol duration in time axis of a subframe, without being restricted to a discovery mapping case illustrated in FIG. 12.

In addition, a pattern of sequence of the new discovery signal sequence or the sequence of the new discovery signal may be configured to be different according to respective small base stations (or, cell) or respective groups of small base stations in order to separate small base station (cell) groups as well as small base stations (cells). That is, in order to separate transmission points (or, antennas) transmitting discovery signals, patterns of sequence or sequences of discovery signals may be configured so that base stations (cells), base station (cell) groups, transmission points, or antennas can be separated in the discovery procedure, and a terminal can obtain identifiers of base stations (cells), base station (cell) groups, transmission points, or antennas or identify them through the discovery procedure. Especially, patterns of sequences or sequences of the discovery signal may be configured as mapped to radio resources of subcarrier in frequency axis so that a terminal can obtain identifiers of base stations (cells), base station (cell) groups, transmission points, or antennas or identify them quickly. That is, discovery signals detected by a terminal at any one time may be configured to have different patterns of signal sequences or sequences respectively. For example, the discovery signal 1201 transmitted through radio resources which are discrete both in time and frequency domains may be configured to comprise discovery signals 1201-1 and 1201-2 having the same pattern or signal sequence during an arbitrary time, and such the pattern or signal sequence may be configured to be repeated according to a constant time interval (e.g. multiple durations of a radio frame).

The discovery signal 1202 which is discrete in time domain and is transmitted through a specific frequency band in frequency domain may be transmitted as configured to comprise discovery signals 1202-1, 1202-2, 1202-3, and 1202-4 having different patterns of signal sequences or sequences for each transmission time. Like this, discovery signals 1201 or 1202 may be configured to have different patterns of signal sequences or sequences for each transmission time, or to have the same different patterns of signal sequences or sequences for an arbitrary duration (transmission time or transmission times). In addition, whole elements of signal sequences constituting the patterns of signal sequences or sequences may be repeated after they are transmitted for a time duration.

Respective patterns (or, sequences) constituting the above-explained discovery signal sequence may be used for separating base stations (cells), base station (cell) groups, transmission points, or antennas. For example, the discovery signals 1201-1 and 1201-2 of FIG. 12 may be transmitted from different base stations (cells), base station (cell) groups, transmission points, or antennas. Also, discovery signals 1202-1, 1202-2, 1202-3, and 1202-4 having different patterns or sequences may be transmitted from different base stations (cells), base station (cell) groups, transmission points, or antennas. In FIG. 12, an example, in which base stations (cells), base station (cell) groups, transmission points, or antennas transmit discovery signals at different times, is illustrated.

Meanwhile, differently from the example illustrated in FIG. 12, each base station (cell), base station (cell) group, transmission point, or antenna may be configured to simultaneously transmit discovery signals which have different patterns (or, sequences) and are aligned in a specific radio frame or subframe.

In addition, on/off operations of small base station (cell) may be performed in order to support energy saving function of a mobile communication network. For example, a transmission state and a dormant state may be defined as states of a small base station (cell). The dormant state means a state in which a base station does not transmit any signals (e.g. even discovery signals or synchronization signals) for a predetermined duration.

The transmission state may be classified into an active state and a discontinuous transmission state (DTX) state. The DTX state means a state in which the base station only transmits restricted physical layer signals (e.g. discovery signals or synchronization signals). In addition, the active state means a state in which the base station configures a connection with a terminal and provides a service to the terminal, an idle state terminal which does not configure a connection with the base station camps on the base station, or a terminal receives common information from the base station. Thus, the small base station (cell) may transmit a discovery signal in the transmission state.

During the discovery procedure, RSQR measurement for determining suitability as a handover target as well as obtaining a physical cell identifier (PCI) of a base station (cell) are required for a connected state terminal. Thus, measures for measurement operations on small base stations with minimum power consumption of the terminal are demanded.

Measure for minimizing power consumption of a terminal
Introduction of a new measurement event
Variable triggering technique according to movement speed of a terminal
Criteria for configuring a connection to a macro base station/a micro cell
Movement speed of a terminal
Channel quality and transmission speed (buffer status)
Properties of connected service
Best Effort (BE) service, voice service An idle-state terminal may be controlled to camp on a cell located in a layer configured at a connection release time, so that it can be controlled to selectively camp on a macro base station or a small base station. For this, a priority about a property of a cell on which a terminal will camp may be assigned, and information on the priority for each camping target cell may be transferred to the terminal when the terminal releases a connection to each cell. In addition, a terminal may be controlled so as not to camp on a base station operating in a DTX mode for energy saving. Here, the DTX mode refers to a state in which a base station transmits no signal, or a base station intermittently transmits only the minimum signals such as a synchronization signal for synchronization between a terminal and the base station, or a discovery signal for detection of the base station.

Assigning priority on property (macro/micro) of a cell on which a terminal camps
Preventing a terminal from camping on a small base station operating in DTX mode When a terminal measures a discovery signal or reports a measurement result, the terminal may perform measurement or report according to priorities set by a network. A connected-state terminal may measure discovery signals of small base stations (cells) or small base station groups and other reference signals, according to configured conditions included in a configuration control message set by a base station for measurement and report. Then, the terminal may configure a measurement report message on measured reception signals in ascending order or descending order, based on priority information of small base stations (cells) or small base station groups, and report the measurement report.

Also, an idle-state terminal may perform measurements on small base stations (cells) or small base station groups, configure a measurement report message on measured reception signals in ascending order or descending order based on priority information of small base stations (cells) or small base station groups, which is obtained through system information or a connection release control message received at the time of transition from connected-state to idle-state, and report the measurement report message.

Also, an operation state change (e.g. transition to DTX state or active state) of a base station (cell) or a base station group may be reported to a terminal through a control message for measurement configuration. For example, information on a base station (cell) or a base station group whose state changes from active state to DTX state or from DTX state to active state (e.g. Physical Cell Identifier (PCI), carrier frequency, Cell Global Identifier (CGI), measurement threshold values, priority, configuration and transmission information of discovery signal, etc.) may be reported to the terminal by adding/deleting/changing measurement target information in a control message notifying addition/deletion/change of measurement configuration (or, report configuration). Here, information on one or more base stations or base station groups for operation state change may be transmitted as included in the control message notifying addition/deletion/change of measurement configuration.

The terminal informed of operation state change of a base station (cell) or a base station group through the control message notifying addition/deletion/change of measurement configuration may perform measurement and report operations according to active state or DTX state of the corresponding base station (cell) or base station group.

The discovery signal may be configured so as to separate active state and DTX state. For example, the discovery signal transmitted by a base station may be configured to have different sequence pattern or sequence according to the base station's operation state (active state or DTX state). Alternatively, a masking code (or, scrambling code) for separating active state and DTX state may be used for the discovery signal. Alternatively, information (indicator) separating active state and DTX state may be transmitted, or identifiers may be separated for active state base stations/base station groups and DTX state base stations/base station groups, so that the terminal can be configured to selectively detect active state base stations/base station groups or DTX state base stations/base station groups.

In another way, a radio resource position of a discovery signal (e.g. DRS) may be allocated differently for a DRS transmitted in active state and a DRS transmitted in DTX state, so that the operation state of a base station can be identified by a terminal based on only the radio resource position of DRS. In this case, the radio resource position of DRS may be allocated differently in time axis (transmission time) or in frequency axis (specific subcarrier or frequency band) according to operation state of the base station.

In another way, a radio resource position of a reference signal other than a discovery signal may be allocated differently according to an operation state of a base station, so that a terminal can identify the operation state of the base station based on the radio resource position of the reference signal. For example, a radio resource position of PSS/SSS, CRS, Reduced CRS, or PRS may be allocated differently in time axis (transmission time) or in frequency axis (specific subcarrier or frequency band) according to operation state of the base station.

Through the above-described methods, a terminal may identify whether the base station is in active state or DTX state in a step of receiving and detecting the discovery signal or reference signal.

In order to help a terminal to measure and detect a base station in DTX state, the base station may provide the terminal with information. For example, information on small base stations (cells) or small base station groups located within a service area, discovery signal configuration information and identifier information of adjacent base stations (cells) or base station groups, etc. may be transmitted to the terminal as system information or via a dedicated control signaling. Here, the discovery signal configuration information may include a pattern of signal sequence or sequence, transmission cycle, repetition cycle, scrambling code (or, masking code), radio resource position (transmission time, subcarrier), offset information for discovery signal transmission time, etc.

As explained above, when a base station is managed to be in a dormant state in which the base station does not transmit any signals (e.g. discovery signal or synchronization signal) for an arbitrary duration or in a transmission state classified into an active state and a DTX state, control signaling and procedures, for managing state transition of the base station, for letting a terminal identify a state of the base station, or for triggering state transition of the base station according to a request of the terminal which identified the state of the base station, are required. Methods for minimizing a time for state transition are demanded for such the state transition.

<Transition from DTX State to Active State>

A terminal may obtain DTX state information of base stations (cells) or small base station groups within a service area of a base station or adjacent to the base station via the above-described system information or the dedicated control signaling.

A terminal maintaining a connection for receiving a service (e.g. a RRC connected terminal) may perform autonomous search for DTX base stations (cells) or base station groups in background manner, and report measurement result of base stations (cells) or base station groups to a base station when the measurement result is not less than a preconfigured threshold value (e.g. when RSRQ or RSRP of a discovery signal or other reference signal is not less than a threshold value). The base station receiving the measurement result of the terminal may determine whether to change a state of corresponding base station (cell) or base station group(s) to active state, so that the base station can provide service to the terminal which reported the measurement result or other terminals. Then, the base station may transmit a control message requesting (or, instructing) state transition to active state to the corresponding base station (cell) or base station group(s) via inter-base station or inter-cell interface, or transmit a request control message to a related control function entity located in a network. Here, the control message may include initial configuration conditions (e.g. transmit power, transmit frequency, system bandwidth, System Frame Number (SFN), or synchronization configuration information, etc.) to be applied to the corresponding base station for the transition to active state. The base station (cell) or base station group(s) operating in DTX state may change its state to active state according to the request of an adjacent base station or the related control function entity located in the network, and provide a service to a terminal. If a terminal is in idle state having no connection with a base station, the terminal may perform the above-described procedure after changing its state to connected state through a random access procedure.

In another way, a method in which a terminal accesses a base station (cell) or base stations group(s) operating in DTX state by using uplink radio resources of the corresponding base station or base station group(s) may be used. For this, the terminal is required to obtain DTX state information and uplink radio resource information (e.g. RA radio resource for initial access, or PUSCH used based on contention) of small base stations (cells) or small base station groups within a service area of a base station or adjacent to the terminal via system information or a dedicated control signaling. In such the case that the terminal obtains information on uplink radio resources of base stations (cells) or base stations group(s) operating in DTX state, the terminal may perform measurements on the base stations or base station groups operating in DTX state, and request the base stations or base station groups to change their state into active state by accessing them via the uplink resources when result of the measurements is not less than a preconfigured threshold value (e.g. when RSRQ or RSRP of a discovery signal or other reference signal is not less than the threshold value).

Also, when a base station (cell) or base station group operating in DTX state is configured as a secondary cell (SCell) for supporting a carrier aggregation function of a terminal, the terminal may perform measurements on the base station (cell) or base station group operating in DTX state, and report the measurement result to a primary cell (PCell) in the carrier aggregation function when the measurement result is not less than a predetermined threshold value. The PCell receiving the measurement result may transmit a control message requesting transition to active state to the SCell(s) which are already configured to support the CA function for the small base station (cell) or small base station group in the measurement results, and transmit a control message notifying the activation of the corresponding SCell(s) to the terminal. The terminal receiving the activation control message for the SCell(s) operating in DTX state may receive services from the SCell(s) whose state changes from DTX state to active state.

In order to simultaneously notify activation information of the deactivated SCell to at least one terminal, a base station may transmit a common control message. Such the common control message may be transmitted to at least one terminal by using an additional scheduling identifier (e.g. an additionally allocated RNTI for notifying active state transition of a base station (cell) or activation of SCell).

If a terminal receives services through multiple connectivity from a macro base station and a small base station, the terminal may perform measurements on a small base station (cell) or small base station group operating in DTX state, and report the measurement result to the macro base station when the measurement result is not less than a predetermined threshold value. The macro base station receiving the measurement result may transmit a control message requesting a corresponding small base station (cell) or small base station group to change its state to active state, when the corresponding small base station (cell) or small base station group in the measurement result is a small base station or small base station group which is already configured for support of multiple connectivity function, and transmit a control message notifying the activation of the corresponding small base station (cell) or small base station group to the terminal. The terminal receiving the control message notifying the activation of the corresponding small base station (cell) or small base station group may receive services from the corresponding small base station (cell) or small base station group whose state changes from DTX state to active state.

However, if a small base station (cell) or small base station group in the measurement result is not a small base station or small base station group which is already configured for support of multiple connectivity function, the macro base station may transmit a control message instructing to change to active state to the corresponding small base station (cell) or small base station group, and generate and transmit a connection reconfiguration message for supporting multiple connectivity function including the corresponding small base station (cell) or small base station group to the terminal. Thus, the terminal receiving the connection reconfiguration message for supporting multiple connectivity function including the corresponding small base station (cell) or small base station group may receive services from the corresponding small base station (cell) or small base station group whose state changes from DTX state to active state.

In the above-described procedure, configuration and activation of multiple connectivity function for a small base station (cell) or small base station group whose state changes from DTX state to active state may be separated. The configuration of multiple connectivity function may be completed if the terminal exchanges the connection reconfiguration message and a response message (a completed or acknowledge message) for it with the base station. Also, the activation of multiple connectivity function may mean a case in which the terminal receives an activation control message, or a case in which the terminal successfully transmits information to the small base station (cell) or small base station group by using a random access resource or other uplink resources.

The above-described procedure of state transition from DTX state to active state may be triggered only by a request of a terminal. However, it may be determined by a base station, according to requests of a number of terminals to which the base should provide services by changing its state to active state, a load status of the base station which is currently in active state, or a load distribution state of a whole network, etc. Therefore, if a change to active state is requested by a terminal for a small base station (cell) or small base station group operating in DTX state, the base station or the network may reject the request.

Also, the control message that the base station transmits to the terminal for notifying a base station (cell) or a base station group transiting to active state may include transmission power, transmission frequency, system bandwidth, system frame number (SFN), information indicating a state transition time point, timer information for operation change (such as a timer start point, a timer value, a timer expiration condition, etc.), or synchronization configuration information, etc. The control message may be transmitted to the terminal in a form of a dedicated control message, a common control message, or system information.

<Transition from Active State to DTX State>

For transiting a small base station (cell) or a small base station group operating in active state into DTX state, the following methods and procedures can be considered.

In case that a terminal providing services by configuring a connection to a small base station in active state exists, a handover procedure to another small base station (cell) or macro base station (cell) which is not expected to transit to the DTX state may be performed based on buffer status reports and property information of services being provided, whereby the terminal can release the connection with the corresponding small base station (cell) or the small base station group and perform transition to DTX state with maintaining service continuity.

Also, the small base station (cell) or the small base station group whose connection is configured with the terminal is configured as SCell(s) for supporting CA functions and activated, the configured SCell(s) may be deactivated and then changed into DTX state by using buffer status reports from the terminal (e.g. whether data exists in a transmission buffer of the terminal) and property information of services being provided. For transiting into DTX state, the base station may transmit, to the terminal, a control message notifying transition into DTX state and deactivation instruction for the SCell(s) configured for CA functions. When the terminal receives the control message, for deactivating the SCell(s), the terminal may perform a deactivation procedure of stopping a related timer (e.g. sCellDeactivationTimer), stopping transmitting control information through a uplink control channel for the SCell(s), and flushing a HARQ buffer, etc.

Especially, in case that a small base station (cell) or a small base station group is configured as SCell to support CA functions for one or more terminals, the transition to DTX state may be performed after identifying that connections with all terminal for which the small base station (cell) or small base station group is configured as SCell are deactivated. In order to simultaneously inform one or more terminals of that the SCell is deactivated, a common control message may be used. The common control message may be transmitted to the terminal by using a separate scheduling identifier (e.g. a RNTI which is additionally allocated for notifying that the base station is transitioned to DTX state, or the SCell is deactivated). The terminal, having received the common control message for deactivation of SCell, may perform a deactivation procedure of stopping a related timer (e.g. sCellDeactivationTimer), stopping transmitting control information through an uplink control channel for the SCell(s), and flushing a HARQ buffer, etc.

However, in case that the terminal receives the control message notifying the transition to DTX or the deactivation of SCell, after an additional timer parameter defined for the transition to DTX expires (if it exists), the terminal may perform a deactivation procedure of stopping a related timer for SCell(s), stopping transmitting control information through an uplink control channel for the SCell(s), and flushing a HARQ buffer, etc.

In case that a small base station (cell) or a small base station group is providing a service to a terminal through multiple connectivity functions performed with a macro base station, for transitioning to DTX state, the multiple connectivity function with the small base station (cell) or the small base station group may be released. Alternatively, although the configuration for support of multiple connectivity functions is maintained, a control message for deactivating the small base station (cell) or the small base station group may be transmitted. Therefore, although the connection between the terminal and the small base station (cell) or the small base station group remains as configured for supporting multiple connectivity function, the small base station (cell) or the small base station group whose multiple connectivity function is deactivated may transition to DTX state. In this case, it may be determined whether to perform deactivating while maintaining multiple connectivity or releasing multiple connectivity, for the small base station (cell) or the small base station group, based on a buffer status report from the terminal (e.g. whether data exists in a transmission buffer of the terminal) and property information of a service being provided). In case that the small base station or small base station group, which is supposed to transition from active state to DTX state, supports multiple connectivity function and maintains at least one connection with one or more terminals as activated, the small base station or small base station group may perform the transition to DTX state after identifying that all connections which are configured with all terminals are deactivated.

In a case that there are not terminals connected with a small base station (cell) or a small base station group and only idle-state terminals camp on the small base station (cell) or the small base station group (that is, there are not a terminal which configures a connection with a base station (cell) which will change its state from active state to DTX state and receives a service from the base station), the small base station or the small base station group may change its state to DTX state without any additional notification related to the state transition to the DTX state within a service area.

In another way, the small base station (cell) or small base station group may notify its state transition to DTX state within a service area by using system information. In this case, the small base station (cell) or small base station group may perform the state transition to DTX state at a next system information change interval by using system information change cycle, or perform the state transition to DTX state when a separately configured timer notifying change of the state transition to DTX state expires. Here, the separately configured timer may be notified to the terminal via system information or other control message, and information on start and expiration conditions of the timer may together be provided to the terminal.

Especially, in a case of using system information, an indicator notifying the transition to DTX state or information related to the transition to DTX state may be transmitted in the system information. That is, information notifying that a state of the corresponding base station (cell) or base station group will be changed from active state to DTX state in the next change time of system information will be transmitted in s system information block (e.g. SIB1, SIB2, or other SIB). Here, the information related to the transition to DTX state may include indicator information of the transition to DTX state (or, dormant state), configuration and transmission cycle information of discovery signal, or cell identifier information. The terminal may obtain the information related to the transition to DTX state from the system information, and identify that the state of the corresponding base station (cell) or base station group will change from active state to DTX state in the next change time of system information.

In a case of using timer, the terminal may start the corresponding timer according to a timer value, a timer start condition, and a timer end condition which are obtained using system information or a control message, and identify that the state of the corresponding base station (cell) or base station group will change from active state to DTX state when the timer reaches the timer value and meets the end condition.

In another way, in a case that a change of system information is notified for operation state change (change to active state, DTX state, or dormant state) of a base station (cell) or base station group, an RNTI for common information transmission may be separately allocated and used for notifying the change of system information, the operation state change, etc. For example, a System Information-Radio Network Temporary Identifier (SI-RNTI) for notifying change of system information, or a Paging-RNTI (P-RNTI) for notifying paging information may be used. Alternatively, an additional DTX-RNTI (or, Dormant-RNTI) may be used for notifying a transition to DTX state (or, dormant state). In this case, a base station may immediately change its state to DTX state (or, dormant state) after transmitting the corresponding RNTI, or may change its state to DTX state (or, dormant state) if an additional timer expires. In this case, a terminal may identify that the corresponding base station or base station group will change its state from active state to DTX state (or, dormant state) when the terminal receives the corresponding RNTI or when a related timer expires after reception of the corresponding RNTI. For this case, information about the corresponding timer may be transmitted to the terminal as included in system information or other control messages, and start condition and end condition of the corresponding timer may also be transmitted to the terminal. Especially, a method in which a start point of the corresponding timer is notified to the terminal via transmission of the corresponding RNTI may be used.

A time required for a base station (cell) or base station group to change its state from active state to DTX state or from DTX state to active state may be determined as a minimum transition time in consideration of system performance.

However, minimum transition time criteria for a base station and a minimum transition time and for a terminal may be different from each other. For example, for a terminal, the transition from active state to DTX state (or, from DTX state to active state) should be completed in several milliseconds. On the contrary, a base station requires a longer transition time since it performs related procedures for multiple terminals.

That is, when a state of a base station (cell) changes from active state to DTX state, several hundreds of milliseconds or several seconds may be demanded as the minimum transition time since handover or connection reconfiguration procedure are necessary to maintain service continuities of all terminals having connections with the base station. Also, when a state of a base station (cell) changes from DTX state to active state, an additional time is required after reception of a control message requesting the change or a request of a terminal, for configuring initial conditions of the base station (e.g. transmission power, system bandwidth, System Frame Number (SFN), discovery signal, synchronization configuration information, etc.)

As explained above, the control message transmitted to the terminal for notifying state change (active-to-DTX, or DTX-to-active) of the base station may include information on transmission power, transmission frequency, system bandwidth, SFN, state change time, timers for operation change (timer start point, timer value, timer end condition, etc.), and so on. This control message may be transmitted to the terminal as a dedicated control message, a common control message, or system information. The terminal receiving the control message notifying the operation state change of the base station (cell) or base station group may start a timer operation according to a timer start condition or a reference time, identify an operation state change when the timer expires or the timer meets an additionally-configured timer end condition, and operate according to the changed state (active state or DTX state) of the corresponding base station (cell) or base station group.

A Method of Improving System Performance by Using Radio Resources of at Least One Base Station in Co-Channel Environment An DL/UL imbalance phenomenon may occur in a co-channel environment where a macro base station and a small base station use the same frequency band. In a case that service areas of the macro base station and the small base station overlap with each other and they use the same frequency band, signals transmitted from the macro base station may acts as interferences when the terminal receives signals transmitted from the small base station.

Figure 13:
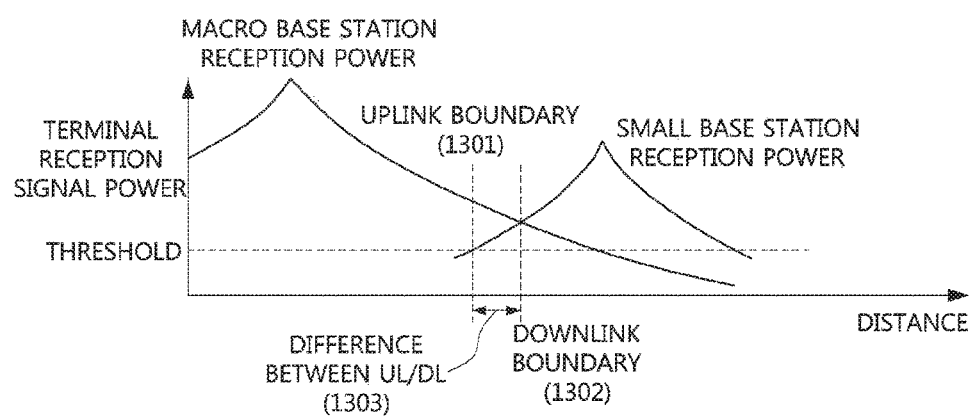
FIG. 13 is a graph illustrating bi-directional link boundaries according to reception powers between a macro base station and a small base station in a local access mobile network using a small base station.

FIG. 13 is a graph illustrating bi-directional link boundaries according to reception powers between a macro base station and a small base station in a local access mobile network using a small base station.

As illustrated in FIG. 13, for a terminal located between service areas of a small base station (cell) and a macro base station (cell), an imbalance problem of uplink and downlink boundaries may occur due to a difference 1303 between an uplink boundary 1301 and a downlink boundary 1302. According to the above problem, a problem of power control may occur, or uplink reception of the terminal may become difficult when multiple connectivity are supported in a co-channel environment.

In order to resolve the above problem, an introduction of a technique of separating uplink and downlink (hereinafter, referred as 'DL/UL decoupling') may be considered.

That is, the terminal may receive downlink from the macro base station, and transmit uplink to the small base station. In a case that the above DL/UL decoupling technique is introduced, a method for HARQ operation should be considered. For example, after the terminal receives downlink data from the macro base station, the terminal may transmit ACK/NACK information notifying whether to receive the data successfully to the small base station by using the DL/UL decoupling technique, or the terminal may transmit the feedback information for downlink data reception to the macro base station.

Also, when the DL/UL decoupling technique is used, a report of the terminal including measurement results (e.g. CQI or CSI) on channels of the macro base station responsible for the downlink data transmission may be transferred to the macro base station via the small base station. Alternatively, although the DL/UL decoupling technique is used, the report may be transmitted through uplink of the macro base station in a subframe to which almost blank subframe (ABS) scheme is applied.

In addition, when the DL/UL decoupling technique is introduced, consideration on common parameters of terminals is necessary. In a case that a terminal maintains multiple connectivity with a macro base station and a small base station, configuration of dedicated radio resources, physical-layer control information transmission, and discontinuous reception (DRX) parameters, etc. should be considered.

Especially, when the DL/UL decoupling technique is used, DRX parameters of a terminal may be configured as separated from DTX parameters. Alternatively, they may be configured as integrated into the DRX parameters similarly to the conventional case, and configuration of common parameters for both the macro base station and the small base station may be considered.

DRX Operation Control of Multiple Connectivity Terminal

For a terminal maintaining configuration of multiple connectivity, an RRC of a macro base station according to the radio protocol structure 1 illustrated in FIG. 3A and an M-RRC according to the structure 2 illustrated in FIG. 3B may configure parameters for DRX operation, and related DRX parameters may be applied identically both to the macro cell and the small cell without separation.

The terminal exchanging data with the base station may perform DRX operation when there are not data to be transmitted or after a lapse of a predetermined time lapse without reception of downlink data. Also, if the terminal is determined as not maintaining uplink physical layer synchronization after a lapse of a predetermined time (e.g. expiration of 'timeAlignmentTimer' in LTE system) from the DRX operation, the base station may release uplink control channel (PUCCH) resources and sounding reference signal (SRS) resources for the terminal.

In a case that a terminal maintains multiple connectivity with two base stations, even when the terminal does not have data to transmit in uplink, whether a macro base station has data to transmit to the terminal and whether a small base station has data to transmit to the terminal may be different. Thus, in a case that one of base stations configuring multiple connectivity has no data to transmit, even though the corresponding base station starts counting of inactivity timer, a case in which another base station has data to transmit to the terminal and transmits the data to the terminal may occur.

Therefore, a mismatching state, in which the terminal is recognized as performing DRX operation by one of base stations configuring multiple connectivity and the terminal is recognized as not performing DRX operation by another base station, may occur.

Then, if it is determined that the terminal expires an uplink synchronization maintaining timer (e.g. 'timeAlignmentTimer') and does not maintain uplink synchronization, the base station may release uplink control channel (PUCCH) resources and SRS resources for the multiple connectivity terminal.

Therefore, a state, in which PUCCH and SRS resources are released and DRX operation is performed for one of two base stations configuring multiple connectivity and only another base station exchanges data and maintains uplink synchronization and control channel resources, may occur.

If a single bearer is divided for two base stations, the above-described problem can be alleviated. That is, a real-time service may be transmitted only via a macro base station, and a non real-time service (e.g. best-effort service, web browsing, etc.) may be transmitted to a terminal by using both the macro base station and the small base station. In this case, since there are data having the same service properties in downlink, two base stations maintaining multiple connectivity may operate by using the same DRX parameters. However, in a case that base stations supporting multiple connectivity are connected using a restricted back-haul link, DRX operation start points of the base stations may become different due to a latency of the back-haul link.

As a method to resolve the above problem, a method in which a DRX operation for multiple connectivity terminal is restricted to be performed only by a macro base station, and a small base station is deactivated instead of starting DRX operation or released from multiple connectivity after a lapse of a predetermined time meeting the start of DRX operation may be used.

That is, if a predetermined time is lapsed (e.g. expiration of 'drx-InactivityTimer' for DRX operation, expiration of an additional timer for deactivating a cell configuring multiple connectivity, or expiration of a timer for releasing a cell configuring multiple connectivity) without data exchange between a terminal maintaining multiple connectivity and a small base station, a method of deactivating or releasing the corresponding small base station may be used. Here, the timer for deactivating a cell configuring multiple connectivity may use 'sCellDeactivationTimer' among conventional CA configuration parameters, or a separate timer parameter for deactivating a cell of multiple connectivity (e.g. 'dualConnectCellDeactivationTimer') may be introduced. Alternatively, a separate timer parameter for deactivating a cell configuring multiple connectivity may be introduced, or the corresponding small base station may be controlled to be released from configuration of multiple connectivity when a DRX condition is met. The small base station may be controlled to be deactivated by transmitting a MAC control message for deactivation of the small base station to the terminal. Also, in a case of releasing multiple connectivity, the small base station may be controlled to be released from multiple connectivity by transmitting a MAC control message or an RRC signaling message to the terminal. In such the case of deactivating a small base station or releasing a small base station from configuration of multiple connectivity, deactivation or release of the small base station may be notified through notification of the small base station to a macro base station or through a MAC message or an RRC signaling message transmitted from the terminal to the macro base station. When the small base station is deactivated, the terminal may request activation of the small base station by using available uplink resources of the macro base station, or by performing a random access procedure to the small base station.

Here, the deactivation of the small base station means a state in which a multiple connectivity terminal does not transmit uplink data or control information such as Channel Quality Indication (CQI), Precoding Matrix Indicator (PMI), Rank Indication (RI), Precoding Type Indicator (PTI), Sounding Reference Symbols (SRS), etc. to the small base station, and it does not monitor PDCCH, ePDCCH, PDSCH, etc. in downlink of the small base station. However, it is permitted that the terminal performs an RA procedure to the small base station or transmits physical-layer uplink control signaling information (or, bits) to the small base station for activating configuration of multiple connectivity.

Also, when a cell radius of a small base station is about several tens of meters, it may be not necessary to maintain physical layer uplink synchronization for acquiring orthogonality among uplink users. Therefore, uplink synchronization maintaining procedure using 'timeAlignmentTimer', Timing Advanced (TA) information, etc. may not be required.

Also, it is assumed that several or several tens of users are provided with services from a small base station having a small service area. In such the environment, a small base station may assign dedicated RA preambles to terminals configured connections with it when they configure the connections, or control them to use a part of uplink control resources (e.g., Scheduling Request (SR)) always when the connection is configured, without regard to DRX operations of the terminals or whether the small base station is deactivated or not.

Therefore, when necessary, a terminal maintaining a connection with a small base station may perform a non-contention based RA procedure by using the RA preamble assigned at the time of connection configuration, or transmit necessary information by using the allocated uplink control channel at any time, without regard to DRX operations, whether a physical layer synchronization is maintained or not, or whether the small base station is deactivated or not.

Also, a small base station may allow a terminal which configures a connection with it to use the RA preamble for requesting uplink resources or transmitting HARQ ACK/NACK by allocating the RA preamble to the terminal. That is, the terminal may use transmission of the allocated RA preamble for the purpose of uplink feedback information (HARQ ACK/NACK) notifying whether a downlink packet is successfully received. For this, a small base station may separately allocate RA preambles for uplink HARQ ACK/NACK transmission to the terminal when the small base station configures a connection with the terminal.

Thus, although a multiple connectivity terminal performs DRX operation when conditions of DRX operation are met (e.g. expiration of a timer 'timeAlignmentTimer' used to determine whether uplink synchronization is maintained or not), a method, in which uplink control channels (PUCCH or ePDCCH) and SRS resources are maintained without release, may be used. Thus, without regard to whether the terminal maintains uplink synchronization with the base station or not, the terminal may be controlled to hold the uplink control channel and SRS resources until reception of a control message instructing release of the uplink control channel and SRS resources.

In case of a multiple connectivity terminal, it is possible that the terminal performs uplink transmission via the uplink control channel maintained with a small base station even when the terminal is performing DRX operation, and the terminal requests uplink resources through a non-contention based RA procedure to the small base station using a dedicated RA preamble or a contention based RA procedure to a macro base station.

Also, in order to activate a small base station deactivated according to the above explained method, a macro base station may transmit a downlink MAC control message instructing activation of the small base station. The terminal that deactivated the small base station according to the deactivation procedure may identify the MAC control message transmitted from the macro base station and receive downlink information by monitoring downlink channels of the corresponding small base station. In such the case that the macro base station transmits the downlink MAC control message, the MAC control message may include identification information (or, index information) of the small base station constituting multiple connectivity.

Figure 14:
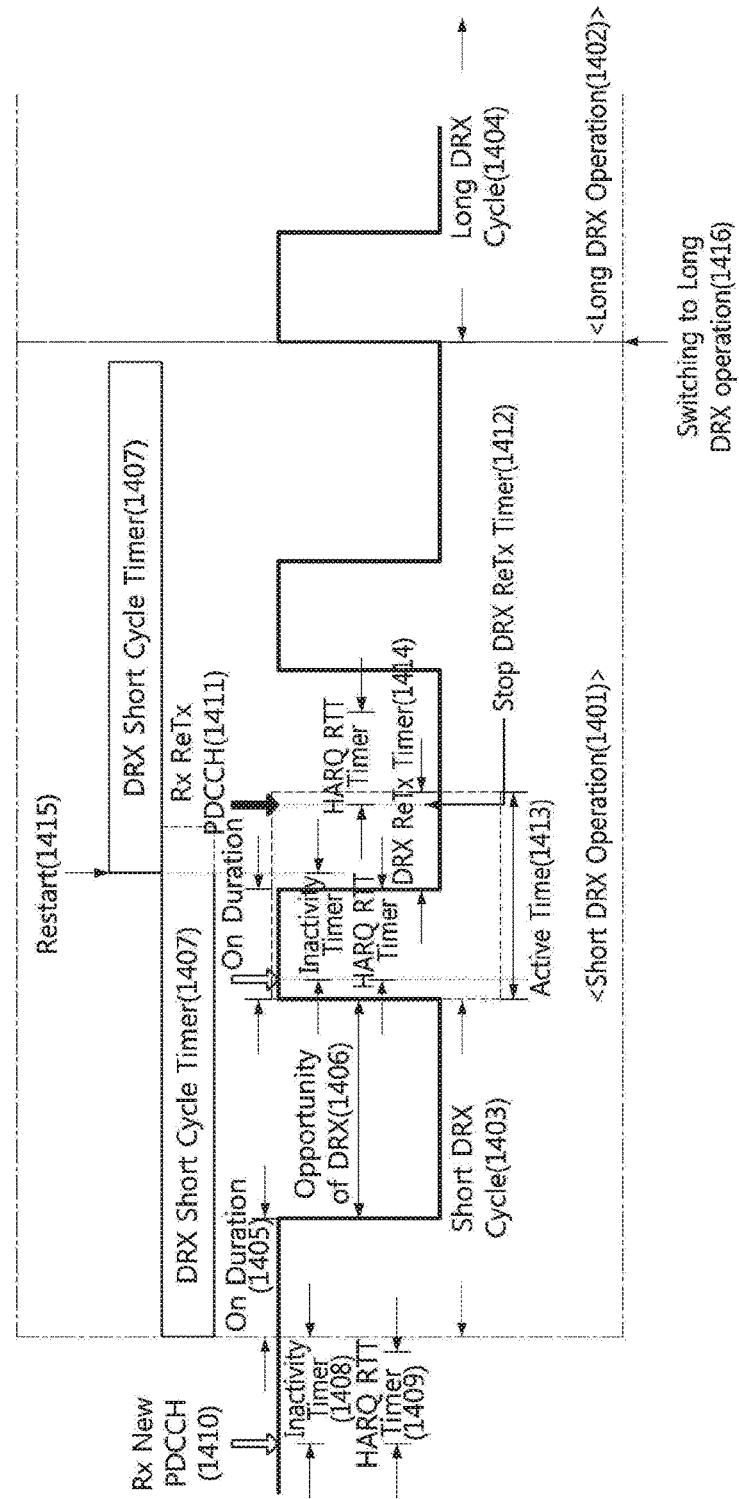
FIG. 14 illustrates DRX operation of a terminal.

FIG. 14 illustrates DRX operation of a terminal.

Referring to FIG. 14, the DRX operation may be configured with a short DRX operation 1401 and a long DRX operation 1402.

The short DRX operation 1401 may include an on-duration period 1405 in which a terminal monitors downlink signals 1410 and 1411 by using a short DRX cycle 1403 until a timer to which the short DRX cycle is applied expires and a period of opportunity of DRX 1406 in which the terminal performs a sleep operation without monitoring downlink signals and performing uplink transmission.

Both the short DRX cycle 1403 and the long DRX cycle 1404 may comprise an on-duration period 1405 and a period of opportunity of DRX 1406.

When a terminal performing DRX operation identifies the downlink signal 1410 by monitoring a downlink channel in the on-duration period, an inactivity timer 1408 and a retransmission timer (HARQ RTT timer 1409) may be started.

In a case that the terminal receives the downlink signal successfully, if the inactivity timer 1408 expires, the period of opportunity of DRX may be entered. However, in a case that a retransmission occurs, the terminal may transmit HARQ feedback information in downlink and monitor the downlink signal 1411 being retransmitted while the retransmission timer 1411 (e.g., 'drx-RetransmissionTimer' of LTE system) is operating.

If a successful reception is completed through the above-described procedure, the terminal may enter into the period of opportunity of DRX 1406. Like this, a period in which a terminal performs reception for a time longer than an on-duration period to perform downlink reception, uplink transmission, or support of HARQ operation after the on-duration period of DRX operation may be defined as an active time 1413.

If data reception or transmission is performed at the time of the short DRX cycle completion, the terminal may restart a timer 1407 to which a short DRX cycle is applied at the corresponding time (refer to 1415), and the short DRX operation 1401 to which a short DRX cycle is applied may be extended.

If the timer 1407 to which the short DRX cycle is applied expires, the terminal may perform the long DRX operation 1402 to which the long DRX cycle 1404 is applied.

For DRX operation of a multiple connectivity terminal, downlink synchronization between a macro base station and a small base station should be considered. In the above-described DRX operation, since buffer statuses of the macro base station and small base station may become different, counting start times of DRX inactivity timers for two base stations may become different. Due to this, a mismatching state in which the terminal is recognized as performing DRX operation by a base station among the base stations constituting multiple connectivity and recognized as not performing DRX operation by the other base station among the base stations may occur.

However, in a case that downlinks of the macro base station and the small base station are aligned so that they have synchronized subframe boundaries and the same system frame number (SFN), DRX operation of the terminal may be supported by using existing timer parameters for DRX operation.

That is, DRX operation may be supported by using common DRX parameters such as the DRX cycles (e.g., 1401 and 1402 of FIG. 14) each of which comprises an on-duration period (e.g., 1405 of FIG. 14) and a sleep period (e.g., 1406 of FIG. 14), and related timers (e.g., 1407, 1408, 1409, and 1414 of FIG. 14).

For example, in a case that DRX parameters of the multiple connectivity terminal are identically applied to both the macro base station and the small base station, start times of DRX operations may become different according to differences of counting start times of corresponding timers due to buffer statuses of the two base stations even when the same DRX inactivity timer value is used. However, both of the two base stations may be configured to operate based on the same DRX cycle by making start points (e.g., subframe) of on-duration periods of them coincide with each other.

However, even though a terminal maintaining multiple connectivity with a macro base station and a small base station performs DRX operation with the same DRX cycle by using the same DRX parameters in the above-described manner, after operating based on the short DRX cycle 1403 until the timer 1407 expires, start times of long DRX cycles 1401 for respective base stations may not coincide with each other.

That is, even when short DRX operation 1401 and relevant timers including the timer 1407 applying a short DRX cycle, 'drx-RetransmissionTimer', and inactivity timer are configured identically, the start times (e.g., 1416 of FIG. 14) of long DRX cycles for the macro base station and the small base station may become different according to data buffer statues of them.

However, when downlinks of a macro base station and a small base station are not synchronized or system frame numbers (SFN) of the two base stations are different due to non-alignment of SFNs, in order to apply DRX parameters (e.g., parameters of a base station among the two base stations) to a terminal commonly for the two base stations, the following information should be additionally used.

In a case that SFNs are different, information on an offset or difference value of SFNs, which can used for the terminal to identify the difference between SFNs of two base stations In a case that downlinks of two base stations are not synchronized in subframe level even though SFNs are configured identically, information on an offset or difference value of downlink synchronization, which can be used for the terminal to estimate or identify synchronization difference between two base stations.

The multiple connectivity terminal can monitor downlink signals of base stations constituting multiple connectivity, by aligning DRX cycles for DRX operations based on the above-described SFN (or downlink synchronization) offset value or difference value while minimizing power consumption of the terminal.

For DRX operation of a multiple connectivity terminal, common parameters may be configured based on DRX parameters of a macro base station. In this case, although a small base station should perform DRX operation according to the DRX parameters, the small base station may be controlled so that it does not perform DRX operation when data transmission/reception is performed with the macro base station or DRX operation conditions are not satisfied, and it performs DRX operation when DRX operation conditions are met in a relation with the macro base station.

Also, DRX parameters for only one of short DRX cycle and long DRX cycle may be applied when a terminal is maintaining multiple connectivity, so that mismatch of DRX operations and statuses between the terminal and base stations constituting the multiple connectivity can be prevented and efficient DRX operation can be performed. For example, in a case that a terminal applies only short DRX cycle, the terminal may be controlled to apply not a long DRX cycle but a short DRX cycle, even when a timer (e.g., 1407 of FIG. 14) applying a short DRX cycle expires.

A method in which a macro base station and a small base station configure respective DRX parameters when a terminal maintains multiple connectivity may be considered as another method. This case basically assumes that DRX operation statues of a terminal are different in the macro base station and in the small base station. For example, the terminal may perform a DRX operation procedure without data exchange in a view of the small base station while maintaining operation state having data exchange in a view of the macro base station, and vice versa.

Thus, all of DRX parameters such as on-duration, DRX cycles, short DRX maintain duration, inactivity timer, HARQ RTT timer, DRX ReTX timer, timeAlignmentTimer, etc. may be configured differently for the macro base station and the small base station, or a part of them may be configured differently for the macro base station and the small base station.

Also, in order to identically configure some parameters (e.g., timer values, on-duration period, DRX cycle value, whether to apply a short DRX cycle), control messages for configuration of parameters may be exchanged between the macro base station and the small base station, when DRX operation between two base stations is configured in the step of configuring multiple connectivity. Therefore, in a case that the small base station changes and transmits DRX parameters selected by the small base station for the multiple connectivity terminal to the terminal, the information should be transmitted to the small base station before or after transmitting the information to the terminal.

Figure 15:
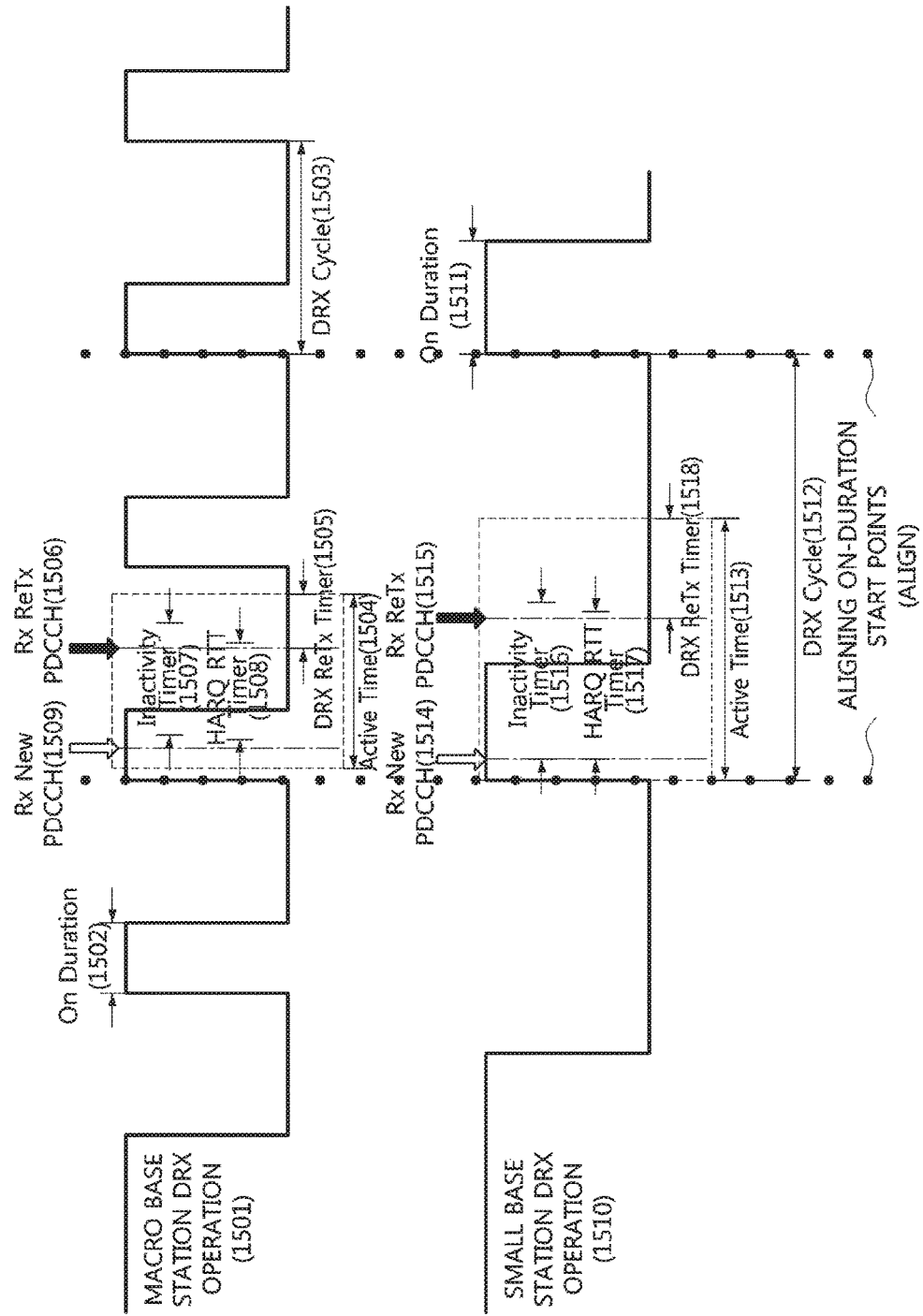
FIG. 15 illustrates a DRX operation alignment method for a multiple connectivity terminal.

FIG. 15 illustrates a DRX operation alignment method for a multiple connectivity terminal.

As shown in FIG. 15, in DRX operation parameter configuration for a multiple connectivity terminal, even when different parameters are applied to a macro base station and a small base station, on-duration start points of the terminal performing DRX operation may be aligned so as to start at the same subframe for the macro base station and the small base station.

Also, DRX cycles of the macro base station and small base station may be configured as one becomes a multiple of the other. Thus, although respective base stations perform DRX operations based on different DRX cycles, DRX parameters may be configured so as to align on-duration periods of both base stations to start in the same subframe, and therefore complexity of DRX operation of the terminal may be decreased and DRX performance may be enhanced.

As illustrated in FIG. 15, DRS operation parameters such as on-duration 1502 and 1511, DRX cycle 1503 and 1512, Inactivity timer 1507 and 1516, HARQ RTT timer 1508 and 1517, DRX ReTx timer 1506 and 1518, etc. are differently applied to a macro base station DRX operation 1501 and a small base station DRX operation 1510.

Thus, active times 1504 and 1513 may become different for a case that a terminal receives new data 1509 and 1514 in the on-duration period and a case of retransmissions 1506 and 1515. However, even when DRX cycles and on-duration period parameters are different, a start point of the on-duration period 1502 for DRX operation 1501 of the macro base station and a start point of the on-duration period 1511 for DRX operation 1510 of the small base station may be controlled to be aligned.

For this, information notifying a start subframe for aligning on-duration periods (e.g., SFN, information notifying a radio frame or a subframe) to the terminal may be included in DRX parameter information when multiple connectivity are configured.

As explained above, a method of aligning on-duration period start points to align start points of the on-duration period for a macro base station and the on-duration period of the on-duration period for a small base station may be used for aligning DRX parameters of a multiple connectivity terminal. However, in another way, a method of configuring parameters to maximize an overlapped duration between the respective on-duration periods while the multiple connectivity terminal performs DRX operation may be used.

That is, the method of aligning start points of on-duration periods of the DRX operation 1501 of macro base station and the DRX operation 1510 of small base station was explained by referring to FIG. 15. In another way, a method of controlling DRX operation by providing parameters on on-duration period start points for making a relatively shorter on-duration period (e.g., the on-duration period 1502 of the macro base station) be included within a relatively longer on-duration period (e.g., the on-duration period 1511 of the small base station) among DRX parameters of base stations providing multiple connectivity may be considered.

For configuration of DRX parameters for multiple connectivity base stations, the following methods may be considered as methods for making the on-duration period of macro base station (or, small base station) include the on-duration period of small base station (or, macro base station).

1) a method of configuring parameters to make both of a start point and an end point of an on-duration period of small base station (or, macro base station) be aligned within an on-duration period of macro base station (or, small base station)

2) a method of configuring parameters to make only a start point of an on-duration period of small base station (or, macro base station) be aligned within an on-duration period of macro base station (or, small base station)

3) a method of configuring parameters to make only an end point of an on-duration period of small base station (or, macro base station) be aligned within an on-duration period of macro base station (or, small base station)

As another method of aligning DRX parameters, a method of aligning end points of on-duration periods, similar to the above-described method of aligning start points of on-duration periods, may be used. As described above, configuration of parameters for DRX alignment may be possible in SFN, radio frame, or subframe level. The base station may transfer indication information of the corresponding frame or subframe and relevant offset information to the terminal via a control message configuring multiple connectivity.

Also, the macro base station may configure some of DRX parameters of it (e.g., short or long DRX cycle, short DRX maintaining duration, or on-duration period, etc.) to be identical to the corresponding DRX parameters of the small base station or to have predetermined relations (e.g., being multiples of the corresponding DRX parameters) with the corresponding DRX parameters of the small base station, considering the DRX parameters of the small base station transferred from the small base station when the macro base station configures multiple connectivity.

As described above, in the step in which the macro base station requests configuration of multiple connectivity to the small base station for configuring control parameters between base stations supporting multiple connectivity functions, the macro base station may provide the small base station with reference information, guideline information, or maximum/minimum values for respective parameters by considering capability of a terminal.

For example, the macro base station may provide the small base station with short or long DRX cycle, short DRX maintaining duration, on-duration period configuration information to the small base station. Also, after negotiation between base stations on transmit power reference value, transmit power ratio among base stations constituting multiple connectivity, or transmit power offset information of base stations constituting multiple connectivity in a preparation step of multiple connectivity, the macro base station may transfer the finally determined control parameters to the terminal via a multiple connectivity configuration control message, and control the terminal to control its transmit power within a range of configured parameters and to perform DRX operations.

Even in a case that DRX parameters of the macro base station and small base station are configured as aligned for the multiple connectivity terminal by using the above-explained method, the terminal and respective base stations supporting multiple connectivity functions may perform DRX operations independently from a counterpart base station. In other words, the multiple connectivity terminal may perform DRX operation for the macro base station according to DRX parameters configured for the macro base station, and perform DRX operation for the small base station according to DRX parameters configured for the small base station.

In addition, in order to simplify signaling of DRX parameters for the multiple connectivity terminal, when DRX operation parameters are configured in the step of configuring multiple connectivity, DRX parameters may be restricted by applying only one of long DRX cycle and short DRX cycle.

When the multiple connectivity terminal performs DRX operation, if the timer 'timeAlignmentTimer' for determining whether uplink synchronization with the macro base station (or, small base station) is maintained or not expires and the same timer for the other base station (i.e., the small base station (or, macro base station)) constituting multiple connectivity, synchronization with the base station may be determined as maintained by the terminal, and the terminal may operate based on the determination.

Thus, for the multiple connectivity terminal, the timer 'timeAlignmentTimer' for determining whether uplink synchronization is maintained during DRX operation may be configured in reference to the macro base station or not be configured.

That is, if the timer 'timeAlignmentTimer' for the macro base station does not expire although the same timer for the small base station expires, the terminal may be controlled to maintain uplink control channels for the small base station without releasing.

Therefore, in a case that uplink transmission is necessary in the terminal, the terminal may request resources by using a scheduling request (SR) field of the uplink control channels, and transmit control information necessary to be transmitted via uplink. Even in the case using the above-described method, if the small base station (or, cell of the small base station) is deactivated through activation or deactivation procedure, the terminal may be controlled to release uplink control channels of the small base station (or, cell of the small base station).

As a method for improving system capacity by using radio resources of one or more base stations, a method for providing real-time services in more efficient and stable manner should be considered in addition to the DL/UL decoupling technique.

The system capacity can be improved through multiple connectivity with a macro a base station and a small base station. However, due to a small service range of small base station, real-time services such as VoIP etc. to a terminal moving at a speed faster than a predetermined speed (e.g., 60 Km/h) may be unstable.

Therefore, even when multiple connectivity are maintained with a macro base station and a small base station, a method in which only a macro base station provides real-time services may be considered.

Radio Protocol Structure for Data Plane

In a case that a macro base station forwards (or, transfers) data transferred from a gateway to a small base station via Xs interface between the macro base station and the small base station, the macro base station may perform flow control function so as to adjust quantity of data transferred to the small base station according to a target quantity for flow control. The target quantity for flow control may be determined by the macro base station, or determined by the small base station in consideration of radio resource capacity which the small base station can allocate for multiple connectivity. Information on the radio resource capacity for multiple connectivity may be transferred from the small base station to the macro base station when multiple connectivity are configured.

If data of the same bearer is divided into and transmitted through both the macro base station and the small base station, the macro base station may transfer data to the small base station according to the radio capacity which the small base station can allocate for multiple connectivity when connection for the bearer is configured, and transmit data of the corresponding bearer to the multiple connectivity terminal by using radio resources of the macro base station.

FIGS. 16A, 16B, 16C, and 16D illustrate examples of data plane (UP: User plane) protocol structures.

Figure 16A:
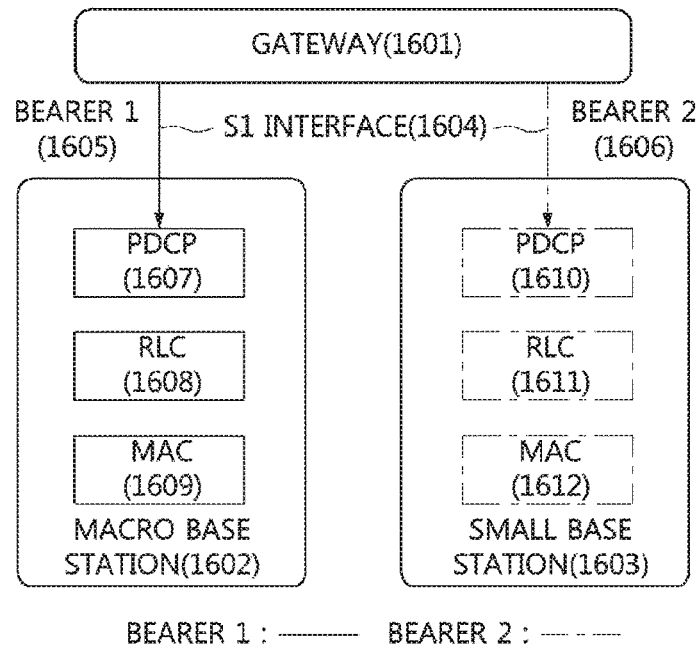
FIGS. 16A, 16B, 16C, and 16D illustrate examples of data plane (UP: User plane) protocol structures.

FIG. 16A illustrates a first example of data plane structure in which bearers providing services through a macro base station 1602 and a small base station 1603 are separated.

That is, in the first example, data transmission/reception of a first bearer 1605 may be performed by only the macro base station 1602, and data transmission/reception of a second bearer 1606 may be performed by only the small base station 1603. Also, each of the macro base station 1602 and the small base station 1603 maintains respective independent S1 interfaces 1604 with a gateway 1601. Also, the macro base station 1602 and the small base station 1603 may independently perform radio protocol functions of PDCP layer 1607 and 1610, RLC layer 1608 and 1611, and MAC layer 1609 and 1612.

The above-described flow control between the macro base station 1602 and the small base station 1603 is not necessary for the first example. However, there is a disadvantage that encryption functions should be respectively performed for the small base station and small base station when the two base stations perform PDCP functions 1607 and 1610 independently. Therefore, even when a terminal performs encryption function by using a plurality of encryption keys or the macro base station 1602 and the small base station 1603 independently perform PDCP function 1607 and 1610, a function like a single encryption function should be provided to a multiple connectivity terminal by using an identical encryption key or an encryption key which can be shared. For this, the multiple connectivity terminal can be controlled to use only one of encryption keys of the macro base station 1602 and the small base station 1603.

Figure 16B:
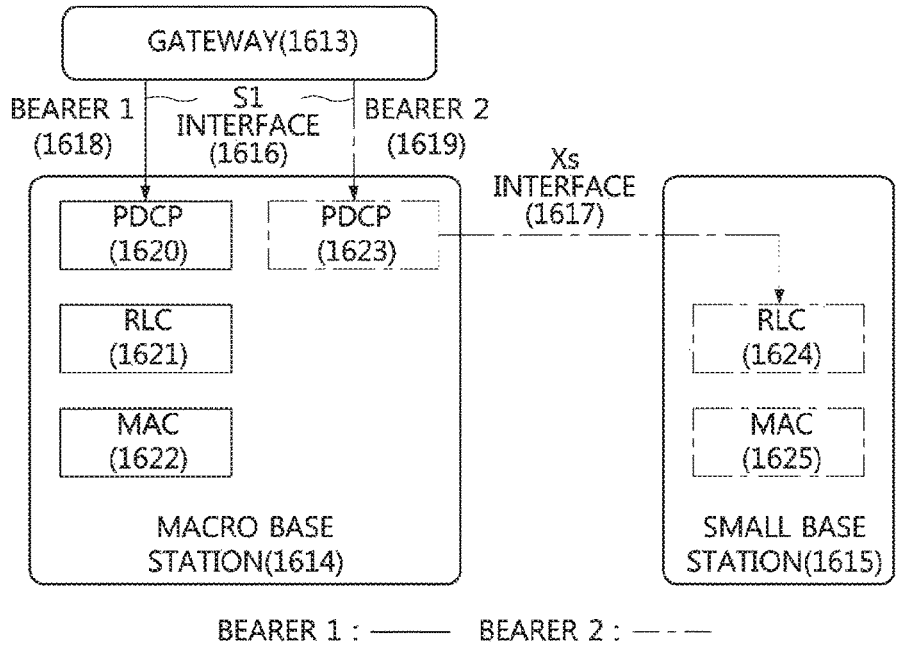

FIG. 16B illustrates a second example of data plane protocol structure in which a bearer providing services through a macro base station 1614 and a small base station 1615 is separated. However, in the second example, radio protocol structures of the macro base station 1614 and the small base station 1615 are not independent.

That is, in the second example, the small base station does not maintain an independent S1 interface 1616 with a gateway 1613, and configures a S1 interface via the macro base station 1614 by using a Xs interface 1617. Also, functions of a PDCP 1623 for providing services of a second bearer 1619 to the small base station 1615 are performed by the macro base station 1614.

Differently from the first example, since functions of PDCP 1620 and 1623 are performed only in the macro base station 1614, it is not necessary that encryption functions are performed independently in such the manner of the first example. However, flow control between the macro base station 1614 and the small base station 1615 is necessary.

Each of the macro base station 1614 and the small base station 1615 provides respective services of different bearers to the multiple connectivity terminal. A function of sequential aggregation (e.g., in-sequence delivery or re-ordering) on the corresponding data may be performed on respective bearers in a PDCP layer of the terminal. Control of retransmission for intimal transmission failure may be performed by using ARQ function of RLC layer, and a base station in which the initial transmission fails may perform retransmission. That is, if data transmission fails in the macro base station 1614, the RLC layer 1621 of the macro base station 1614 performs retransmission, and if data transmission fails in the small base station 1615, the RLC layer 1624 of the small base station 1615 performs retransmission.

In a case that both the macro base station 1615 and the small base station 1615 receive data transmitted from the terminal via uplink, sequential aggregation function for transferring the received data to the gateway 1613 is performed in the PDCP layer 1623 of the macro base station for a second bearer 1619, and performed in the PDCP layer 1620 of the macro base station for a first bearer 1618.

Control of retransmission for initial transmission failure is performed by using ARQ function of RLC layer, the base station identifying the initial transmission failure requests retransmission of the data to the terminal, and the multiple connectivity terminal transmits retransmit data to the corresponding base station. That is, in a case that the macro base station 1614 identifies failure of data reception, the RLC layer 1621 of the macro base station 1614 performs ARQ function, and in a case that the small base station 1615 identifies failure of data reception, the RLC layer 1624 of the small base station 1615 performs ARQ function. In the second example, the functions of RLC layers 1621 and 1624, and the functions of MAC layers 1622 and 1625 may be performed by respective base stations as separated for respective bearers.

Figure 16C:
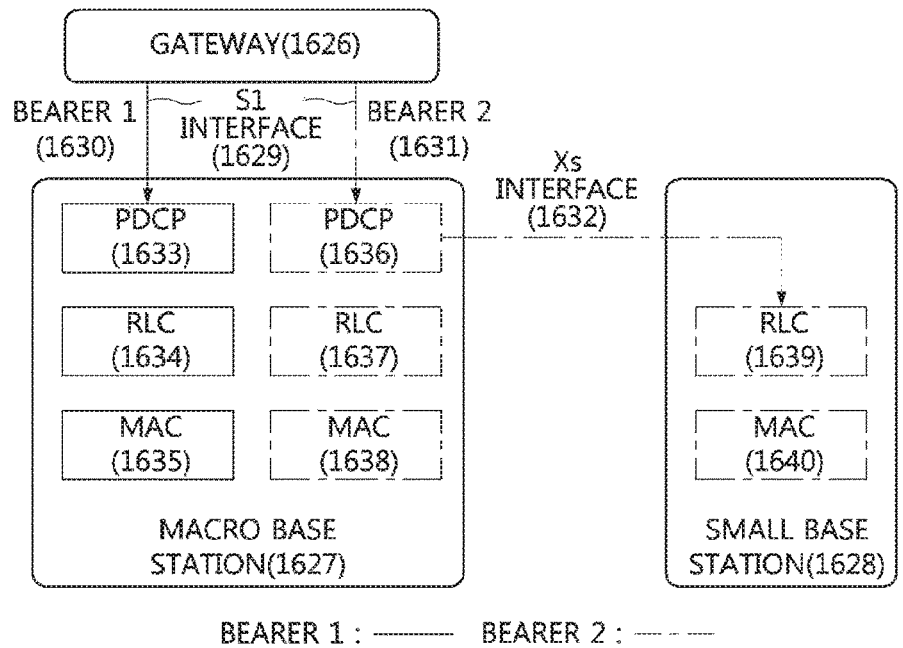
Figure 16D:
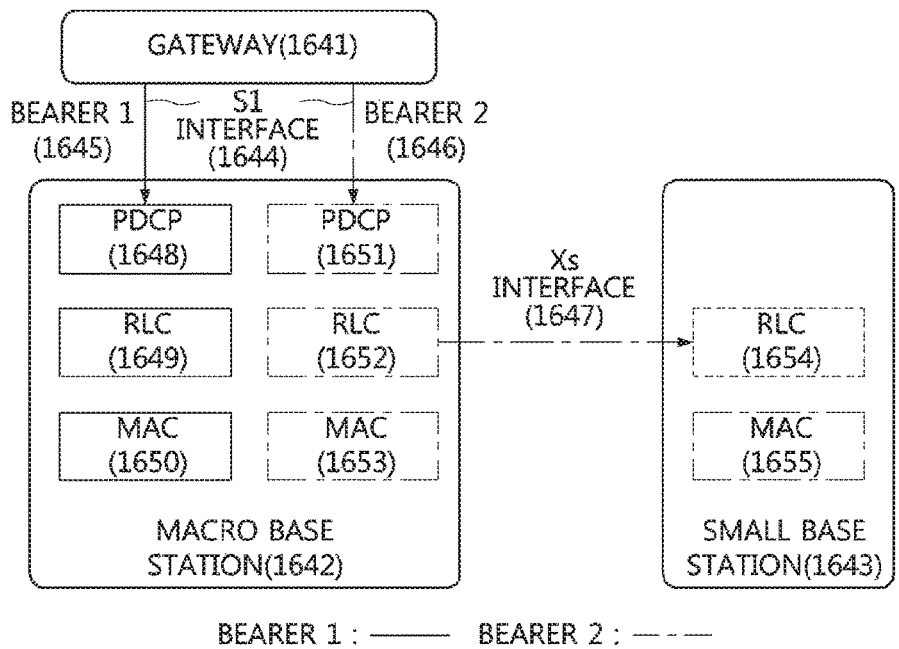

FIG. 16C and FIG. 16D respectively illustrate a third example and a fourth example of data plane protocol structure.

The third example and the fourth example are protocol structures in which both a macro base station and a small base station provide services for a same second bearer service. In the third and fourth examples, flow control between the macro base station and the small base station is necessary.

In the third example, a first bearer 1630 provides a multiple connectivity terminal with services by using PDCP 1633, RLC 1634, and MAC 1635 functions of the macro base station 1627. Also, the second bearer 1631 is performed by dividing radio protocol functions of the macro base station 1627 and the small base station 1628 under PDCP layer.

The PDCP layer 1636 of the macro base station 1627 performs PDCP functions for both the macro base station 1627 and the small base station 1628 for providing services of the second bearer 1631. Functions of the RCL layers 1637 and 1639 and functions of the MAC layers 1638 and 1640 are performed independently. That is, the service of the second bearer 1631 is provided to the multiple connectivity terminal by using functions of PDCP 1636, RLC 1637, and MAC 1638 of the macro base station 1627, and functions of RLC 1639 and MAC 1640.

Thus, data of the second bearer 1631 among a plurality of bearers may be transmitted from or received by the multiple connectivity terminal through downlink or uplink radio resources of both the macro base station 1627 and the small base station 1628.

In the multiple connectivity terminal, a function of sequential aggregation (e.g., in-sequence delivery or re-ordering) on the corresponding data may be performed in the PDCP layer of the terminal. Control of retransmission for intimal transmission failure may be performed by using ARQ function of RLC layer, and a base station in which the initial transmission fails may perform retransmission. That is, if data transmission fails in the macro base station 1627, the RLC layer 1637 of the macro base station 1627 performs retransmission, and if data transmission fails in the small base station 1628, the RLC layer 1639 of the small base station 1628 performs retransmission.

Also, data of the second bearer 1631 transmitted by the terminal in uplink may be received through radio resources of the small base station 1628 and the macro base station 1627. Here, sequential aggregation function on the data to be transferred to a gateway 1626 may be performed by the PDCP layer 1636 of the macro base station 1627. The base station identifying the initial transmission failure requests retransmission of the data to the terminal, and the multiple connectivity terminal transmits retransmit data to the corresponding base station. That is, for the service of the second bearer, if the macro base station 1627 identifies failure of data reception, the RLC layer 1637 of the macro base station 1627 performs ARQ function for retransmission, and if the small base station 1628 identifies failure of data reception, the RLC layer 1639 of the small base station 1628 performs ARQ function for retransmission.

The small base station 1628 receiving the data of second bearer may transfer the data to the gateway 1626 via the macro base station 1627 by using Xs interface 1632 configured with the macro base station 1627.

The fourth example is a protocol structure in which a service of the second bearer 1646 is performed by dividing RLC functions of a macro base station 1642 and a small base station 1643.

That is, a RLC layer 1652 of the macro base station 1642 performs an M-RLC function, and a RLC layer 1654 of the small base station 1643 performs a s-RLC function.

Similarly to the third example, in the fourth example, a PDCP layer 1651 of the macro base station 1642 performs PDCP functions for both the macro base station 1642 and the small base station 1643 for providing services of the second bearer 1646, and functions of MAC layers 1653 and 1655 are performed independently.

That is, the service of the second bearer 1646 provides its service to a multiple connectivity terminal by using PDCP 1651, RLC 1652, and MAC 1653 of the macro base station 1642, and RLC 1654 and MAC 1655 of the small base station 1643.

Thus, data of the second bearer 1646 among a plurality of bearers may be transmitted from or received by the multiple connectivity terminal through downlink and uplink radio resources of both the macro base station 1642 and the small base station 1643.

In the multiple connectivity terminal, a function of sequential aggregation (e.g., in-sequence delivery or re-ordering) on the corresponding data may be performed in the PDCP layer of the terminal. Also, data of the second bearer 1646 transmitted by the terminal in uplink may be received through radio resources of the small base station 1643 and the macro base station 1642. Here, sequential aggregation function on the data to be transferred to a gateway 1641 may be performed by the PDCP layer 1651 of the macro base station 1642.

Functions of the RLC including ARQ function for retransmission of respective base stations may become different according to a separation degree of RLC functions of the macro base station 1642 and the small base station 1643. Thus, the retransmission function for the second bearer service may be performed for each base station similarly to the third example, or operate by restricting retransmission function in the small base station 1643.

In the fourth example, a method, in which the RLC layer 1654 of small base station 1643 performing s-RLC function for the service of second bearer 1646 is omitted and the RLC layer 1652 of macro base station 1642 performs RLF functions for the small base station 1643, is also possible. In other words, for the service of second bearer, the macro base station 1642 and the small base station 1643 may independently perform only the MAC functions 1653 and 1455, and PDCP and RLC functions for the small base station 1643 may be performed in the PDCP layer 1651 and RLC layer 1652 of the macro base station 1642. Here, ARQ retransmission function may be performed in the RLC 1652 of the macro base station 1642, one of the macro base station 1642 and the small base station 1643 which can use radio resources may be selected, and the selected base station may perform retransmission when an initial transmission fails.

As explained above, the third example of FIG. 16c is a structure in which services are provided using both the macro base station and the small base station for the same second bearer service. Also, the first example illustrated in FIG. 16a uses only the macro base station 1602 to perform data transmission/reception of the first bearer, and uses only the small base station 1603 to perform data transmission/reception of the second bearer 1606. Although the first example has an advantage of easily using existing base station functions, it has disadvantages that the small base station 1603 and the macro base station 1602 should respectively configure S1 interfaces 1604 with the gateway 1601, perform PDCP functions independently, and perform encryption functions independently. Also, although the third example has an advantage that only the macro base station 1627 maintains the S1 interface 1629 with the gateway 1626 and performs functions of a single PDCP, there are disadvantages that functions of the RLC layers 1637 and 1439 and MAC layers 1638 and 1440 are performed independently, and complexity of resource allocation and relevant control information (e.g., BSR, PHR) transmission/reception increases since both the macro base station 1627 and the small base station 1628 transmit the same second bearer service.

The user plane radio protocol may be configured by taking only advantages of the first method and the third method. For example, only the macro base station 1627 maintains the S1 interface 1629 with the gateway 1626, and one of the macro base station 1627 and the small base station 1628 may be controlled to perform transmission and reception of data packet for the service of second bearer at an arbitrary time.

That is, for a predetermined duration, the macro base station may provide the service of second bearer by considering load statuses of the macro base station and the small base station, radio channel environment, terminal capability, etc. Also, after the predetermined duration, the small base station may provide the service of second bearer by considering load statuses of the macro base station and the small base station, radio channel environment, terminal capability, etc. According to the above-described method, since a bearer is served even for a multiple connectivity terminal by only one base station at an arbitrary time, complexity of resource allocation and relevant control information transmission/reception for independently performing functions of RLC layers and MAC layers may decrease. As described above, the predetermined duration (e.g., multiple connectivity eNB operation duration) may be configured as several hundreds of milliseconds to several tens of seconds, and configured according to properties of services provided by multiple connectivity. The parameter of the multiple connectivity eNB operation duration may be configured in the step of configuring multiple connectivity, or controlled to change in a static manner during provision of multiple connectivity service.

Methods for Resolving Problems of Increased Signaling in Path Switching Due to Frequent Handovers.

For reducing network-level signaling overhead due to frequent handovers, the above-described C/U-plane separation technique may be considered with a multiple connectivity function.

Figure 17:
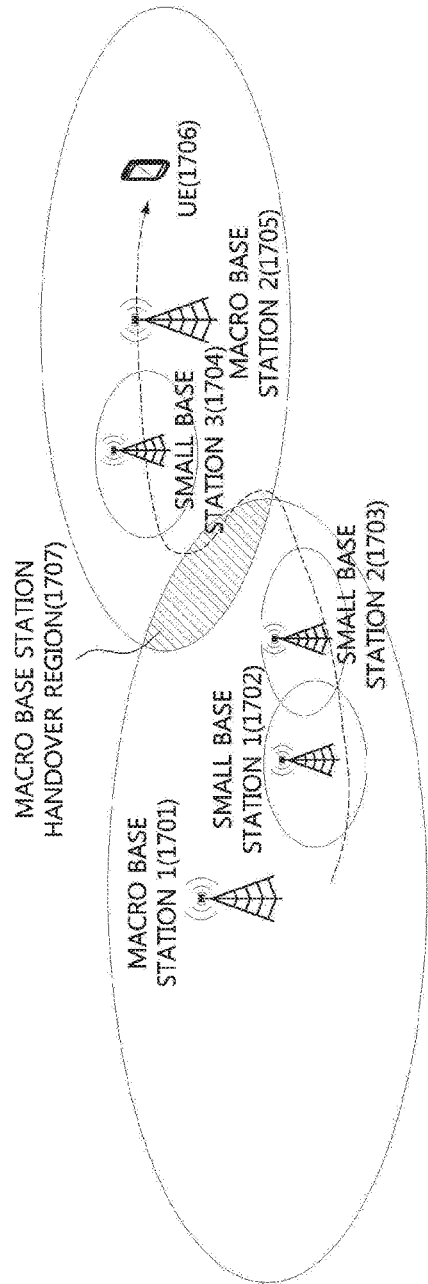
FIG. 17 is a conceptual diagram to explain a procedure for performing handover.

FIG. 17 is a conceptual diagram to explain a procedure for performing handover.

When a terminal moves as maintaining connections simultaneously with both a macro base station and a small base station by using a multiple connectivity function, as illustrated in FIG. 17, a multiple connectivity function may be used for a handover procedure between macro base stations 1701 and 1705 and small base stations 1702, 1703, and 1704 in a local layer.

In other words, a handover procedure is performed only between a first macro base station 1701 and a second macro base station 1705 by using multiple connectivity function, and other procedures except the handover procedure, which are simpler than the handover procedures, such as connection reconfiguration, small base station addition/deletion/change for multiple connectivity, etc., may be performed between a macro base station and small base stations 1702, 1703, and 1704.

For this, when a terminal moves between the small base station 1702 and the small base station 1703 in a local layer, network-level path switching and signaling overhead can be reduced by using not a handover procedure but a function for small base station addition or deletion for multiple connectivity.

For a terminal which does not support multiple connectivity functions, a handover procedure may be necessary for movement between the macro base station 1705 and the small base station 1704 in a local layer.

If the terminal 1706 identifies that channel quality of the small base station 1702 is good while moving as configuring a connection to the macro base station 1701, the terminal may report it the macro base station 1701 and configure an additional connection with the small base station 1702 by using not the handover procedure but the multiple connectivity function so as to configure connections simultaneously with the macro base station 1701 and the small base station 1702.

Then, if the terminal 1706 moving continuously identifies the small base station 1703 having channel quality better than that of the small base station 1702, the terminal may release the connection with the small base station 1702 while maintaining the connection with the macro base station 1701, and add the small base station 1703 by using small base station addition and deletion functions for multiple connectivity.

Also, if the terminal 1706 moves to an area where the connection with the small base station 1703 cannot be maintained, the terminal may release the connection with the small base station 1703 and terminate multiple connectivity functions while maintaining only the connection with the macro base station 1701.

If the moving terminal 1706 identifies the macro base station 1705 having channel quality better than that of the macro base station 1701, the terminal may perform a handover from the macro base station 1701 to the macro base station 1705 according to the handover procedure.

If the terminal 1706 maintaining the connection with the macro base station 1705 identifies the small base station 1704 having good channel quality, the terminal may configure connections simultaneously with the macro base station 1705 and the small base station 1704 by adding a connection with the small base station 1704 through multiple connectivity functions.

If the terminal 1706 moves out from a service area of the small base station 1704 and so the channel quality becomes poor, the terminal may terminate multiple connectivity functions by releasing the connection with the small base station 1704, and maintain only the connection with the macro base station 1705. Meanwhile, in the above-described explanation, if a small base station exists in a handover region 1707 of the macro base station 1701 and the macro base station 1705, a handover procedure between the macro base stations may be performed while multiple connectivity with the small base station and the macro base station is maintained.

In the existing mobility management, a terminal compares measured reception signals of new cells or adjacent cells (e.g., RSRP, RSRQ) with threshold values of mobility management events, and determines whether to perform mobility control procedures based on the comparison results.

In the existing mobility management method, the threshold values are determined according to a serving cell with which a single connection is configured. Alternatively, in case of a CA environment, the threshold values are determined on the basis of a Primary Cell (PCell) or a Second Cell (SCell). In this case, for all cells, if an event condition (e.g., event A3 in 3GPP LTE system) is met since a reception signal of SCell becomes better than that of PCell, a handover procedure to change the corresponding SCell to PCell and change the PCell to SCell is performed.

However, when a terminal maintaining configuration of multiple connectivity moves, further considerations are required. That is, even when a handover event is met since a reception signal of a cell measured by the terminal is better that that of the macro cell, the terminal cannot release the connection with the macro base station and perform a handover to the new cell if the new cell is a small base station. Therefore, according to whether the measured cell is a small base station or a macro base station, criteria for determining whether the A3 event triggering a handover is met or not should become different.

For this, in the case of the second example of radio protocol structure illustrated in FIG. 3B, measurements and reports for mobility management should be configured in the M-RRC of the macro base station, and relevant control messages should be generated. Here, a new field (e.g., a 'celltype' parameter which becomes '1' for a macro cell, or '0' for a small cell) may be added in the control message for related configuration, or type (macro cell or small cell) of the corresponding cell may be identified by using the existing field (e.g., 'measId' may be used as differentiated for a macro cell or a small cell).

On the basis of the above-described information, a current situation may be identified as that a terminal triggers a handover through transmission of a measurement report, that the terminal simply reports measurement results, or that addition/change/release of a small cell constituting multiple connectivity is triggered.

As other methods, there are a method of separately allocating a cell identifier such as a physical layer cell identifier (PCI) and a unique cell identifier (CGI) included in system information to a macro cell and a small cell, and a method of making the terminal identify whether a nearby cell is a macro cell or a small cell by using additional method.

The terminal may report measurement results to the base station periodically or when an event occurs. Here, in case that the terminal reports measurement reports according to occurrence of events, the terminal may report measurement results when a Time-To-Trigger (TTT) timer expires after occurrence of event. The TTT timer is used for preventing ping-pong effects due to frequent handovers caused by instantly reported measurement results when A3 event triggering handover occurs, or preventing handover failures.

However, for a terminal maintaining configuration of multiple connectivity, special consideration on parameters for trigger and performing handover, including such the TTT timer, is necessary.

In other words, even in case that it is identified that A3 event triggering handover is satisfied by that a signal quality of a nearby or new cell is better than that of a macro cell (a current PCell), discriminatory parameters including the TTT timer may be used according to whether the nearby or new cell is a macro cell or a small cell.

For example, as a method of using two or more TTT timers, two TTT timers may be operated for supporting multiple connectivity function (or, HetNet function).

One of the TTT timers (e.g. TTT_SCell) may be configured to have a relatively shorter TTT timer value, and used for addition/change/deletion of the small cell, and the other of the TTT timers (e.g. TTT_PCell) may be configured to have relatively longer TTT timer value, and used for triggering a handover of a macro cell.

If the nearby or new cell satisfying the measurement event for mobility management is a small cell, the terminal may be controlled to report the measurement result by using the short TTT_SCell timer. On the contrary, if the nearby or new cell is a macro cell, the terminal may be controlled to report the measurement result by using the long TTT_PCell timer. Thus, when the nearby cell or new cell is a macro cell and it satisfies A3 event, the base station may control the terminal to perform a handover procedure by transmitting a connection reconfiguration control message to the terminal for a handover between macro cells.

Also, when the nearby cell or new cell is a small cell and it satisfies A3 event, the base station may control the terminal to perform a related control procedure for configuring multiple connectivity by transmitting, to the terminal, a control message instructing addition/change of a small cell in configuration of multiple connectivity, not the connection reconfiguration control message.

In addition to the above-described TTT timer, an additional event for small cell management, such as A6 event for SCell management in CA environment, may be defined, threshold values for respective events may be discriminatorily defined for supporting multiple connectivity functions, or additional parameters may be defined and operated for radio link failure (RLF) reporting, Handover failure (HOF) reporting, etc.

Enhancing User Transmission Rate Using Radio Resources of One or More Base Stations In a 3GPP LTE system that is a packet based mobile communication system, for a single base station (eNB), a user transmission rate can be enhanced by operating multiple serving cells through conventional CA functions or RRHs connected via ideal backhaul links. Here, the meaning of the single base station is that multiple cells of the base station are managed and controlled by a single RRC function, such as connection configuration on terminals within an area, radio resource allocations, measurement configuration and report, mobility functions, etc.

However, when a macro cell and a small cell are connected through a non-ideal backhaul link in the same base station, or the macro cell and the small cell belong to different base stations, it is impossible to enhance the user transmission rate for the conventional LTE system. Thus, it is necessary to introduce new functions such as multiple connectivity function based on small cell, etc.

Figure 18:
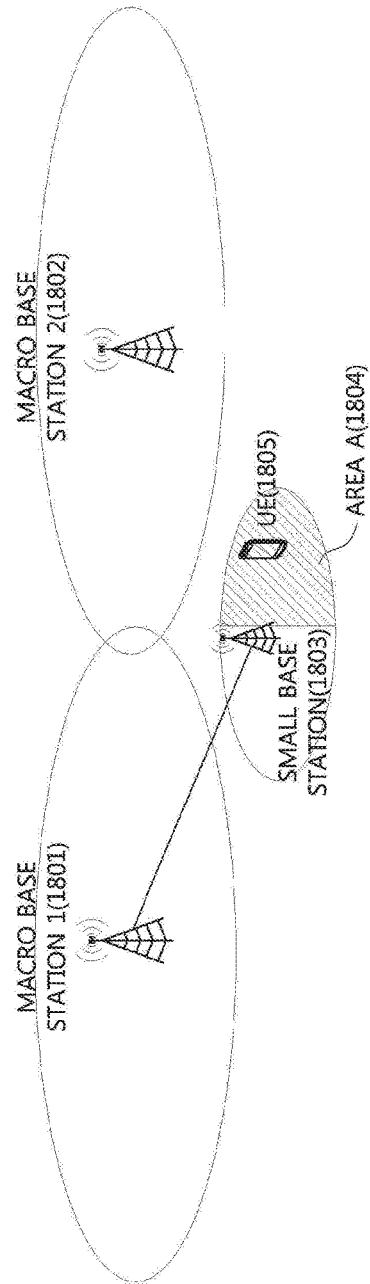
FIG. 18 exemplarily illustrates a case in which a small base station is located in a boundary of a macro base station in a local access mobile network using small base stations.

FIG. 18 exemplarily illustrates a case in which a small base station is located in a boundary of a macro base station in a local access mobile network using small base stations.

As illustrated in FIG. 18, for enhancing user transmission rate in the small base station (area A) located in the boundary of the macro base station, it should be considered to support multiple connectivity functions in the environment having different base stations.

That is, the terminal 1805 located in the area A 1804 should support the multiple connectivity function between the small base station 1803 belonging to the macro base station 1801 and the macro base station 1802, in order to be provided with high QoS services through the nearby small base station 1803 which cannot be provided using conventional CA or CoMP functions.

Transferring System Information for Multiple Connectivity

The multiple connectivity terminal may receive system information of a macro base station or a small base station whose connection is additionally configured for multiple connectivity via a dedicated control message, or obtain the system information from a broadcast channel of the corresponding base station in the procedure of configuring multiple connectivity.

In case that system information of base stations constituting multiple connectivity changes after completion of multiple connectivity configuration, whole or a part of the system information of the corresponding base station may be transmitted to the terminal via a dedicated control message. Here, in case that a part of the system information is transmitted, only changed information may be transmitted, or the terminal may be controlled to receive system information being broadcasted by providing a list of unchanged system information. When only changed system information block (SIB) or information on unchanged SIBs is provided, a bitmap may be used for indicating changed SIBs among SIBs constituting system information. The information notifying which SIBs changed may be transmitted as SIB1 used for transmitting scheduling information of system information blocks, or through a separate resource for system information transmission. Alternatively, the information notifying which SIBs changed may be transmitted using bitmap information, etc., together with a system information change message transmitted through a paging channel using a paging RNTI (P-RNTI).

Also, the multiple connectivity terminal may obtain the information notifying which SIBs changed from the system information change message on the paging channel broadcasted using P-RNTI to all terminals in the cell, not the dedicated control message, and receive the system information broadcasted from the base station to all terminals through a broadcast channel based on the information notifying which SIBs changed. In this case, the terminal may be controlled to selectively receive only changed system information by indicating which SIBs changed, and the information may be represented in a bitmap form. The information on changed system information of the macro base station can be transmitted via a dedicated control message, and only changed SIBs may be selectively transmitted.

As another method of transferring system information for supporting multiple connectivity function, an additional system information block or system information message may be defined as including only common system information blocks in system information of multiple connectivity base stations and system information parameters necessary for supporting multiple connectivity function. After constructing the additional system information (system information block or system information message) for supporting multiple connectivity function, the base station may transmit the additional system information to the terminal via a dedicated control message. Also, when all or some of parameters constituting the additional system information (system information block or system information message) are changed, the base station may transmit a dedicated control message to the multiple connectivity terminal by constructing the dedicated control message based on only changed system information parameters or reconstructing the whole dedicated control message.

In case that the terminal receives the additional system information block or system information message comprising only the common system information or the essential system information parameters for multiple connectivity, the terminal may obtain other system information blocks or system information messages from system information blocks transmitted from the base station through a broadcast channel. Here, the system information that the terminal receives through the dedicated control message may have a higher priority than that of the system information received through the broadcast channel. However, when the terminal receives the control message or the paging channel message indicating change of system information, the terminal should update system information by using the broadcast channel or the dedicated control message.

As still another method, when the base station supporting multiple connectivity function reports change of all or part of system information as explained above, the multiple connectivity terminal may selectively inform the base station of which information the terminal requires, and the base station may configure a control message as comprising only system information requested by the terminal, and transmit the control message to the terminal through the dedicated control message.

That is, the base station may transmit the only changed system information to the terminal, or notify the changed system information to the terminal by indicating the changed system information through a bitmap parameter. The multiple connectivity terminal which identifies the fact that all or some of system information are changed may select only system information needed for itself and request the base station to transmit the selected system information to itself. The control message requesting the necessary system information may be configured in a form of a MAC layer control message or an RRC layer control message, and transmitted to the macro base station or the small base station. In a specific case, the system information may be requested by using a specific field of a physical layer indication channel or a physical control channel.

The multiple connectivity base station receiving the transmission request on all or some of system information may configure the corresponding system information and transmit it to the terminal through a dedicated control message.

The multiple connectivity terminal may update stored system information, perform configuration of necessary parameters and operations according to the changed system information received from the base station according to the request.

For example, when some of system information on allocation of radio resources of a base station (or, a cell) including physical channel configuration, system information on cell re-selection for cells located in the same frequency or nearby frequencies, list information of nearby cells in the same frequency (e.g. list information of cells whose access is restricted (black list), or list information of cells to which access is possible (white list), etc.), system information on inter-rat systems using unlicensed frequency bands such as WLAN (e.g. industrial, scientific, medical (ISM) band), or system information on services such as MBMS, earthquake and tsunami warning system (ETWS), and commercial mobile alert service (CMAS) among system information of a base station (or, cell) supporting multiple connectivity function changes, the multiple connectivity terminal may notify to the terminal that changed system information among the above information exists. If the multiple connectivity terminal is informed of the system information change, the terminal may selectively request system information necessary for itself to the base station, receive the corresponding system information from the base station via a dedicated control message, and update stored system information based on the received system information. Specially, in case that the system information on systems existing in unlicensed frequency bands such as WLAN, etc. is transferred as separately configured, the terminal can selectively request and receive the corresponding system information even when the base station does not notify the system information change.

<Control Channel Performance Enhancement and Access Control for a New Carrier Type (NCT) Cell>

The 3GPP LTE system is characterized in that it has bandwidth scalability to support a variety of system bandwidths. Also, the LTE system adopts a carrier aggregation (CA) function in which a single terminal exchanges packet data simultaneously with multiple cells to enhance system throughput.

The LTE system uses cell-specific reference signals (CRS) on a physical channel which are common signals used for estimating signal strength and quality of a cell. However, in order for a terminal to receive packet data, additional reference signals are required in addition to the CRS. Therefore, the 3GPP LTE system beyond release-10 adopts a UE-specific reference signal (DM-RS) and a channel state information reference signal (CSI-RS) for channel state estimation, whereby efficiency of CRS decreases as compared to radio resources occupied for CRS transmission and inefficiency increases.

Thus, the introduction of a non-backward compatible new carrier type (NCT) technology can be considered to enhance spectral efficiency and energy efficiency in a hierarchical cell environment using small cells.

Figure 19:
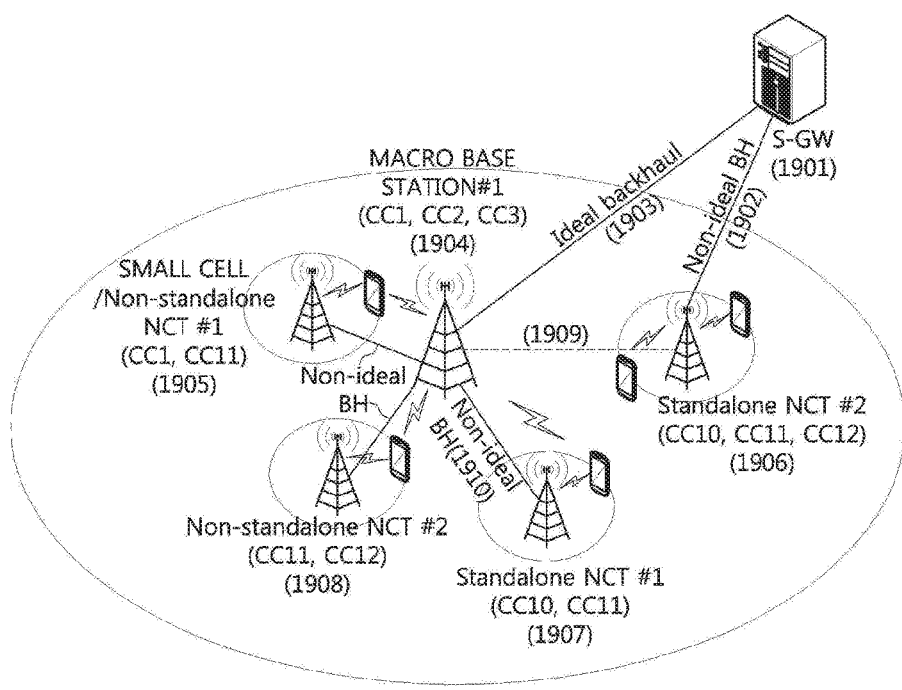
FIG. 19 illustrates a configuration example of a local access mobile network using a NCT cell.

FIG. 19 illustrates a configuration example of a local access mobile network using a NCT cell.

As illustrated in FIG. 19, the local access mobile network using at least one NCT cell may be configured by using standalone NCT cells 1906 and 1907 which can operate without an associated cell, and by using non-standalone NCT cells 1905 and 1908 for which control signaling through an associated cell is possible.

The non-standalone NCT cell may operate by using a macro base station 1904 as an associated cell as illustrated as the non-standalone NCT cell 1908 of FIG. 19, or by using a small base station as an associated cell as illustrated as the non-standalone NCT 1905. In other words, the small base station 1905 means a cell which operates as a small base station by using CC1 and configures the non-standalone NCT 1905 by using CC11.

In addition, a standalone NCT cell may construct a local access mobile network in which it can connect to S-GW 1901 through a cell having a S1 interface to the S-GW 1901 and the macro base station 1904. That is, although a standalone NCT cell can be connected to the S-GW 1901 via a non-ideal backhaul 1902 as the standalone NCT cell 1906, it may construct a network through a connection to the macro base station 1904 using the non-ideal backhaul 1910 with a cell having a S1 interface to the S-GW 1901 as the standalone NCT cell 1907 does.

Of course, the standalone NCT cell 1906 and the macro base station 1904 may configure necessary interfaces by using the connection 1909. In FIG. 19, the connections 1909 and 1910 may be configured with an ideal backhaul, a non-ideal backhaul, or a radio channel using radio frequency.

Scenario to which a NCT Cell is Applied

As illustrated in FIG. 19, the configuration of the local access mobile network using a NCT cell may be considered as classifying the NCT cell into a non-standalone NCT cell performing control signaling using an associated cell, and a standalone NCT cell operating independently without an associated cell.

The frequency applied to the NCT cell may be a new frequency band other than a conventional frequency band.

The non-standalone NCT cell using an associated cell may operate as a macro base station or a small base station, and may operate in a form of MBSFN subframes so that efficiency of MBMS service or unicast service can be enhanced.

In the non-standalone NCT cell, system information and paging information may be received through the associated cell, and downlink services may be provided through a cross-scheduling using an enhanced PDCCH (ePDCCH) of the NCT cell or a PDCCH of the associated cell. The uplink services can be provided by using the associated cell.

NCT Macro Base Station: Outdoor Cell (Providing Unicast Service)
While providing MBMS service, related signaling is provided through the associated cell
Associated UL: counting and Indication transmission
Associated DL: MBMS SIB change and session start notification
NCT Small Base Station: Indoor/Outdoor Cell (Providing Unicast Service)

The standalone NCT cell may independently provide services without an associated cell. The configuration of new control channels such as ePDCCH and enhanced PHICH (ePHICH) can enhance system performance, and efficient discovery signals for small base stations can be introduced.
NCT macro base station: outdoor cell (providing MBMS service)
NCT small base station: indoor cell
Configuration of Physical Layer Channels The macro NCT cell may transmit a Primary Synchronization Signal (PSS) and a Secondary Synchronization Signal (SSS) as the existing cell does. When the reduced CRS is introduced to the macro NCT cell, synchronization configuration and tracking procedure may be performed by using the above signals. However, a more efficiency way is required to prevent attempts to camp on the NCT cell during cell search procedures of legacy terminals.

Moreover, in case that the small NCT cell transmits conventional PSS/SSS, interferences of the macro base station may make detection of synchronization signals difficult. Although the non-standalone NCT cell can perform the synchronization configuration and tracking procedure by using a compatible associated cell, the standalone NCT cell may require allocation of physical channel identity (PCI), a physical channel for acquisition of PCI, and a method of operating an enhanced PSS/SSS.

Configuration of Downlink Channels
As downlink control channels for the NCT cell, in addition to the physical layer control channel transmitted as ePDCCH, the following control channels or signaling methods may be considered.
System Information Transmission (Only for Standalone NCT Cell)
Master Information Block (MIB) transmission: Identical to existing method
SIB transmission: Identical to existing method
However, consideration on macro cell interferences is necessary in co-channel cases.
Configuration of PSS/SSS (Prioritized for Standalone NCT Cell)
Possible use of PSS/SSS identical to conventional PSS/SSS. However, positions of them can change.
Consideration on macro cell interferences is necessary
In case of no PSS/SSS: a new physical channel for PCI acquisition or a mapping rule using an arbitrary physical channel (a preliminary recognition)
In case of non-standalone cell, operating is possible without synchronization channels.
Configuration of ePHICH Through which H-ARQ ACK/NACK Information is Transmitted
Required for efficient HARQ operations
RA Allocation of Associated Cell for NCT Cell and Related Information May be Transferred Through SIB of Associated Cell
Introduction of additional SIB for NCT cell, or addition of a new field to SIB2
Consideration on Subframes Having No PDCCH
PRB mapping method
Resource allocation method for Reduced CRS, CSI-RS, and DM-RS
PCFICH=0 configuration change
Currently: subframe on a carrier not support PDSCH
Change: Addition of explanation on NCT cell
or, indicating in SIB1 information
Access Control Method for Standalone NCT Cell For the standalone NCT cell, the above-explained synchronization channel (e.g. PSS/SSS, etc.) and minimum system information (e.g. MIB, SIB1, SIB2) should be transmitted in order for a terminal to obtain minimum information needed for configuring physical layer channels such as downlink physical layer synchronization, system bandwidth, cell identifier, and random access resources without help of an associated cell.

Also, when measurements of reduced CRS are not enough for the terminal to discover the NCT cell or to perform measurements for mobility managements, if necessary, introduction of additional references signals or modification of RS transmission is required. Also, it is necessary to analyze what effects introduction of enhanced control channel (ePDCCH) gives to the NCT cell environments. For example, it is required to enhance scheduling methods for SIB/SIB2 transmission resources, paging information resources, and RA response transmission resources.

Configuration of Common Search Space
Although ePDCCH is assumed to be used as a physical layer control channel of a NCT cell, consideration on the common search space for random access, paging and system information reception is not satisfactory for the current ePDCCH.

Thus, a design of common search space for a terminal to receive the following messages is required.
RA response message when performing RA procedure to NCT cell
Paging information from NCT cell
System information block including SIB1 of NCT cell
The LTE based system or WLAN system using unlicensed frequency bands may be considered as a specific case of NCT cell. For example, a node (e.g. a base station, a cell, or a new-type access point (AP)) of the LTE based system using unlicensed frequency bands (e.g. Unlicensed-LTE (U-LTE)) may not transmit scheduling information for radio resource allocation. Also, radio resource allocation information of the U-LTE node may be transmitted by using an existing cross-scheduling method in a LTE base station (cell) which is an associated cell. In this case, a terminal may receive the radio resource allocation information of the U-LTE node through a physical layer control channel or a physical layer shared channel transmitted from the LTE cell which is the associated cell.

Power Headroom Report (PHR) and Buffer Status Report (BSR) Reporting Method in Multiple Connectivity Configuration The terminal maintaining a connection to a base station reports power headroom information to the base station for configuring a maximum transmission power of the terminal and transmission power of uplink transmissions. Also, the terminal report buffer status information to the base station for uplink scheduling. These report information may be transmitted as configured as a MAC control message (control PDU).

Figure 20:
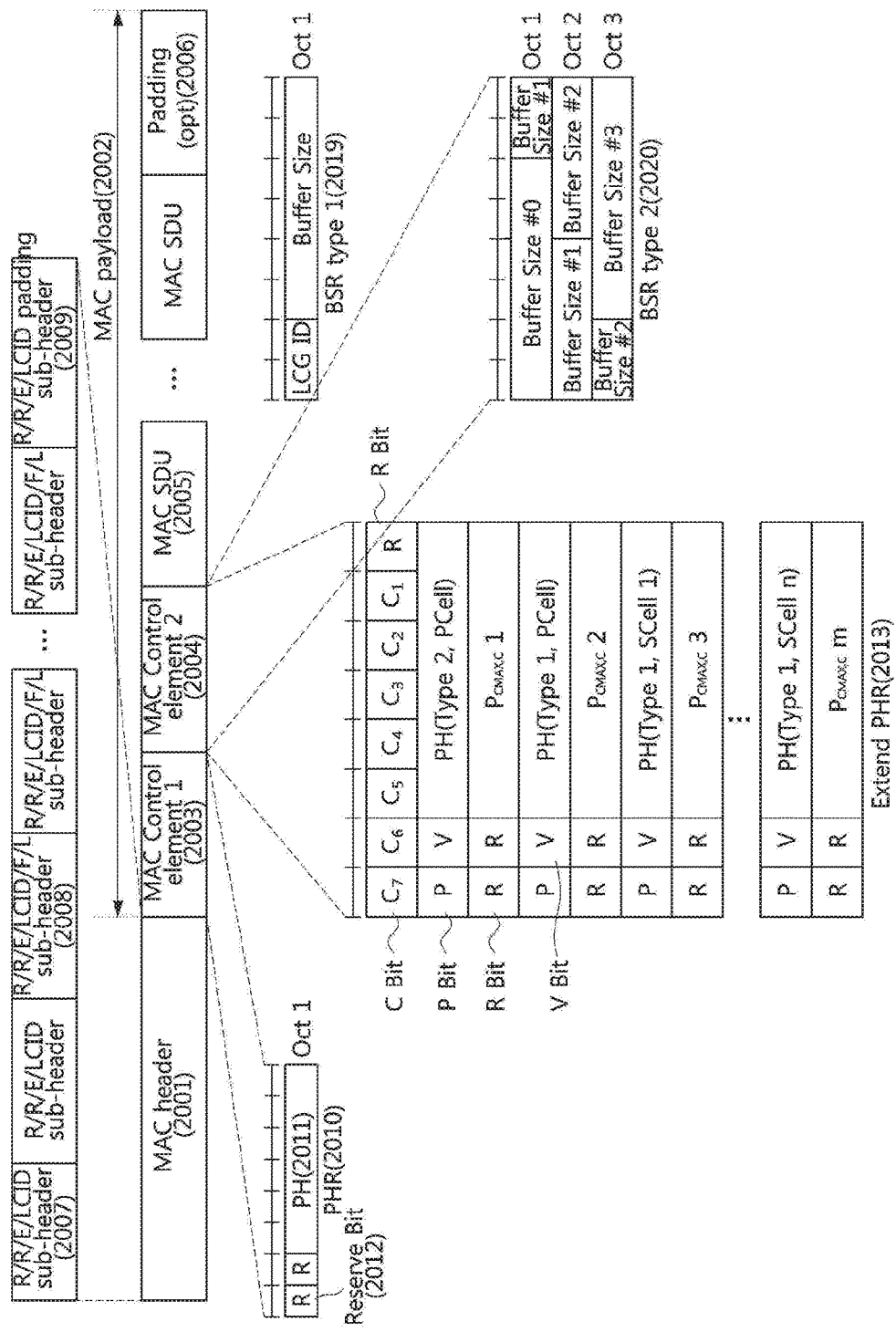
FIG. 20 illustrates a configuration example of a MAC control message used for reporting PHR and BSR for multiple connectivity.

FIG. 20 illustrates a configuration example of a MAC control message used for reporting PHR and BSR for multiple connectivity.

As illustrated in FIG. 20, the MAC message may comprise a MAC header 2001 and a MAC payload 2002.

The MAC header 2001 may comprise a plurality of MAC subheaders 207, 2008, 2009, etc. The MAC payload 2002 may comprise MAC control messages 2003 and 2004, a MAC SDU 2005, and a padding part 2009.

The PHR or BSR information may be configured as the MAC control messages 2003 and 2004. Also, logical channel identifiers (LCID) of the MAC subheaders 2007 or 2008 may indicate whether the corresponding MAC control message is PHR, BSR, or other MAC control message.

In case that the BSR reports a buffer status of a specific logical channel group (LCG) according to a logical channel configuration (e.g. 'LogicalChannelConfig' message) made through a connection configuration control message or a connection reconfiguration control message, it may be transmitted in a MAC control message comprising the corresponding LCG ID and buffer size information as illustrated in a BSR type1 2019 of FIG. 20. Alternatively, in case that two or more LCGs are configured for the terminal, in order to report buffer statuses of all LCGs, they are transmitted as configured in the MAC control message illustrated as a BSR type2 2020 of FIG. 20.

Regarding the LCG ID for discriminating LCG, the LCG ID may be restricted to be configured by only a macro base station when configuration or reconfiguration of multiple connectivity is carried out. Also, in case that the LCG is provided by only a specific base station in the multiple connectivity configuration, in order for the terminal to identify the LCG ID and the base station providing it, related control information may be included in the control message for configuration or reconfiguration of multiple connectivity, or an additional control message may be used for reporting to the terminal.

However, in case that multiple connectivity are configured, the control message may vary according to a transmitting entity. For example, in case that the RRC function is located in the macro base station as illustrated in FIG. 3a, and all RRC control messages are generated and transmitted by the RRC function of the macro base station, as explained above, the terminal may perform a report for a single LCG by using the BSR type1 2019 of FIG. 19, or perform reports for respective LCG groups by using the MAC control message configuration of the BSR type2 2020 of FIG. 19.

However, in case that properties of services provided by the macro base station and the small base station are different, that is, a specific service (e.g. a real-time service) is provided by only the macro base station and each base station provides an additional scheduling function, buffer status reporting methods should become different. For example, a case that three LCG groups LCG0, LCG1, and LCG2 are configured for the terminal configuring multiple connectivity, a real-time service belongs to the LCG1, and the LCG2 service is provided by only the small base station may be considered. In this case, the buffer status information transmitted to the macro base station should include LCG1 information not LCG2 information. Also, the buffer status information transmitted to the small base station should include the LCG2 information not the LCG1 information. Thus, there is no problem when the terminal reports the buffer status by using the BSR type1. However, if the terminal reports the buffer status by using the BSR type2, it should be recognized explicitly or implicitly between the terminal and the macro base station that the BSR information transmitted to the macro base station does not include buffer status information of LCG2. Also, it should be recognized explicitly or implicitly between the terminal and the macro base station that the BSR information transmitted to the small base station does not include buffer status information of LCG1.

Also, in case that RRC functions are divided into the M-RRC of the macro base station and the s-RRC of the small base station as illustrated in FIG. 3b, and it is possible that the s-RRC configures a logical channel for providing services by using an additional logical channel configuration control message, configuration information including LCG configuration on uplink logical channels in the logical channel configuration control message should be configured as discriminable to the M-RRC and the s-RRC. Also, the configuration information should be separately managed by the terminal. Thus, the uplink logical channel configuration information may have different logical channel configurations for the macro base station and the small base station, and thus configuration of LCGs may be different. In this case, even when the MAC control message configuration of FIG. 20 is used, the terminal should separately generate and transmit the MAC control messages for the macro base station and the small base station. For this, LCID of MAC subheaders for the MAC control message may be separately assigned to the macro base station and the small base station.

However, even for the solution of FIG. 3b, when the uplink logical channel is configured by only the M-RRC of the macro base station, and the s-RRC of the small base station performs only scheduling operations based on the logical channel configuration made by the M-RRC, buffer status information of a specific LCG ID can be reported by using the BSR type1 as explained in the above solution, or buffer status information of logical channels controlled by the small base station can be reported by using the BSR type2. In this case, the buffer status information of the BSR type2 does not all information of BSR size#0, BSR size#1, BSR size#2, and BSR size#3, but may be configured in a form of (BSR size#0, BSR size#2, BSR size#3), (BSR size#0, BSR size#1, BSR size#2), and the like according to whether the terminal transmits the buffer status information to the macro base station or to the small base station. Alternatively, the buffer status information of the BSR type 2 may be configured as including all information of BSR size#0, BSR size#1, BSR size#2, and BSR size#3, and indicating the buffer size of unnecessary LCG (e.g. BSR size#1 or BSR size#2 in the above example) as '0'.

As another method for controlling buffer status reporting in multiple connectivity configuration, timer values (e.g. periodicBSR-Timer, retxBSR-Timer, etc.) for buffer status reporting may be configured separately for the macro base station and the small base station or according to service properties via a parameter configuration control message for operating MAC functions (e.g. MAC-MainConfig message of LTE system).

As still another method, the terminal may transmit periodic buffer status reports or regular buffer status reports to the macro base station or the small base station by using the BSR type2. Also, the buffer status reports which the terminal transmits non-periodically or frequently (e.g. padding BSR of LTE system) may be transmitted to only a specific base station responsible for scheduling of the corresponding service (one of the macro base station and the small base station) by using only the BSR type1.

The timer used for restricting unnecessarily-frequent BSR transmissions for a predetermined duration (e.g. sr-Prohibit-Timer) may be managed independently for respective cells constituting multiple connectivity. Alternatively, the timer value (sr-ProhibitTimer) for the macro base station or the small base station may be configured as '0' when multiple connectivity are configured.

In other words, in case that the base station provides different LCG services, the terminal may transmit the BSR for LCG1 to the macro base station, and the BSR for LCG2 to the small base station. In this case, if a single sr-ProhibitTimer value set when the multiple connectivity are configured is commonly used, a problem, that the BSR for LCG2 cannot be transmitted to the small base station until the timer expires, may occur. Thus, the timer used for restricting unnecessarily-frequent BSR transmissions (e.g. sr-ProhibitTimer) can be managed independently for each cell constituting the multiple connectivity. Alternatively, the timer value for the macro base station or the small base station may be configured as '0' when multiple connectivity are configured, or configured as different values according to a service property (e.g. for each LCG).

The above-described BSR message generation and reporting can be performed according to priorities of logical channels.

That is, the terminal may generate and transmit BSR messages to the base station supporting multiple connectivity functions based on priorities according to control messages for configuring logical channels in multiple connectivity environment which will be explained in the following description. For example, in case that priority of a logical channel is configured differently for the macro base station and the small base station, the terminal may be controlled to generate and transmit BSR messages according to logical channel priorities configured differently for respective base stations.

The multiple connectivity terminal manages the priorities of logical channels for respective base stations to which the terminal is connected. That is, the priorities of logical channels through which services are provides via the macro base station (or, the small base station) are valid within the corresponding base station. Thus, in case that the same logical channel is served through both the macro base station and the small base station by using multiple connectivity functions, the terminal may configure and manage priorities of the logical channel under multiple connectivity service differently for respective base stations by considering logical channels belonging to each of the macro base station and the small base station. For example, although a logical channel under multiple connectivity service has a third priority in the macro base station, it may have a first or second priority in the small base station.

Therefore, when services are provided through multiple connectivity, priorities of logical channels, prioritisedBitRate, bucketSizeDuration, or logicalChannelGroup parameters may be configured in a control message for configuring logical channels separately for respective base stations. Here, the priority parameter indicates a priority class of the corresponding logical channel. Also, the prioritisedBitRate parameter is information representing a bitrate according to the priority of the corresponding logical channel, and represented as the amount of information (bits or bytes) transmitted for a unit time duration.

As a method for configuring the control message for configuring logical channels for respective base stations, a method in which priority, prioritisedBitRate, bucketSizeDuration, or logicalChannelGroup parameters are configured for respective base stations in a single control message (e.g. separating information elements (IE) or fields) may be used. Alternatively, separate additional control messages including priority, prioritisedBitRate, bucketSizeDuration, or logicalChannelGroup parameters may be configured for respective base stations.

FIG. 21 illustrates an example of a control message 'RadioResourceConfigDedicated' for configuring dedicated radio resources.

As illustrated in FIG. 21, in the control message 'RadioResourceConfigDedicated' for configuring dedicated radio resources, information elements 'logicalChannelConfig' may be configured separately for the macro base station and the small base station.

In the message example illustrated in FIG. 21, 'logicalChannelConfig_MeNB_DC' means an logical channel configuration IE for the macro base station during multiple connectivity, and 'logicalChannelConfig_SeNB_DC' means an logical channel configuration IE for the small base station during multiple connectivity.

FIG. 22 illustrates an example of 'logicalChannelConfig IE' in a control message for configuring dedicated radio resources.

For multiple connectivity functions, as a method for separating logical channel configuration parameters for respective base stations, a method of separating parameters in the 'logicalChannelConfig IE' for the macro base station and the small base station may be used, as illustrated in FIG. 22.

As illustrated in FIG. 22, all or some of sub parameters constituting uplink parameters 'ul-SpecificParameters' may be selectively configured separately as macro base station parameters (e.g. priority_MeNB_DC, prioritisedBitRate_MeNB_DC, logicalChannelGroup_MeNB_DC) or small base station parameters (e.g. priority_SeNB_DC, prioritisedBitRate_SeNB_DC, logicalChannelGroup_SeNB_DC).

Alternatively, uplink parameters 'ul-SpecificParameters' in the logicalChannelConfig IE may be divided into control messages for the macro base station (e.g. ul-SpecificParameters_MeNB_DC) and the small base station (e.g. ul-SpecificParameters_SeNB_DC).

As another method, in order to simplify configuration of the control message for configuring logical channels, priorities of logical channels, prioritisedBitRate, bucketSizeDuration, or logicalChannelGroup parameters may be configured in a single logical channel configuration control message without separating base stations, and transmitted to the terminal. In this case, for only services being provided through the corresponding base station, priorities of logical channels may be re-arranged by using an implicit method so that different priorities can be applied to respective base stations. For example, in case that the macro base station provides data bearers (DRB) LCH#1 and LCH#2 and the small base station provides a data bearer LCH#2 by using multiple connectivity function, a single control message setting the priority of LCH#1 to '1' and the priority of LCH#2 to '2' may be configured and transmitted. In this case, the terminal receives the single control message for configuring logical channels, applies a priority '1' to LCH#1 and a priority '2' to LCH#2 according to the received control message for the data bearers of the macro base station, and operate in accordance with the applied priorities. However, although the priority of LCH#2 is set to '2' in the control message, since the service of LCH#1 is not provided by the small base station, the terminal may substantively apply a priority '1' to LCH#2 and operate according to the applied priority.

In order for the macro base station and the small base station to efficiently transmit data to the terminal to which multiple connectivity are configured, the terminal may report the size of data (data volume) received from the small base station for a predetermined duration to the macro base station.

In other words, the terminal may report the size of data received from the small base station for a predetermined duration to the macro base station via a multiple connectivity configuration parameter or a separate control message. Here, the terminal may report the size of data to the macro base station periodically or non-periodically according to a configured parameter.

When the macro base station receives information on the size of data from the terminal, it may estimate the size of a transmission buffer for the corresponding service (or, bearer) which the small base station has, and perform packet data forwarding to the small base station based on the estimated size of the transmission buffer.

For the above-described flow control between the macro base station and the small base station, the small base station may transfer information on the size of data which remain in the transmission buffer to the macro base station for the multiple connectivity terminal via an inter-base station interface.

However, in case that the small base station transmits the information on the transmission buffer and the request message of data forwarding to the macro base station by using a non-ideal backhaul (i.e. non-ideal backhaul) and the macro base station performs the data forwarding to the small base station upon receiving the request message, there exists a latency due to using the non-ideal backhaul twice.

Therefore, if the multiple connectivity terminal directly transfers the information on the size of data received from the small base station for a predetermined duration to the macro base station, the latency due to the non-ideal backhaul can be reduced.

The terminal may transmit the information on the size of data received from the small base station for a predetermined duration to the macro base station together with BSR information. Alternatively, the terminal may report the information of the size of data to the macro base station in a form of a MAC control message or an RRC control message.

After the macro base station configures parameter setting information to control the terminal to report the information on the size of data received from the small base station in a form of a MAC control message of an RRC control message, the macro base station may transmit the control message to the terminal together with other control messages, or transmit the control message by using a separate control message, when multiple connectivity are configured. Here, the parameter setting information may include configuration information on a unit time, a report cycle, a report condition, or the size (or, range) of received data. The unit time may mean the predetermined time for which the size of data received from the small base station is estimated.

For the flow control, the macro base station may store data which have been forwarded to the small base station. If it is identified that the reception of the data forwarded to the small base station is completed through control information transmitted from the small base station or the terminal, the macro base station may delete the stored data, and forward new data to the small base station. For example, in case that the small base station transfers information on the data whose transmission is completed (e.g. packet sequence number (SN) of the corresponding bearer) to the macro base station, the macro base station may identify the information received from the small base station and delete the stored data corresponding to the identified information. Then, the macro base station may transfer new data of a service being provided by using multiple connectivity to the small base station. Alternatively, in case that the terminal reports the information on the data whose reception is completed (e.g. packet sequence number (SN) of the corresponding bearer) to the macro base station, the macro base station may delete data corresponding to the information on completion of data reception from the stored data, and forward new data to the small base station.

The above-described flow control performed based on control information exchange among the macro base station, the small base station, and the terminal is required when the small base station supporting multiple connectivity changes. For example, when the small base station providing multiple connectivity function to a terminal is changed, a procedure to transfer data remaining in the small base station providing the service (i.e. a source small base station) to a target small base station being newly added or the macro base station may be required in the procedure of small base station reconfiguration. In this case, in order to prevent unnecessary data forwarding, the macro base station may transmit, among the stored data, only data excluding data whose transmission from the source small base station to the terminal is completed or data whose reception is completed in the terminal, to the small base station. Through the above-described forwarding procedure, service continuity may be kept even when the small base station supporting multiple connectivity functions is changed. Thus, even when the small base station providing a service to the multiple connectivity terminal is changed, the macro base station may not unnecessarily transfer data remaining in the source base station to the new small base station or the new macro base station.

On the other hand, in the case that the terminal reports the information on data whose reception is completed (e.g. packet SN of the corresponding bearer) to the macro base station, the macro base station may perform data forwarding as described above to efficiently provide multiple connectivity functions without unnecessary data forwarding when the small base station is changed.

The PHR is used for the terminal to report a difference between a nominal maximum transmit power of the terminal and an estimated powers of UL-SCH or PUCCH of respective connected cells, and used for uplink power control.

For the PHR, parameters related to the PHR of the terminal may be configured by setting 'periodicPHR-Timer', 'prohibitPHR-Timer', and 'dl-PathlossChange' in 'phr-config' information included in a control message for configuring parameters for MAC function (e.g. 'MAC-MainConfig' message of LTE system).

For example, when 'prohibitPHR-Timer' expires and there is a transmission opportunity through uplink, if a path loss change larger than 'dl-PathlossChange' occurs, the terminal may transmit a PHR MAC control message to a serving cell. Here, the serving cell is a reference of the path loss estimation after the terminal lastly transmits a signal.

In order to support multiple connectivity functions, information on a transmission power difference between the macro base station and the small base station may be transmitted to the terminal, or an additional parameter for configuring a downlink path loss of the small base station may be introduced, whereby the terminal can control the transmission power of the terminal by considering the macro base station and the small base station whose service areas are different from each other.

That is, in order for the terminal to control its transmission power in consideration that path losses are different according to which base station (the macro base station or the small base station) the terminal transmits to, information on path loss estimation reference should be provided separately for the macro base station and the small base station.

In order to support multiple connectivity functions, the terminal may generate a MAC control message for PHR by separating a case of transmitting to the macro base station and a case of transmitting to the small base station, and transmit the MAC control message to the corresponding base station. In this case, the terminal may report the PHR information to the corresponding base station by using the existing PHR 2010 and extended PHR 2013 MAC control message, as illustrated in FIG. 20.

A Method of Inter-Working with WLAN

Off-loading data of a mobile communication network by using wireless LAN systems is important in a local access mobile network. However, since a WLAN system and a mobile communication network have different access schemes, radio resource structures, scheduling manners, etc., it has difficulty to acquire service continuity (seamless service) through integration of the above two systems.

As a method to resolve the above problem, some of WLAN functions may be supported by a Radio Access Network (RAN), thereby making the WALN system and the mobile communication system interwork more efficiently. For example, the performance of interworking between two systems may be enhanced by improving a procedure performed by a terminal to search an access point (AP) or by transferring service property information to a terminal.

If there is no restriction in AP discovery performed by a terminal supporting both of WLAN and mobile communication system, power consumption of the terminal may become large. As a method to resolve the problem, a method in which a terminal searches APs only when a WiFi function of the terminal is activated by user is usually used. In addition to such the usual method, a method in which a terminal periodically searches APs by using an additional timer even when the WiFi function is activated, or a method in which the mobile communication system provides information on APs to the terminal and the terminal searches only the corresponding APs may be used.

Figure 23:
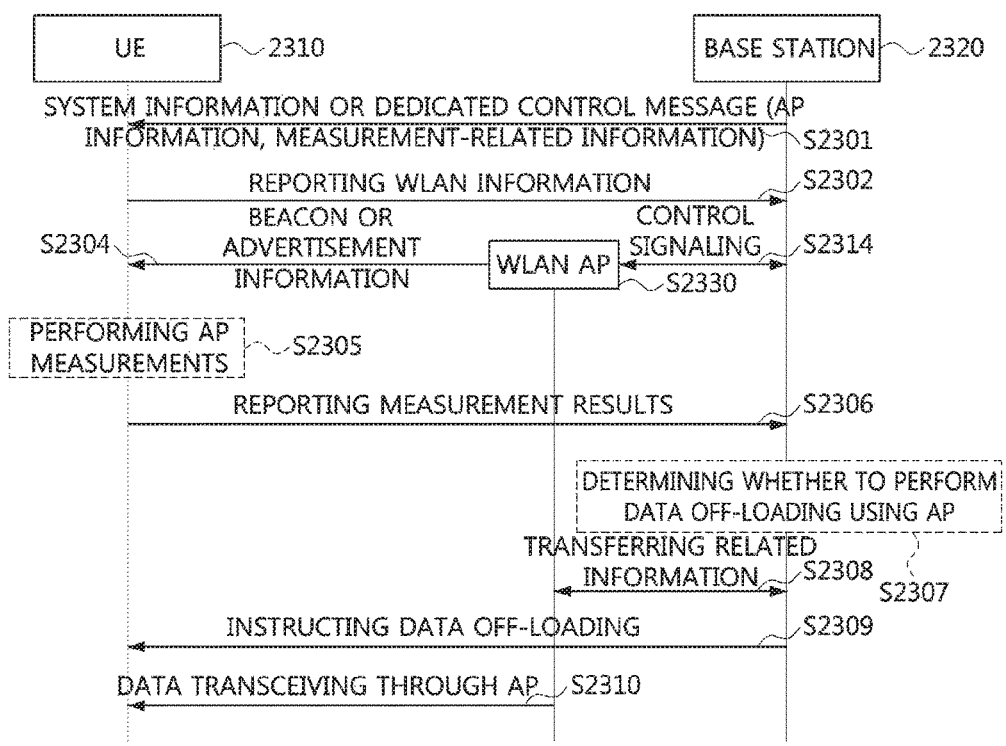
FIG. 23 is a message sequence chart illustrating a data off-loading procedure of a mobile communication network using a WLAN system.

FIG. 23 is a message sequence chart illustrating a data off-loading procedure of a mobile communication network using a WLAN system.

Referring to FIG. 23, a mobile communication base station 2302 may exchange or collect information for data off-loading, AP discovery, or measurements through control signaling 2313 with a WLAN AP 2330 in the system (S2314).

The base station 2302 may transmit information on APs which can be controlled or connected to (e.g., Service Set Identifier (SSID), WLAN frequency band information, position information, etc.) and information related to measurement on APs (e.g., AP measurement threshold, measurement cycle timer information, etc.) to the terminals 2310 via system information (S2301). Alternatively, the base station 2320 may transmit the information on APs and information related to measurements on APs to the terminals 2310 supporting WLAN, via dedicated control messages (S2301).

The information on whether the terminal supports WLAN may be obtained from the perspective of capability of the terminal. The information on WiFi (or, WLAN) functions supported by the terminal (e.g. supported WiFi versions, usable frequency bands, radio capability information for WiFi, etc.) may be transferred to the mobile network by using feature group indication (FGI) information of LTE system. The WiFi-related FGI information of the terminal may be reported to the mobile network when the terminal registers in the mobile network, or when the terminal configures a connection with the mobile network.

The terminal 2310 supporting WLAN reports WLAN-related information to the base station 2320 (S2302). Here, the WLAN-related information reporting of the terminal may mean generating and transmitting a control message corresponding to a case in which a user activates or deactivates WiFi (i.e. turn on/off WLAN function), or a case in which the user tries to scan WLAN APs by clicking or touching a WLAN icon through a user interface of the terminal. Through the above-described WLAN-related information reporting procedure, the terminal 2310 may report, to the base station 2320, information on whether the WLAN function of the terminal is activated or whether the user desires to use the WLAN function. The control message transmitted from the terminal 2310 to the base station 2320 may be configured as a MAC control message, an RRC control message, or an upper layer message (e.g. a non-access stratum (NAS) message or an application layer message). Also, when the terminal 2310 notifies only information on whether the WLAN function is activated or whether to try to scan WLAN APs to the base station 2320, the terminal 2310 may transmit only indication bit information indicating that as included in a field of a physical layer control channel, or in a form of filed information constituting a MAC or RRC control message.

Meanwhile, in the procedure illustrated in FIG. 23, only when a terminal reports a trial to scan WALN APs through the step S2302, the base station explained in the step S2301 may be configured to transmit, to the terminal, a dedicated control message comprising information on nearby APs of an area where the terminal is located, measurement-related information of them, or Access Network Discovery and Selection Function (ANDSF) related information message. That is, an execution sequence of the steps 2301 and S2302 of FIG. 23 may be exchanged. When the step S2302 is executed prior to the step S2301, the base station 2320 may transmit the information on nearby APs and measurement-related information of them to the terminal 2310 through a separate control message in the step S2301 instead of transmitting system information to the terminal 2310.

Also, when the base station 2320 receives a message indicating that a terminal tries to scan WLAN APS in the step S2302, the base station 2320 may turn-on or activate a WLAN AP which the base station 2320 controls or can connect to in the area where the terminal is located. That is, when the base station 2320 determines to perform data offloading through WLAN according to properties of a service being currently provided to the terminal or a service for which configuration is newly requested by the terminal, the base station 2320 may turn-on or activate an already-operating WLAN AP or a controllable WLAN AP which is adjacent from the terminal through a control signaling step S2314 thereby performing data offloading to provide the service through the corresponding WLAN AP.

Meanwhile, the WLAN AP 2330 located adjacent to the terminal may perform turn on/off according to a request or control of the base station 2320 with which control signaling is maintained, or perform turn on/off according to a control through a function of operations, administration, and maintenance (OAM) of a network.

Upon being turned on or activated, the WLAN AP 2330 may transmit a beacon or advertisement information to the terminal (S2304).

The terminal 2310 may perform measurements on nearby WLAN APs based on the AP information or the measurement-related information received from the base station 2320 (e.g. AP measurement threshold values, measurement cycle timer information, etc.) (S2305).

Then, the terminal 2310 may report measured reception powers of nearby WLAN APs (e.g. Received Signal Strength Indicator (RSSI), Signal-to-Interference Ratio (SIR), bit energy/noise power (EbNo), Receive Channel Power Indicator (RCPI), Receive Signal to Noise Indicator (RSNI), etc.) to the base station (S2306).

In the S2306, only when a reception power of a WLAN AP is larger than the AP measurement threshold, the terminal may report information on the WLAN AP and the measurement result to the base station 2320.

On the other hand, if measurement results are not reported from the terminal 2310 until a predetermined time ends, the base station 2320 may determine that the reception powers for nearby APs do not satisfy the AP measurement threshold in the terminal 2310. In this case, the base station 2320 may request the WLAN AP 2330 to adjust a transmission power via the control signaling of the step S2314, or transmit, to the terminal 2310, additional information on available APs (e.g. SSID, WLAN frequency band information, location information, etc.) and/or measurement-related information (e.g. AP measurement threshold value, measurement cycle timer information, etc.) via a separate control signaling, in order for the terminal 2310 to measure or search new APs.

In case that measured reception powers of all WLAN APs do not satisfy the measurement threshold in the step S2305, the terminal may configure a measurement cycle timer based on the measurement-related information received from the base station 2320, and stop measuring or searching APs until the timer expires, thereby minimizing unnecessary power consumption of the terminal 2310.

Upon receiving a measurement result report from the terminal 2310, the base station 2320 may determine whether to perform data offloading through a WLAN AP based on the measurement result (S2307), and then transfer information related to the data offloading to the WLAN AP 2330 (S2308).

Also, the base station 2320 may transmit a control message for instructing data offloading using the WLAN AP 2330 to the terminal 2310 (S2309). Here, the control message instructing data offloading may include SSID information of the corresponding AP, service identifier information of a target service of the data offloading, data offloading start timing information, etc. Also, the control message may include control information for rejecting the data offloading.

Upon receiving the control message instructing data offloading from the base station 2320, the terminal 2310 may obtain the SSID information of the corresponding AP, the service identifier information of the target service of the data offloading, and the data offloading start timing information from the control message. Then, the terminal 2310 may start data transmission/reception through the WLAN AP based on the obtained information (S2310).

The terminal 2310 can reduce unnecessary power consumption by searching or performing measurements on WLAN APs through the above-described data offloading procedure. Also, the WLAN APs also can reduce power consumption by using the above-described procedure.

The terminal 2320 may determine whether to use the data offloading function using a WLAN AP, illustrated in FIG. 23, through a negotiation with the terminal 2310. That is, the base station 2320 may transmit a control message requesting or identifying whether to use the data offloading function using a WLAN AP to the terminal 2310. Alternatively, the base station 2320 may transmit information requesting a report on whether to support the data offloading function to the terminal 2310 by using system information. Alternatively, the terminal 2310 may transmit the information on whether to support the data offloading function to the base station 2320 when configuring the connection with the base station 2320, or indicate it by using capability information of the terminal (e.g. FGI information). Alternatively, when the terminal 2310 receives the control message requesting or identifying whether to use the data offloading function from the base station 2320, the terminal 2310 may determine whether to use the data offloading function through a procedure of transmitting a control message confirming use of the data offloading function to the base station 2320 according to a selection of the terminal 2310 or a manual selection of the user. The above procedure of confirming the use of the data offloading function may be performed according to a request from the terminal 2310 to the base station 2320, or performed by transmitting related information in a connection configuration stage requesting a service according to preconfigured configuration information or a manual selection of the user.

For the use of the data offloading function according to the user selection, the terminal may display the following information through a display means of the terminal, and perform a related procedure through a confirmation action (e.g. clicking or touching the corresponding icon).

Request (or, identification) information for confirming whether to use the data

Information indicating whether an usable WLAN AP exists adjacently from the terminal Regarding interworking of mobile communication system and WLAN system, as described above, the base station may determine whether to perform the data offloading using a WLAN AP based on the negotiation with the terminal (or, the user of the terminal), and provide a service through the data offloading using the WLAN AP.

That is, in case that the terminal reports WLAN information to the base station, the user configures activation of WiFi which means use of WLAN, or the user transmits a control message indicating a trial to scan WLAN APs by selecting use of WLAN through a user interface of the terminal, the service using the WLAN AP may be provided through all or part of the procedures of FIG. 23. For example, in the step S2302 of FIG. 23, the terminal 2310 may try to scan WLAN APs, and also request a service switching to or a cooperative service with a WLAN AP to the base station 2320 by using the AP information obtained through the step S2301 or another method. In case that the terminal requests the service switching to or the cooperative service with the WLAN AP to the base station 2320 in the step S2302, the terminal 230 may report the obtained AP information (e.g. SSID, reception signal strengths of APs, load information of APs, etc.) to the base station 2320. The base station 2320, having received the request of the service switching to or the cooperative service with the WLAN AP from the terminal 2310 in the step S2302, may determine whether to perform the data offloading using the WLAN AP based on the request of the terminal and the reported information, and transmit a message instructing a data offloading using the WLAN AP of the step S2309 to the terminal 2310.

The base station (or, cell) may configure a system information block (SIB), constituting system information transmitting common information to terminals within a service area of it, with WLAN-related information and related parameters. Hereinafter, the SIB may be referred to 'WLAN SIB'. The WLAN SIB may, as explained in the step S2301 of FIG. 23, include information on APs which the base station can control or connect to (e.g. SSID, WLAN frequency band information, location information, etc.), and AP measurement related information (e.g. AP measurement threshold, measurement cycle timer information, etc.) The WLAN SIB may be transmitted to terminals located with the service area of the base station (or, cell).

The AP information may comprise a list of one or more WLAN APs, and include identifier information, frequency bands, frequency bandwidths, and geographical location information, etc. of each WLAN AP. The identifier information may, as an identifier for identifying an AP, be Service Set Identifier (SSID), Basic Service Set Identifier (BSSID), or Homogeneous Extended Service Set Identifier (HESSID).

Also, the frequency band and frequency bandwidth information of WLAN APs may include information indicating transmission frequencies of respective WLAN APs, system bandwidths or supported WLAN standard versions of respective APs included in the list. The geographical location information of respective APs may mean position information provided for location based service (LBS) of the terminal, or information provided for estimating a position of the terminal.

The AP measurement related information may be a reference value (or, threshold value) of AP reception power, as a reference value of AP measurement used for determining whether to switch to a WLAN AP for being serviced by the WLAN AP or being serviced through data offloading. For example, the base station may, as the AP measurement related information, provide a reference value (or, threshold value) for at least one of Received Signal Strength Indicator (RSSI), Signal-to-Interference Ratio (SIR), bit energy/noise power (EbNo), Receive Channel Power Indicator (RCPI), and Receive Signal to Noise Indicator (RSNI) to the terminal through the WLAN SIB. The terminal may, if necessary, measure reception signal powers of APs included in measurement and report parameters configured through a dedicated control message of the base station, or APs included in the list of the WLAN SIB, and report them to the base station.

Also, the WLAN SIB may transmit load status information of APs located within the service area of the base station. Here, the load status information may be information transmitted from APs through beacons of WLAN system, or information collected by the base station (or, cell) through a separate procedure. In order to measure load status information of APs which the terminal can access, the terminal may try to access to APs, and report access success ratios or failure ratios for respective APs during a predetermined time period (or, using a timer) to the base station (or, cell). Alternatively, the terminal may report, to the base station, the amount (or, transmission speed) of data received from or transmitted to respective APs after accessing the respective APs during a predetermined time period, data retransmission ratio, time required for occupying a radio channel after carrier sensing (CS), or time consumed from a time point that channel occupation becomes necessary to a time point that channel is actually occupied.

The base station (or, cell) may notify change of WLAN SIB to terminals by using a separate procedure which is different from the conventional method of notifying system information change. For example, in order to separately notify change of WLAN SIB, a specific scheduling identifier may be statically allocated among scheduling identifiers (e.g. C-RNTI) in a base station specific manner or system specific manner. Through the above-described specific scheduling identifier (e.g. WLAN-RNTI), the change of WLAN SIB may be notified to terminals located within the service area of the base station.

In case that the terminal is being serviced through WLAN functions, is supposed to use WLAN functions, or activates WLAN functions, the terminal may update stored information by detecting the WLAN-RNTI in a resource region through which the base station transmits scheduling information and receiving the changed WLAN SIB based on the scheduling information indicated by the WLAN-RNTI.

On the contrary, if the terminal does not use WLAN function or the WLAN functions are deactivated, the terminal may does not detect the WLAN-RNTI, or omit the WLAB SIB update procedure.

Also, the base station may transmit a control message related to WLAN APs located within the service area by using another method other than the above-described method based on system information transmission. That is, the base station may transmit the control message by using the WLAN-RNTI, or by using another WLAN-RNTI identifier (e.g. WLAN-RNTI2) which is statically allocated in addition to the WLAN-RNTI for interworking with WLAN system. For example, the base station may transmit the scheduling information through a physical layer control channel (PDCCH or ePDCCH) by using the WLAN-RNTI (or, WLAN-RNTI2). Also, the base station may transmit, to the terminal, a control message related to operations of the WLAN system or AP in the base station through a radio resource of a physical layer shared channel (PDSCH) by applying modulation and/or coding scheme indicated by the scheduling information.

The control message for operations of the WLAN system or AP in the base station may be configured as a list form of APs by using the above-described WLAN SIB. Therefore, the AP list may include information on APs (e.g. identifier information, frequency bands, frequency bandwidths, and geographical location information, etc. of each WLAN AP), AP measurement related information (e.g. AP measurement threshold, measurement cycle timer information, etc.), or load statuses of APs which the terminal can access.

If necessary, the base station may transmit the above-described control message to the terminal as a dedicated control message by using a scheduling identifier which is uniquely allocated to the terminal (e.g. C-RNTI) not the WLAN-RNTI (or, WLAN-RNTI2). Also, the base station may, if necessary, transmit resource allocation information for a data offloading target AP (hereinafter, referred to as 'target AP) via a dedicated control message.

Also, for supporting efficient data offloading functions, the base station may select the target AP by using the measurement result of the terminal, negotiation between the base station (or, cell) and the AP(s), or network OAM functions. Through information exchange (or, negotiation)

between the selected target AP and the base station, the target AP may transfer AP resource allocation information for the terminal (to be serviced through data offloading) to the base station, and the base station may transmit the transferred AP resource allocation information to the terminal. The terminal may be serviced by using the received resource allocation information for the target AP without performing a carrier sensing procedure, or through a time/frequency resource allocated using a non-contention based carrier sensing procedure within a service area of the target AP.

As described above, in case the control message for AP operations, which is the control message transmitted through another method other than WLAN SIB and system information transmission method, is configured in the form of list, a sequence of APs in the list may indicate priorities of the APs, or ranking of access easiness based on load statuses (e.g. in a manner of ascending order or descending order).

Differently from the above description, the base station may provide services by using a WLAN AP, having no negotiation with the terminal or the user.

In other words, the base station may identify necessity to provide a service through a WLAN AP while configuring a connection with the terminal or providing services after configuring the connection with the terminal. Then, the base station may provide the WLAN AP information to the terminal in the step S2301 of FIG. 23, and control the terminal to perform measurements on WLAN APs and report the measurement result. The base station may determine whether service provisioning through a WLAN AP is possible based on the measurement result, and provide the service by using the WLAN AP if it is possible. After then, the base station may finish the service using the WLAN AP when the service ends or it isn't further necessary to provide the service using the WLAN AP.

For this, when the WLAN function of the corresponding terminal is inactivated, the base station may activate the WLAN function of the terminal by transmitting a control message for enabling the WLAN function to the terminal. The base station may provide a service by using the WLAN AP, and transmit a control message for deactivating the WLAN function of the terminal to the terminal when the service ends. The base station may transmit the control message to the terminal as a RRC control message, a MAC control message, or a physical layer control message. Also, the control message may be used for activating or deactivating a specific WLAN system in the terminal, or for activating or deactivating only a WLAN AP measurement function. The purpose of the control message is for reducing power consumption of the terminal by preventing unnecessary WLAN AP measurements.

The terminal may provide a means or a method for activating or deactivating the WLAN function of the terminal. For example, a user may configure whether to allow the base station to activate or deactivate the WLAN function of the terminal. Alternatively, it may be controlled whether the base station is allowed to activate or deactivate the WLAN function of the terminal, when the terminal initially registers to a mobile network, or according to whether the user agrees or not at service subscription, capability of the terminal, or setting conditions.

The above-described data offloading function using WLAN AP may be operated and defined as an inter-Radio Access Technology (RAT) CA function or a radio resource aggregation function between LTE system and WiFi system.

A function to flexibly aggregate radio resources of a base station of a mobile communication system such as LTE and a WLAN AP and provide the aggregated radio resources to a terminal may be defined as the inter-RAT CA (or, radio resource aggregation) function. For this, the base station of mobile communication system may maintain control signaling of the step S2314 of FIG. 23 with WLAN APs located within its service area, and transmit related information (inter-RAT CA related information) to the terminal by constructing the related information as an additional SIB or additional information within an existing SIB. In this case, when the terminal configures a connection to the base station or camps on the base station from idle state, the terminal may identify that the base station can support the inter-RAT CA function with WLAN AP, and be serviced through the inter-RAT CA function by reporting measurement results on WLAN APs to the base station when configuring the connection or reporting measurement results according to setting parameters for measurements and reporting operations.

Also, for supporting the inter-RAT CA function, the terminal being serviced by a WLAN AP may be controlled to measure reception qualities of mobile communication base stations (e.g. RSSI, RSRQ, RSRP, SIR, EbNo, EcNo, RSCP, etc.) and report them to the WLAN AP. The WLAN AP may transmit the reported reception qualities, identification information of the base stations (e.g. Physical Cell Identifier (PCI), Public Land Mobile Network Identifier (PLMN ID), Global Cell Identifier (GCI), etc.), frequency bands or carrier indexes of the base stations, beam direction indexes or identifiers according to beamforming, etc. to a base station, an entity or a function block supporting the inter-RAT CA function via control signaling. The terminal being serviced by the WLAN AP may be controlled to configure a connection with a mobile communication base station by using the information on base stations collected through the WLAN AP as described above, and service continuity may be maintained by using the inter-RAT CA function or changing a serving entity for the terminal from the WLAN AP to the base station.

For provisioning services for a terminal via the inter-RAT CA function or switching connection configuration between WLAN AP and mobile communication base station, a condition (or, event) for triggering the terminal's measurements on base stations or WLAN APs and reports of the measurements may be defined, and the terminal may be controlled to report measurement results to the base station or the WLAN AP when the condition (or, event) is satisfied. The above-described procedure may use a procedure of FIG. 24 which will be explained in the following description.

Figure 24:
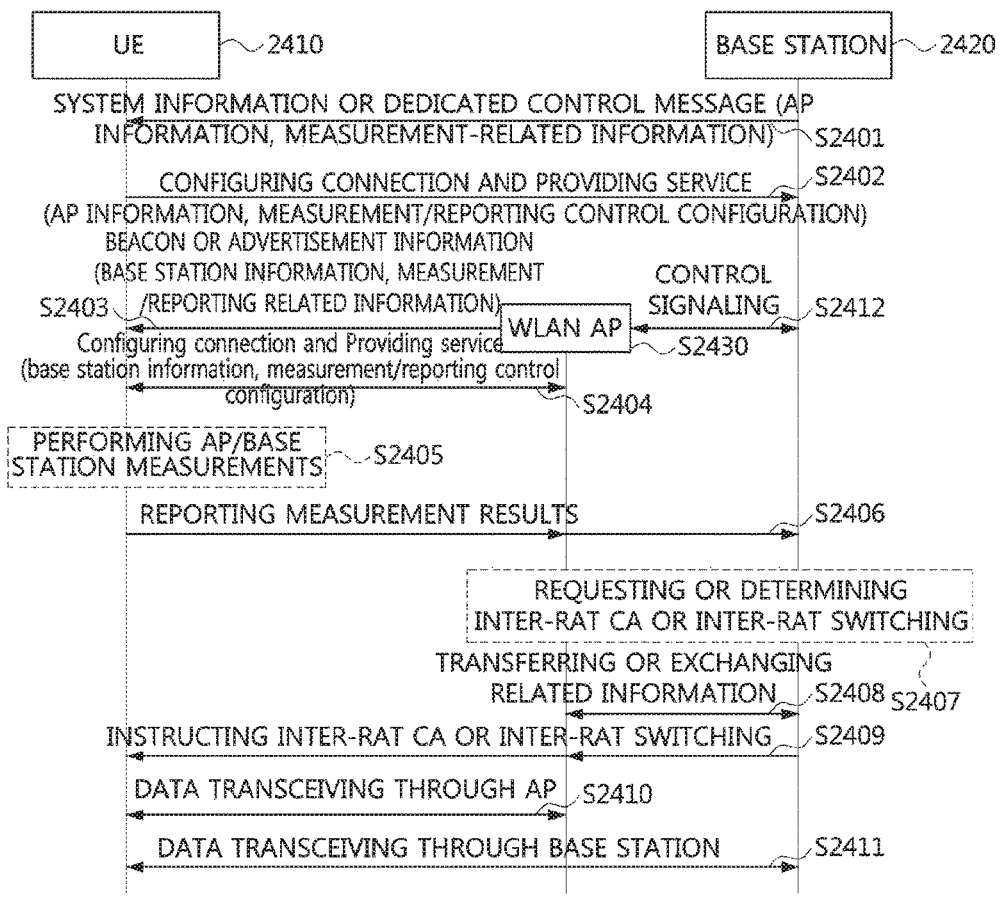
FIG. 24 is a message sequence chart illustrating a procedure for supporting inter-RAT CA function.

FIG. 24 is a message sequence chart illustrating a procedure for supporting inter-RAT CA function.

Referring to FIG. 24, a terminal 2410 in idle state may camp on a mobile communication base station 2420, and receive AP information and measurement-related information from the base station 2420 via system information (S2401).

Alternatively, the terminal 2410 may configure a connection with the base station 2420, transition to a state in which data transceiving is possible (e.g. RRC_connected state of LTE system), and receive a control message for configuring AP information and control parameters for measurement/reporting from the base station 2420 (S2402).

Also, when the terminal is not serviced by a WLAN AP 2430, the terminal 2410 may receive the AP information and the measurement/reporting related information through beacons or advertisement information broadcasted by the WLAN AP 2430 (S2403).

Alternatively, the terminal 2410 may receive the AP information and control information for measurements/reporting from the WLAN AP 2430 while being connected with and serviced by the WLAN AP 2430 (S2404).

If the terminal 2410 is not in a state that it maintains connections with the base station 2420 and the WLAN AP 2430 by using inter-RAT CA function, the terminal 2410 may receive a control message for the AP information and measurement/reporting related information by using only one procedure of the steps S2402 and S2404.

The terminal 2410 may perform measurements on the WLAN AP 2430 or the base station 2420 by using the measurement/reporting parameters for the WLAN AP 2430 or the base station 2420, which are configured by using one or more steps of the steps S2401, S2402, S2403, and S2404.

When a condition or an event is met based on the measurement/reporting related parameters for the WLAN AP 2430 or the base station 2420, the terminal 2410 may periodically or aperiodically report measurement results to the WLAN AP 2430 or the base station 2420 (S2406). In the step prior to or after the step S2406, a user of the terminal or the terminal may transmit indication information requesting support of inter-RAT CA function or inter-RAT switching or indicating preference to the base station 2420 or the WLAN AP 2430 in a form of a separate control signaling message. Such the control signaling message may be constructed as one of a RRC message, a MAC control PDU, and a physical layer indicator, and the base station 2420 or the WLAN 2430 which receives the signaling message may determine whether to support the inter-RAT CA function or to perform the inter-RAT switching by considering the request or the preference information.

The WLAN AP 2430 having received the measurement results on the base station 2420 from the terminal 2410 or the base station 2420 having received the measurement results on the WLAN AP 2430 from the terminal 2410 may determine whether to apply the inter-RAT CA function or to perform the inter-RAT switching for changing a service connection entity between the WLAN AP 2430 and the base station 2420 (e.g. whether to perform operations for maintaining service continuity such as an inter-RAT handover or switching) (S2407). If a separate entity or function block for controlling the inter-RAT CA function or the inter-RAT transition exists, it is requested to the entity to perform the inter-RAT CA function or the inter-RAT transition.

In addition, the base station 2420 and the WLAN AP 2430 may transmit or exchange information related to the inter-RAT CA function or the inter-RAT switching to prepare the inter-RAT CA function or the inter-RAT transition (S2408).

Then, the base station 2420 or the WLAN AP 2430 may transmit a control message for instructing or rejecting the inter-RAT CA function or the inter-RAT switching to the terminal (S2409).

The terminal 2410 having received the control message instructing the inter-RAT switching may change its service point from the base station 2420 to the WLAN AP 2430, and receive a service from the WLAN AP 2430 by maintaining the connection with the WLAN AP 2430.

Alternatively, the terminal 2410 may change its service point from the WLAN AP 2430 to the base station 2410, and receive a service from the base station 2420 by configuring the connection with the base station 2420 (S2411).

Meanwhile, the terminal 2410 having received the control message rejecting the inter-RAT switching may receive a service from its current service entity without performing the inter-RAT CA function or the inter-RAT switching until a related timer expires or a new event occurs, or request reconfiguration of a bearer with the base station 2420.

If the terminal 2410 receives the control message instructing to perform the inter-RAT CA function, the terminal 2410 may receive a service by configuring or maintaining connections with both the WLAN AP 2430 and the base station 2410. In case that the terminal 2410 receives the service from both the base station 2420 and the WLAN AP 2430 by using the inter-RAT CA function, the service provided by the base station 2420 and the WLAN AP 2430 may be restricted according to type, form, or requirements of the service. Also, in case that the terminal 2410 receives the service by aggregating radio resources of the base station 2420 and the WLAN AP 2430, the terminal 240 may maintain a control information transmission channel including scheduling information for resource allocation and feedback information, or transmit the control information separately to the base station 2420 and the WLAN 2430. Also, dynamic allocation, static allocation, or semi-static allocation may be used for allocating resources of the scheduling information and the control information transmission channel. In case of using the static (or, semi-static) allocation method, a part of radio resources of the base station 2420 or the WLAN AP 2430 may be reserved. That is, a transmission time or cycle for transmitting data through radio resources of the base station 2420 or the WLAN AP 2430 may be allocated in advance, or a specific frequency band (or, subcarrier(s)) may be allocated for it.

The functions of the base station such as the inter-operation function between the WLAN AP and the base station including the data offloading explained in FIG. 23 and FIG. 24 and the inter-RAT radio resource aggregation (i.e. interworking triggering, determination of data offloading, providing AP information, generating control signaling between the base station and the WLAN AP, etc.) may be implemented as internal functions of the base station, or as additional functions in a network.

Also, the terminal being serviced by the WLAN AP may support the inter-operation including the service switching to the base station or cooperative operation with the base station or inter-RAT radio resource aggregation between the WLAN AP and the base station. That is, the terminals 2310 and 2410 being serviced by the WLAN APs 2330 and 2430 as described in FIG. 23 and FIG. 24 may report measurement results on the base stations 2320 and 2420 on which the terminals camp or nearby base stations and/or a service switching request message to the WLAN AP. Upon receiving the measurement results and/or service transition request message, the WLAN APs 2330 and 2430 may transmit a control message requesting the service switching or the cooperative service to the base stations 2320 and 2420 (or, a node responsible for the inter-operation or inter-RAT radio resource aggregation function) by using the control signaling of the S2314 of FIG. 23 or the step S2412 of FIG. 24.

The mobile base station having received the control message requesting the service switching or the cooperative operation from the WLAN AP may configure a connection with the terminal, and provide the requested service switching to the base station or the requested cooperative operation with the base station. In this case, the following two methods can be used for configuration of the connection between the base station and the terminal.

1) Configuring the connection with the terminal through a paging procedure

2) Transferring acceptance information of the service transition request to the terminal through the WLAN AP, and the terminal configuring the connection with the base station via a random access procedure.

According to the above-described request of service switching from the WLAN AP to the mobile base station or cooperative operation, for configuration of the connection between the base station and the terminal, the terminal may transmit information of the terminal (e.g. terminal identifier, information on the service which is a target of the service switching (service type, service properties such as QoS)) and measurement results on the base station (e.g. base station identifier, reception signal information (RSRQ, RSRP, RSCP, SIR, etc.) to the mobile base station.

For the configuration of the connection between the base station and the terminal according to the method 1), the base station may determine whether to perform the service switching from the WLAN AP to the base station or to perform the cooperative service based on the information of the terminal and the base station reported by the terminal through the WLAN AP. If acceptance of the service switching request is determined, the terminal may transmit a paging message to the terminal so as to configure the connection and provide the service switching or the cooperative service. Like this, in case that the paging procedure is performed for providing the service switching or cooperative service, terminal information, WLAN AP information, service property information, connection bearer property information, etc. for the inter-RAT service switching/cooperative service, inter-operation between the WLAN AP and the base station, or inter-RAT radio resource aggregation may be transmitted as included in the paging message.

For the configuration of the connection between the base station and the terminal according to the method 2), the base station may determine whether to perform the service switching from the WLAN AP to the base station or to perform the cooperative service based on the information of the terminal and the base station reported by the terminal through the WLAN AP, and transfer the determination result to the WLAN AP. The terminal which receives a control message indicating acceptance of the service switching or cooperative service through the WLAN AP may perform a random access procedure to the base station so as to configure a connection with the base station and be provided with the service switching or the cooperative service. In this case, for non-contention based random access procedure of the terminal, information on the base station to which the random access procedure is performed (base station identifier, etc.), random access parameters (RA preamble index, RA resource information) for the non-contention based random access, scheduling identifier (C-RNTI) to be applied to the base station, etc. may be transmitted to the terminal as included in the control message indicating the acceptance of the service switching or the cooperative service transmitted through the WLAN AP.

For the service switching or the cooperative service, when the paging procedure is performed by the terminal according to the method 1) or the random access procedure is performed by the terminal according to the method 2), terminal information, WLAN AP information, service property information, connection bearer property information, etc. for the inter-RAT service switching/cooperative service, inter-operation between the WLAN AP and the base station, or inter-RAT radio resource aggregation may be transmitted as included in a response message for the corresponding RA preamble transmission (e.g. RA response message) or a message transmitted by the terminal after receiving the RA response message (e.g. RA message 3).

The terminal information may be a terminal-specific identifier (TMSI, IMSI), a scheduling identifier (C-RNTI), etc., and the WLAN AP information may include an AP identifier (SSID), AP position information, etc. The service property information and the connection bearer property information may include property information of the service provided through the inter-RAT service switching/cooperative service, the inter-operation between the WLAN AP and the base station, or the inter-RAT radio resource aggregation, and parameters constituting bearer property information configuring a logical channel or a radio channel connected between the base station/WLAN AP and the terminal.

The methods and procedures, explained referring to FIG. 23 and FIG. 24, for the service switching (e.g. support of data offloading or service continuity functions) or the cooperative service (e.g. support of multiple connectivity functions or radio resource aggregation (RRA) between AP and mobile communication base station may be applied to not only WLAN AP but also interworking, service switching, or cooperative service with radio access devices operating in unlicensed frequency bands (e.g. ISM band or TV white space frequency bands). For example, the above-described method and procedures may be used in signaling procedures among an AP-type apparatus based LTE/LTE-A radio access specification using unlicensed frequency bands, transceiving apparatuses for wireless backhaul, and mobile base stations. That is, the AP-type apparatus based LTE/LTE-A radio access specification using unlicensed frequency bands or the transceiving apparatus for wireless backhaul may be used as a substitute of the WLAN AP in the above descriptions.

In connection with the various timer operations explained in the present invention, a start of timer means increase (or, decrease) of a counter value for the timer from an initial value (or, a separately designated value or a previous value), an expiration of timer means a case when the counter value of the timer meets a condition configured for an end of the timer. Also, a stop of timer means stopping the increase (or, decrease) operation of the counter value for the timer.

Although the present invention has been described with reference to the above embodiments, it should be understood that those skilled in the art may make various other modifications and changes without departing from the spirit and scope of the invention as defined by the appended claims.

The invention claimed is:

1. A method for processing a radio link failure (RLF) in a terminal supporting a multiple connectivity using two or more base station, the method comprising:
   processing computer executable program code embodied in non-transitory computer readable storage media by a processor, the computer executable program code comprising:
   program code that detects a RLF between the terminal and a second base station;
   program code that stops transmission to the second base station; and
   program code that reports the RLF to a first base station, wherein, when the second base station serves the terminal through a plurality of cells including a primary cell and at least one secondary cell, the RLF is a RLF occurred in the primary, and
   wherein the RLF is reported to the first base station via Radio Resource Control (RRC) signaling.

2. The method according to claim 1, wherein the primary cell is a cell whose physical uplink control channel (PUCCH) resources are configured.

3. A method for processing a radio link failure (RLF) in a terminal supporting a multiple connectivity using two or more base station, the method comprising:
   processing computer executable program code embodied in non-transitory computer readable storage media by a processor, the computer executable program code comprising: program code that detects a RLF between the terminal and a second base station;
program code that stops transmission to the second base station; and
program code that reports the RLF to a first base station, wherein the RLF includes at least one of a physical layer error between the terminal and the second base station, and a failure of a random access procedure performed between the terminal and the second base station, and wherein the RLF is reported to the first base station via Radio Resource Control (RRC) signaling.

* * * * *